United States Patent
Qu et al.

(10) Patent No.: US 11,563,832 B2
(45) Date of Patent: Jan. 24, 2023

(54) DATA SENDING METHOD AND DEVICE, DATA RECEIVING METHOD AND DEVICE, AND SYSTEM

(71) Applicant: HUAWEI TECHNOLOGIES CO., LTD., Shenzhen (CN)

(72) Inventors: Huichun Qu, Hangzhou (CN); Pei Wu, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/161,791

(22) Filed: Jan. 29, 2021

(65) Prior Publication Data

US 2021/0160353 A1    May 27, 2021

Related U.S. Application Data

(63) Continuation of application No. PCT/CN2019/108456, filed on Sep. 27, 2019.

(30) Foreign Application Priority Data

Oct. 25, 2018   (CN) .......................... 201811253561.7

(51) Int. Cl.
*H04L 69/324*  (2022.01)
*G06F 15/173*  (2006.01)

(52) U.S. Cl.
CPC ...... *H04L 69/324* (2013.01); *G06F 15/17331* (2013.01)

(58) Field of Classification Search
CPC ...... G01N 15/00; G01N 15/02; G06F 3/0689; G06F 9/30029; G09C 1/00; H04L 67/1097; H04L 47/6295
See application file for complete search history.

(56) References Cited

U.S. PATENT DOCUMENTS

| | | | |
|---|---|---|---|
| 6,675,200 B1 | 1/2004 | Cheriton et al. | |
| 10,509,764 B1 * | 12/2019 | Izenberg | H04L 69/22 |
| 2004/0049600 A1 | 3/2004 | Boyd et al. | |

(Continued)

FOREIGN PATENT DOCUMENTS

| | | |
|---|---|---|
| CN | 1487418 A | 4/2004 |
| CN | 102647251 A | 8/2012 |

(Continued)

OTHER PUBLICATIONS

Sriraman et al., "Deconstructing the Tail at Scale Effect Across Network Protocols", arxiv.org, Cornell University Library, 201OLIN Library Cornell University Ithaca, NY 14853, Jan. 10, 2017, total 10 pages.

*Primary Examiner* — Iqbal Zaidi
(74) *Attorney, Agent, or Firm* — Maier & Maier, PLLC

(57) ABSTRACT

A device generates a remote direct memory access (RDMA) packet, where a payload part of the RDMA packet includes a plurality of data blocks and protection information (PI) corresponding to each of the plurality data blocks in to-be-sent data; or a payload part of the RDMA packet includes one data unit or a part of data in the data unit of to-be-sent data, the data unit includes one data block and PI corresponding to the data block, and a length of the data unit is equal to an integer multiple of a length of the part of data; and sends the RDMA packet.

17 Claims, 17 Drawing Sheets

(56) References Cited

U.S. PATENT DOCUMENTS

| | | |
|---|---|---|
| 2004/0193825 A1 | 9/2004 | Garcia et al. |
| 2006/0047904 A1 | 3/2006 | Rohde et al. |
| 2007/0165672 A1 | 7/2007 | Keels et al. |
| 2010/0036930 A1 | 2/2010 | Pong |
| 2010/0183024 A1 | 7/2010 | Gupta |
| 2011/0029847 A1 | 2/2011 | Goldenberg et al. |
| 2017/0102946 A1* | 4/2017 | Truta ............... G06F 9/30029 |
| 2020/0042725 A1* | 2/2020 | Bolkhovitin ......... H04L 67/108 |

FOREIGN PATENT DOCUMENTS

| | | |
|---|---|---|
| CN | 103595504 A | 2/2014 |
| CN | 103825768 A | 5/2014 |
| CN | 105472023 A | 4/2016 |
| CN | 105871739 A | 8/2016 |
| CN | 109587112 A | 4/2019 |

* cited by examiner

| Data block A1 | Data block A2 | Data block A3 | Data block A4 | Data block A5 | Data block A6 | Data block A7 | Data block A8 |

| Data block A1 | PI1 | Data block A2 | PI2 | Data block A3 | PI3 | Data block A4 | PI4 | Data block A5 | PI5 | Data block A6 | PI6 | Data block A7 | PI7 | Data block A8 | PI8 |

FIG. 1-3

| Data block A1 | PI1 | Metadata 1 | Data block A2 | PI2 | Metadata 2 |
FIG. 1-4
| Data block A1 | Metadata 1 | PI1 | Data block A2 | Metadata 2 | PI2 |
FIG. 1-5
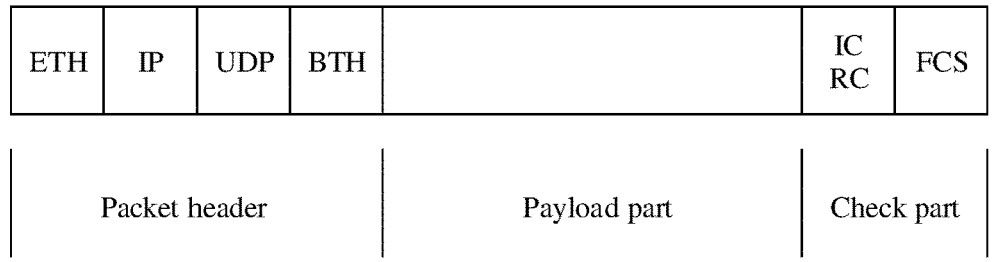
| Packet header | Payload part | Check part |
FIG. 1-6
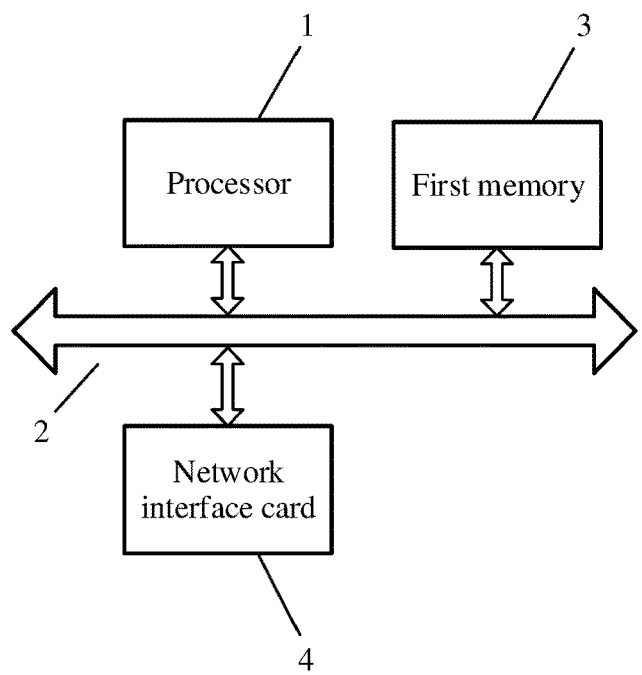
FIG. 2-1

| Packet header (1) | Data block A1 | PI1 | Data block A2 | PI2 | Data block A3 | PI3 | Data block A4 | PI4 | Check part |

First packet C1

| Packet header (3) | Data block A5 | PI5 | Data block A6 | PI6 | Data block A7 | PI7 | Data block A8 | PI8 | Check part |

Second packet C2

FIG. 3-3

DATA SENDING METHOD AND DEVICE, DATA RECEIVING METHOD AND DEVICE, AND SYSTEM

CROSS-REFERENCE TO RELATED APPLICATIONS

This application is a continuation of International Application No. PCT/CN2019/108456, filed on Sep. 27, 2019, which claims priority to Chinese Patent Application No. 201811253561.7, filed on Oct. 25, 2018. The disclosures of the aforementioned applications are hereby incorporated by reference in their entireties.

TECHNICAL FIELD

The embodiments relate to the field of information technologies, and in particular, to a data sending method and device, a data receiving method and device, and a system.

BACKGROUND

With the development of storage technologies, data generated by a device may be stored in a storage device instead of being stored locally. The device may store data to the storage device by using a remote direct memory access (RDMA) technology. During storage, the device may encapsulate the data into a plurality of RDMA packets and send the plurality of RDMA packets to the storage device. The storage device stores data in the RDMA packets.

The data includes a plurality of equal-length data blocks and protection information (PI) corresponding to each data block. The PI corresponding to the data block protects the data block, and a length of PI of each data block is eight bytes. A payload part of the RDMA packet includes a data block and PI corresponding to the data block. A length of the payload part is a fixed length, and the length of the payload part may be an integer multiple of a length of the data block. For example, it is assumed that a length of a data block is 512, and a length of a payload part of an RDMA packet is 1 k. In this case, a payload part of a first RDMA packet includes the first data block in the data, PI corresponding to the first data block, and data of the first 504 bytes in the second data block. A payload part of the second RDMA packet includes data of the last eight bytes in the second data block, PI corresponding to the second data block, the third data block, PI corresponding to the third data block, and data of the first 488 bytes in the fourth data block. A payload part of the third RDMA packet includes data of the last 24 bytes in the fourth data block, PI corresponding to the fourth data block, the fifth data block, PI corresponding to the fifth data block, and data of the first 472 bytes in the sixth data block. For the fourth RDMA packet, the fifth RDMA packet, and the like, details are not listed one by one.

When receiving the RDMA packet, the device needs to process the payload part in the packet, to restore the data block and the PI corresponding to the data block. However, for a current packet structure, relatively complex processing logic needs to be used to process a packet. Therefore, processing is not only time-consuming, but also needs a large quantity of hardware resources.

SUMMARY

To reduce a difficulty of processing remote direct memory access (RDMA) packet at a receive end, various embodiments provide a data sending method and device, a data receiving method and device, and a system. The embodiments are as follows.

According to a first aspect, this example provides a data sending method. The method may be used to generate an RDMA packet and send the RDMA packet. Because a payload part of each generated RDMA packet includes a plurality of data blocks and protection information (PI) corresponding to each data block in to-be-sent data, or a payload part of each generated RDMA packet includes one data unit, and the one data unit includes one data block and PI corresponding to the one data block. In this way, a payload part of each RDMA packet has a same structure. This can reduce difficulty, time consumption, and a hardware resource requirement of processing the RDMA packet at a receive end. Alternatively, because a payload part of the RDMA packet includes a part of data in a data unit, the data unit includes one data block and PI corresponding to the one data block, and a length of the data unit is equal to an integer multiple of a length of the part of data. In this way, one data unit may be encapsulated into a plurality of RDMA packets. For each of the plurality of RDMA packets other than the last RDMA packet, a part of data included in a payload part of each of the plurality of RDMA packets other than the last RDMA packet is a part of data in the data block, and a part of data included in a payload part of the last RDMA packet is remaining data in the data block and PI corresponding to the data block. In this way, a receive end needs only two types of processing logic. One type of processing logic processes the last RDMA packet corresponding to the data unit, and the other type of processing logic processes each of the plurality of RDMA packets other than the last RDMA packet corresponding to the data unit. Compared with one processing logic that needs to be corresponding to each RDMA packet currently, this can reduce difficulty, time consumption, and a hardware resource requirement of processing the RDMA packet at the receive end.

Optionally, a standard payload length L1 and a length L2 of the data block in the to-be-sent data are obtained, and the RDMA packet is generated based on the standard payload length L1 and the length L2 of the data block. Therefore, it can be ensured that the payload part of each generated RDMA packet has the same structure, or it is ensured that the payload part of each generated RDMA packet includes one data unit of the to-be-sent data or a part of data in the data unit, and a length of the data unit is equal to an integer multiple of a length of the part of data.

Optionally, when L1 is greater than L2, x data blocks and PI corresponding to each data block are obtained from the to-be-sent data, where x=L1/L2, the payload part is formed by using the x data blocks and the PI corresponding to each data block, and the RDMA packet is generated based on the payload part. In this way, the payload part of each generated RDMA packet includes the x data blocks and the PI corresponding to each data block, to ensure that the payload part of each generated RDMA packet has the same structure.

Optionally, L1=1024, L2=512, x=2, and the payload part of the RDMA packet includes two data blocks and PI corresponding to each of the two data blocks; or L1=2048, L2=512, x=4, and the payload part of the RDMA packet includes four data blocks and PI corresponding to each of the four data blocks; or L1=4096, L2=512, x=8, and the payload part of the RDMA packet includes eight data blocks and PI corresponding to each of the eight data blocks.

Optionally, when L1 is less than or equal to L2, data is obtained from a start position of the one data unit in the to-be-sent data, when data of 1/y of the data unit is obtained, where y=L2/L1, the payload part is formed by using the data of 1/y of the data unit, and the RDMA packet is generated based on the payload part. In this way, it is ensured that payload parts of the first (y−1) RDMA packets corresponding to each generated data unit have a same structure, and a payload part of the $y^{th}$ RDMA packet corresponding to each data unit has a same structure.

For y RDMA packets corresponding to one data unit, the data unit includes one data block and PI corresponding to the data block. For each of the first to the $(y-1)^{th}$ RDMA packets, a part of data included in a payload part of the RDMA packet is data whose length is L1+L3/y in the data block, and a part of data included in a payload part of the $y^{th}$ RDMA packet is remaining data whose length is L1+L3/y− L3 in the data block and PI of the data.

Optionally, L1=1024, L2=4096, y=4, and the payload part of the RDMA packet includes data whose length is 1024+ L3/4 in the data unit, where L3 is a length of the PI in the data unit; or L1=2048, L2=4096, y=2, and the payload part of the RDMA packet includes data whose length is 2048+L3/2 in the data unit; or L1=4096, L2=4096, y=1, and the payload part of the RDMA packet includes the data unit.

Optionally, the data unit further includes metadata corresponding to the data block, and in the data unit, the PI corresponding to the data block is located on a right side of the metadata; and L1=1024, L2=4096, y=4, the payload part of the RDMA packet includes data whose length is 1024+(L4+L3)/4 in the data unit, L3 is a length of the PI in the data unit, and L4 is a length of the metadata; or L1=2048, L2=4096, y=2, and the payload part of the RDMA packet includes data whose length is 2048+(L4+ L3)/2 in the data unit; or L1=4096, L2=4096, y=1, and the payload part of the RDMA packet includes the data unit.

Optionally, an operation of generating the RDMA packet may be implemented by a network interface card of a device. In this way, the operation of generating the RDMA packet is transferred from a processor of the device to the network interface card of the device, and the network interface card shares pressure of the processor, such that the processor can better process a service.

Optionally, when generating the RDMA packet, the network interface card needs to obtain data used as the payload part. The network interface card may receive data sent by the processor of the device and may directly read the data from a memory of the device. When the data is directly read from the memory of the device, the pressure of the processor can be shared, such that the processor can better process the service.

Optionally, the network interface card may obtain the standard payload length L1 based on a type of a network in which a transmit end and a receive end are located. For example, when the network is a public network, it may be obtained that L1 is equal to 512, 1 k, or the like. When the network is a local area network or a private network, it may be obtained that L1 is equal to 1 k, 2 k, 4 k, or the like. In this way, a size of the payload part of the RDMA packet may be suitable for a current network type, to ensure that the RDMA packet can be successfully transmitted to the receive end in the network. In addition, L1 may be set in different network types, to obtain a maximum payload length suitable for the type. For example, in the local area network or the private network, L1 may be equal to 2 k or 4 k, such that the maximum payload length may exceed 2 k or 4 k, to enable one RDMA packet to carry more data. This improves data sending efficiency.

According to a second aspect, this example provides a data receiving method. In the method, at least one RDMA packet is received, and a data block and PI corresponding to the data block are obtained from the at least one RDMA packet. Because a payload part of the RDMA packet includes a plurality of data blocks and PI corresponding to each data block in to-be-sent data. In this way, a payload part of each RDMA packet has a same structure. This can reduce difficulty, time consumption, and a hardware resource requirement of processing the RDMA packet at a receive end. Alternatively, because a payload part of the RDMA packet includes one data unit and a part of data in the data unit of to-be-sent data, the data unit includes one data block and PI corresponding to the one data block, and a length of the data unit is equal to an integer multiple of a length of the part of data. In this way, a payload part in an RDMA packet corresponding to each data unit has a same structure. Compared with the current different structure of the payload part of each RDMA packet, this can reduce difficulty, time consumption, and a hardware resource requirement of processing the RDMA packet at the receive end.

Optionally, when L1 is greater than L2, L1 is a standard payload length, L2 is a length of the data block in the to-be-sent data, and the payload part of the RDMA packet includes x data blocks and PI corresponding to each of the x data blocks in the to-be-sent data, where x=L1/L2. Therefore, it can be ensured that the payload part of each RDMA packet has the same structure.

Optionally, when one RDMA packet is received, x data blocks and PI corresponding to each of the x data blocks are obtained from the one RDMA packet. Because the payload part of each RDMA packet has the same structure, a same processing operation is performed on each RDMA packet. This can reduce difficulty, time consumption, and a hardware resource requirement of processing the RDMA packet at the receive end.

Optionally, L1=1024, L2=512, x=2, and the payload part of the RDMA packet includes two data blocks and PI corresponding to each of the two data blocks; or L1=2048, L2=512, x=4, and the payload part of the RDMA packet includes four data blocks and PI corresponding to each of the four data blocks; or L1=4096, L2=512, x=8, and the payload part of the RDMA packet includes eight data blocks and PI corresponding to each of the eight data blocks.

Optionally, when L1 is less than or equal to L2, L1 is a standard payload length, L2 is a length of the data block of a data block in the to-be-sent data, and the payload part of the RDMA packet includes data of 1/y of the one data unit of the to-be-sent data, where y=L2/L1. In this way, it is ensured that payload parts of the first (y−1) RDMA packets corresponding to each data unit have a same structure, and a payload part of the $y^{th}$ RDMA packet corresponding to each data unit has a same structure.

Optionally, when it is determined, according to a sequence number of a start packet, that y RDMA packets corresponding to the data unit are received, the data unit is obtained from the y RDMA packets. Because payload parts of y RDMA packets corresponding to each data unit have a same structure, a same processing operation is performed on the y RDMA packets corresponding to each data unit. This can reduce difficulty, time consumption, and a hardware resource requirement of processing the RDMA packet at the receive end.

Optionally, L1=1024, L2=4096, y=4, and the payload part of the RDMA packet includes data whose length is 1024+L3/4 in the data unit, where L3 is a length of the PI in the data unit; or L1=2048, L2=4096, y=2, and the payload part of the RDMA packet includes data whose length is 2048+L3/2 in the data unit; or L1=4096, L2=4096, y=1, and the payload part of the RDMA packet includes the data unit.

Optionally, the data unit further includes metadata corresponding to the data block, and in the data unit, the PI corresponding to the data block is located on a right side of the metadata; and L1=1024, L2=4096, y=4, the payload part of the RDMA packet includes data whose length is 1024+(L4+L3)/4 in the data unit, L3 is a length of the PI in the data unit, and L4 is a length of the metadata; or L1=2048, L2=4096, y=2, and the payload part of the RDMA packet includes data whose length is 2048+(L4+L3)/2 in the data unit; or L1=4096, L2=4096, y=1, and the payload part of the RDMA packet includes the data unit.

Optionally, the foregoing execution body used to receive the data may be a network interface card of a device. In this way, when receiving the data, the network interface card may obtain the data block and the PI corresponding to the data block from the received at least one RDMA packet, such that a processor of the device does not need to obtain the data block and the PI corresponding to the data block from the at least one RDMA packet. The network interface card shares pressure of the processor, such that the processor can better process a service.

Optionally, when the device is a storage device, the network interface card may send the obtained data block and the PI corresponding to the data block to a processor of the device. The processor stores the data block and the PI corresponding to the data block in a memory of the device. Alternatively, the network interface card may directly store the data block and the PI corresponding to the data block in a memory of the device. When the network interface card directly stores data, the pressure of the processor can be shared, such that the processor can better process the service.

According to a third aspect, an embodiment provides a data sending device. The device includes:
one or more processors; and
a memory, where
the memory stores one or more programs, the one or more programs are configured to be executed by the one or more processors, and the one or more programs include an instruction used to perform the method in any one of the first aspect or the optional implementations of the first aspect.

According to a fourth aspect, an embodiment provides a data receiving device. The device includes:
one or more processors; and
a memory, where
the memory stores one or more programs, the one or more programs are configured to be executed by the one or more processors, and the one or more programs include an instruction used to perform the method in any one of the second aspect or the optional implementations of the second aspect.

According to a fifth aspect, an embodiment provides a data sending apparatus. The apparatus includes a processing unit and a sending unit, where the processing unit is configured to generate a RDMA packet, and the sending unit is configured to send the RDMA packet.

A payload part of each RDMA packet generated by the processing unit includes a plurality of data blocks and PI corresponding to each data block in to-be-sent data, or a payload part of each generated RDMA packet includes one data unit, and the one data unit includes one data block and PI corresponding to the one data block. In this way, the payload part of each RDMA packet has a same structure. This can reduce difficulty, time consumption, and a hardware resource requirement of processing the RDMA packet at a receive end. Alternatively, a payload part of the RDMA packet generated by the processing unit includes a part of data in a data unit, the data unit includes one data block and PI corresponding to the one data block, and a length of the data unit is equal to an integer multiple of a length of the part of data. In this way, one data unit may be encapsulated into a plurality of RDMA packets. For each of the plurality of RDMA packets other than the last RDMA packet, a part of data included in a payload part of each of the plurality of RDMA packets other than the last RDMA packet is a part of data in the data block, and a part of data included in a payload part of the last RDMA packet is remaining data in the data block and PI corresponding to the data block. In this way, a receive end needs only two types of processing logic. One type of processing logic processes the last RDMA packet corresponding to the data unit, and the other type of processing logic processes each of the plurality of RDMA packets other than the last RDMA packet corresponding to the data unit. Compared with one processing logic that needs to be corresponding to each RDMA packet currently, this can reduce difficulty, time consumption, and a hardware resource requirement of processing the RDMA packet at the receive end.

Optionally, the processing unit is configured to: obtain a standard payload length L1 and a length L2 of the data block in the to-be-sent data and generate the RDMA packet based on the standard payload length L1 and the length L2 of the data block. Therefore, it can be ensured that the payload part of each generated RDMA packet has the same structure, or it is ensured that the payload part of each generated RDMA packet includes one data unit of the to-be-sent data or a part of data in the data unit, and a length of the data unit is equal to an integer multiple of a length of the part of data.

Optionally, the processing unit is configured to: when L1 is greater than L2, obtain x data blocks and PI corresponding to each of the x data blocks from the to-be-sent data, where x=L1/L2, form a payload part by using the x data blocks and the PI corresponding to each data block, and generate the RDMA packet based on the payload part. In this way, the payload part of each generated RDMA packet includes the x data blocks and the PI corresponding to each data block, to ensure that the payload part of each generated RDMA packet has the same structure.

Optionally, L1=1024, L2=512, x=2, and the payload part of the RDMA packet includes two data blocks and PI corresponding to each of the two data blocks; or L1=2048, L2=512, x=4, and the payload part of the RDMA packet includes four data blocks and PI corresponding to each of the four data blocks; or L1=4096, L2=512, x=8, and the payload part of the RDMA packet includes eight data blocks and PI corresponding to each of the eight data blocks.

Optionally, the processing unit is configured to: when L1 is less than or equal to L2, obtain data from a start position of the one data unit in the to-be-sent data; when data of 1/y of the data unit is obtained, where y=L2/L1, form a payload part by using the data of 1/y of the data unit, and generate the RDMA packet based on the payload part. In this way, it is ensured that payload parts of the first (y−1) RDMA packets corresponding to each generated data unit have a same structure, and a payload part of the $y^{th}$ RDMA packet corresponding to each data unit has a same structure.

For y RDMA packets corresponding to one data unit, the data unit includes one data block and PI corresponding to the data block. For each of the first to the $(y−1)^{th}$ RDMA packets, a part of data included in a payload part of the RDMA packet is data whose length is L1+L3/y in the data block, and a part of data included in a payload part of the $y^{th}$ RDMA packet is remaining data whose length is L1+L3/y−L3 in the data block and PI of the data.

Optionally, L1=1024, L2=4096, y=4, and the payload part of the RDMA packet includes data whose length is 1024+L3/4 in the data unit, where L3 is a length of the PI in the data unit; or L1=2048, L2=4096, y=2, and the payload part of the RDMA packet includes data whose length is 2048+L3/2 in the data unit; or L1=4096, L2=4096, y=1, and the payload part of the RDMA packet includes the data unit.

Optionally, the data unit further includes metadata corresponding to the data block, and in the data unit, the PI corresponding to the data block is located on a right side of the metadata; and L1=1024, L2=4096, y=4, the payload part of the RDMA packet includes data whose length is 1024+(L4+L3)/4 in the data unit, L3 is a length of the PI in the data unit, and L4 is a length of the metadata; or L1=2048, L2=4096, y=2, and the payload part of the RDMA packet includes data whose length is 2048+(L4+L3)/2 in the data unit; or L1=4096, L2=4096, y=1, and the payload part of the RDMA packet includes the data unit.

According to a sixth aspect, an embodiment provides a data receiving apparatus. The apparatus includes a receiving unit and a processing unit, where the receiving unit is configured to receive at least one RDMA packet, and the processing unit is configured to obtain a data block and PI corresponding to the data block from the at least one RDMA packet.

A payload part of the RDMA packet received by the receiving unit includes a plurality of data blocks and PI corresponding to each data block in to-be-sent data. In this way, a payload part of each RDMA packet has a same structure. This can reduce difficulty, time consumption, and a hardware resource requirement of processing the RDMA packet by the processing unit. Alternatively, a payload part of the RDMA packet received by the receiving unit includes one data unit and a part of data in the data unit of to-be-sent data, and the data unit includes one data block and PI corresponding to the one data block, and a length of the data unit is equal to an integer multiple of a length of the part of data. In this way, the payload part of each RDMA packet corresponding to each data unit has a same structure. Compared with the current different structure of the payload part of each RDMA packet, this can reduce difficulty, time consumption, and a hardware resource requirement of processing the RDMA packet by the processing unit.

Optionally, when L1 is greater than L2, L1 is a standard payload length, L2 is a length of the data block in the to-be-sent data, and the payload part of the RDMA packet includes x data blocks and PI corresponding to each of the x data blocks in the to-be-sent data, where x=L1/L2. Therefore, it can be ensured that the payload part of each RDMA packet has the same structure.

Optionally, the processing unit is configured to: when one RDMA packet is received, obtain x data blocks and PI corresponding to each of the x data blocks from the one RDMA packet. Because the payload part of each RDMA packet has the same structure, a same processing operation is performed on each RDMA packet. This can reduce difficulty, time consumption, and a hardware resource requirement of processing the RDMA packet by the processing unit.

Optionally, L1=1024, L2=512, x=2, and the payload part of the RDMA packet includes two data blocks and PI corresponding to each of the two data blocks; or L1=2048, L2=512, x=4, and the payload part of the RDMA packet includes four data blocks and PI corresponding to each of the four data blocks; or L1=4096, L2=512, x=8, and the payload part of the RDMA packet includes eight data blocks and PI corresponding to each of the eight data blocks.

Optionally, when L1 is less than or equal to L2, L1 is a standard payload length, L2 is a length of the data block in the to-be-sent data, and the payload part of the RDMA packet includes data of 1/y of the one data unit of the to-be-sent data, where y=L2/L1. In this way, it is ensured that payload parts of the first (y−1) RDMA packets corresponding to each data unit have a same structure, and a payload part of the $y^{th}$ RDMA packet corresponding to each data unit has a same structure.

Optionally, the processing unit is configured to: when it is determined, according to a sequence number of a start packet, that y RDMA packets corresponding to the data unit are received, obtain the data unit from the y RDMA packets. Because payload parts of y RDMA packets corresponding to each data unit have a same structure, a same processing operation is performed on the y RDMA packets corresponding to each data unit. This can reduce difficulty, time consumption, and a hardware resource requirement of processing the RDMA packet by the processing unit.

Optionally, L1=1024, L2=4096, y=4, and the payload part of the RDMA packet includes data whose length is 1024+L3/4 in the data unit, where L3 is a length of the PI in the data unit; or L1=2048, L2=4096, y=2, and the payload part of the RDMA packet includes data whose length is 2048+L3/2 in the data unit; or L1=4096, L2=4096, y=1, and the payload part of the RDMA packet includes the data unit.

Optionally, the data unit further includes metadata corresponding to the data block, and in the data unit, the PI corresponding to the data block is located on a right side of the metadata; and L1=1024, L2=4096, y=4, the payload part of the RDMA packet includes data whose length is 1024+(L4+L3)/4 in the data unit, L3 is a length of the PI in the data unit, and L4 is a length of the metadata; or L1=2048, L2=4096, y=2, and the payload part of the RDMA packet includes data whose length is 2048+(L4+L3)/2 in the data unit; or L1=4096, L2=4096, y=1, and the payload part of the RDMA packet includes the data unit.

According to a seventh aspect, an embodiment provides a data sending apparatus. The apparatus may be a network interface card of a transmit end or may be a partial structure of the network interface card, and may include: at least one processor, at least one memory, at least one communications interface, and at least one network port. The at least one processor is coupled to the at least one memory and the at least one network port by using a bus. The at least one memory stores one or more programs, the one or more programs are configured to be executed by the at least one processor, and the one or more programs include an instruction used to perform the method according to the first aspect or any implementation of the first aspect.

According to an eighth aspect, an embodiment provides a data receiving apparatus. The apparatus may be a network interface card of a receive end or may be a partial structure of the network interface card, and may include: at least one processor, at least one memory, at least one communications interface, and at least one network port. The at least one processor is coupled to the at least one memory and the at least one network port by using a bus. The at least one memory stores one or more programs, the one or more programs are configured to be executed by the at least one processor, and the one or more programs include an instruction used to perform the method according to the second aspect or any optional implementation of the second aspect.

According to a ninth aspect, an embodiment provides a computer program product. The computer program product includes a computer program stored in a computer-readable storage medium, and the computer program is loaded by a controller to implement the method according to the first aspect, the second aspect, any optional implementation of the first aspect, or any optional implementation of the second aspect.

According to a tenth aspect, an embodiment provides a non-volatile computer-readable storage medium, configured to store a computer program. The computer program is loaded by a processor to execute an instruction of the method according to the first aspect, the second aspect, any implementation of the first aspect, or any implementation of the second aspect.

According to an eleventh aspect, an embodiment provides a chip. The chip includes a programmable logic circuit and/or a program instruction, and when running, the chip is configured to implement the method according to the first aspect, the second aspect, any implementation of the first aspect, or any implementation of the second aspect.

According to a twelfth aspect, an embodiment provides a communications system. The system includes the device according to the third aspect and the device according to the fourth aspect.

BRIEF DESCRIPTION OF DRAWINGS

FIG. 1-1 is a schematic structural diagram of a communications network according to an embodiment;

FIG. 1-2 is a schematic structural diagram of to-be-sent data according to an embodiment;

FIG. 1-3 is a schematic structural diagram of another to-be-sent data according to an embodiment;

FIG. 1-4 is a schematic structural diagram of another to-be-sent data according to an embodiment;

FIG. 1-5 is a schematic structural diagram of another to-be-sent data according to an embodiment;

FIG. 1-6 is a schematic structural diagram of an RDMA packet according to an embodiment;

FIG. 2-1 is a schematic structural diagram of a device according to an embodiment;

FIG. 2-2 is another schematic structural diagram of a device according to an embodiment;

FIG. 3-1 is a flowchart of a data sending method according to an embodiment;

FIG. 3-2 is a schematic structural diagram of another RDMA packet according to an embodiment;

FIG. 3-3 is a schematic structural diagram of another RDMA packet according to an embodiment;

FIG. 3-4 is a schematic structural diagram of another RDMA packet according to an embodiment;

FIG. 3-5 is a schematic structural diagram of another RDMA packet according to an embodiment;

FIG. 3-6 is a schematic structural diagram of another RDMA packet according to an embodiment;

FIG. 3-7 is a schematic structural diagram of another RDMA packet according to an embodiment;

FIG. 3-8 is a schematic structural diagram of another RDMA packet according to an embodiment;

FIG. 3-9 is a schematic structural diagram of another RDMA packet according to an embodiment;

FIG. 4-1 is a flowchart of a data receiving method according to an embodiment;

FIG. 4-2 is a schematic structural diagram of another to-be-sent data according to an embodiment;

FIG. 5 is a schematic structural diagram of a data sending apparatus according to an embodiment;

FIG. 6 is a schematic structural diagram of a data receiving apparatus according to an embodiment;

FIG. 7 is a schematic structural diagram of another data sending apparatus according to an embodiment; and FIG. 8 is a schematic structural diagram of another data receiving apparatus according to an embodiment.

DETAILED DESCRIPTION OF EMBODIMENTS

The following further describes in detail the embodiments with reference to accompanying drawings.

When a current transmit end encapsulates to-be-sent data into a plurality of remote direct memory access (RDMA) packets, a data block and protection information (PI) corresponding to the data block that are included in a payload part of each of the plurality of RDMA packets change out of order. For example, it is assumed that a length of a data block is 512, and a length of a payload part of an RDMA packet is 1 k. In this case, a payload part of the first encapsulated RDMA packet includes the first data block in the data, PI corresponding to the first data block, and data of the first 504 bytes in the second data block. A payload part of the second RDMA packet includes data of the last eight bytes in the second data block, PI corresponding to the second data block, the third data block, PI corresponding to the third data block, and data of the first 488 bytes in the fourth data block. A payload part of the third RDMA packet includes data of the last 24 bytes in the fourth data block, PI corresponding to the fourth data block, the fifth data block, PI corresponding to the fifth data block, and data of the first 472 bytes in the sixth data block.

In the foregoing encapsulated plurality of RDMA packets, a data block and PI corresponding to the data block in each of the plurality of RDMA packets change out of order. In this way, a payload part of each RDMA packet has a different structure. When processing an RDMA packet, a receive end needs to set corresponding processing logic for each RDMA packet, and when receiving an RDMA packet, the receive end processes the RDMA packet by using processing logic corresponding to the RDMA packet, to obtain a data block and PI corresponding to the data block in the RDMA packet. This increases processing difficulty at the receive end. To resolve the technical problem, in the embodiments, to-be-sent data may be encapsulated into a plurality of RDMA packets in any one of the following implementations, and a data block and PI corresponding to the data block in the encapsulated RDMA packet change sequentially or cyclically. This reduces processing difficulty at a receive end.

Figures 1, 2:
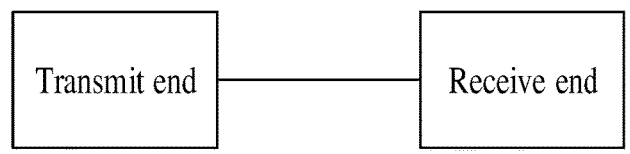
Figure 2:
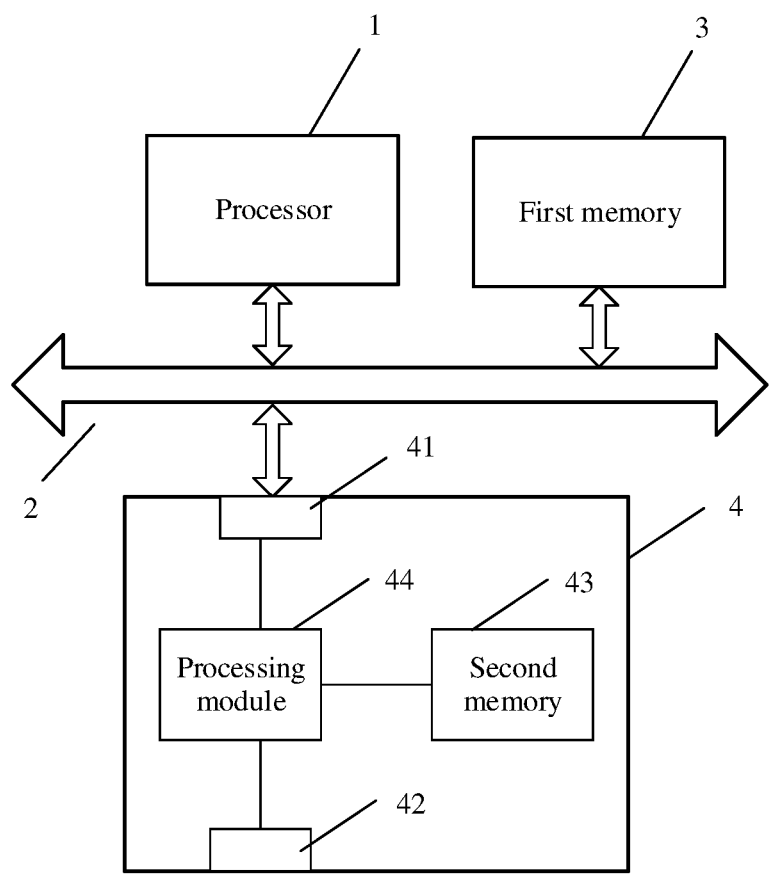

Referring to FIG. 1-1, an embodiment provides a communications network. The communications network includes a transmit end and a receive end, there is a network connection between the transmit end and the receive end, and the network connection may be a wired connection or a wireless connection.

The transmit end may send to-be-sent data to the receive end. When sending the to-be-sent data, the transmit end may encapsulate the to-be-sent data into one or more RDMA packets and send the RDMA packet to the receive end. The receive end receives the RDMA packet and obtains data from the RDMA packet.

Optionally, both the receive end and the transmit end may be servers, and one of the servers is a storage server. Alternatively, one of the transmit end and the receive end may be a server, a terminal, or the like. The terminal may be a mobile phone, a personal computer, a tablet computer, or the like, and the other may be a storage node.

Optionally, the to-be-sent data may be data that needs to be stored by the transmit end, and the receive end may be a storage device. A process in which the transmit end sends the to-be-sent data to the receive end is a process in which the transmit end writes the to-be-sent data to the receive end. After obtaining the data sent by the transmit end, the receive end may locally store the obtained data. Alternatively, the to-be-sent data may be data locally stored by the transmit end, and the transmit end may be a storage device. A process in which the transmit end sends the to-be-sent data to the receive end is a process performed after the transmit end receives a read request sent by the receive end. The process of sending the data is a process in which the receive end reads the to-be-sent data from the transmit end.

Optionally, referring to FIG. 1-2, the to-be-sent data may include a plurality of data blocks, a length of each data block is equal, and the length of the data block may be equal to $2^n$, where n may be equal to an integer value such as 8, 9, 10, 11, or 12. In other words, the length of the data block may be equal to 256, 512, 1024, 2048 or 4096. A unit of the length of the data block may be byte, bit, or the like. In this embodiment, all units related to the length in subsequent descriptions are described by using byte as an example. For another unit, an implementation corresponding to another unit may be obtained only by replacing the byte that appears in the subsequent descriptions with another unit. Therefore, implementations of another unit are not listed one by one in the embodiments.

Figures 1, 3:
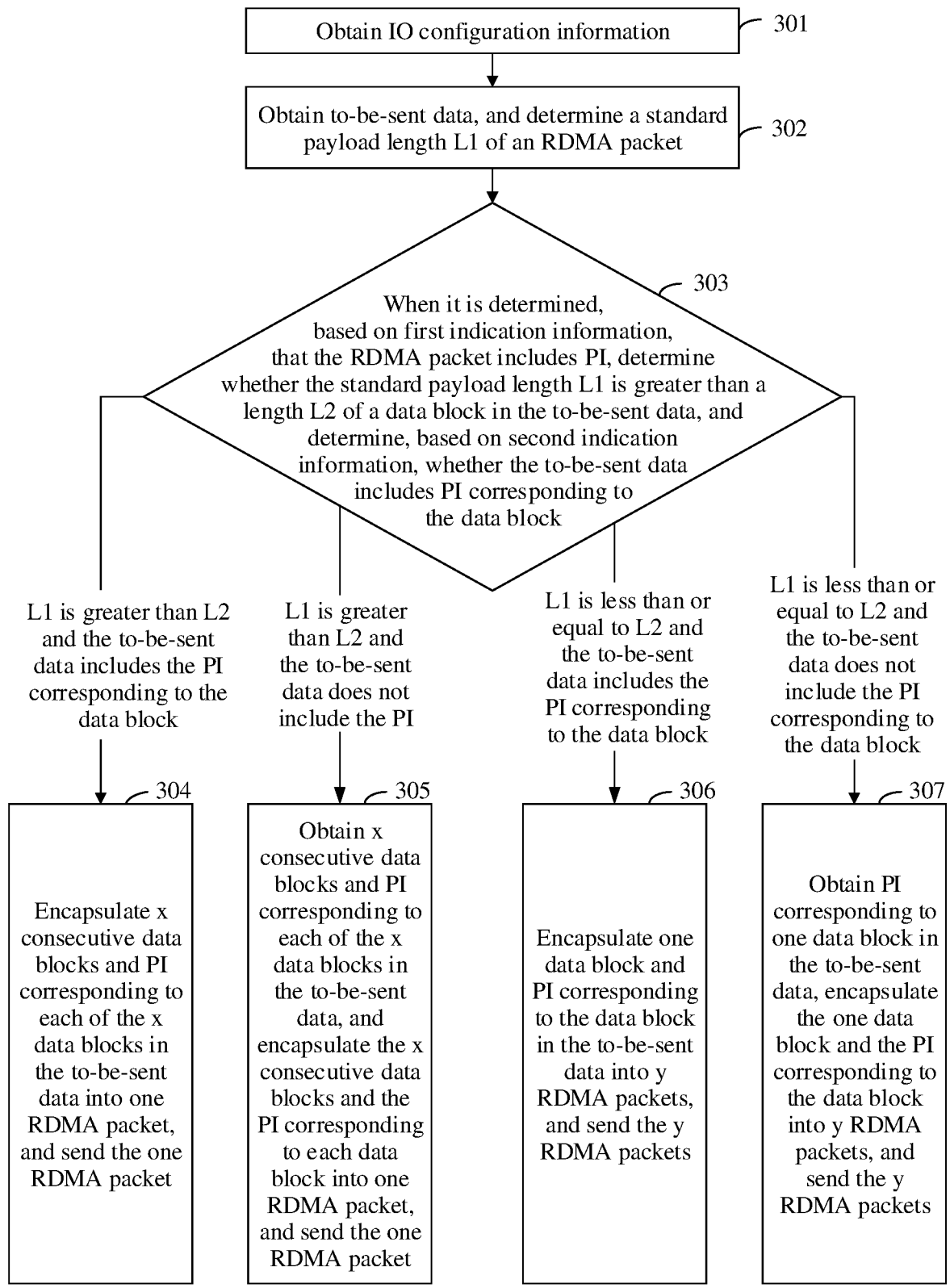
Figures 2, 3:
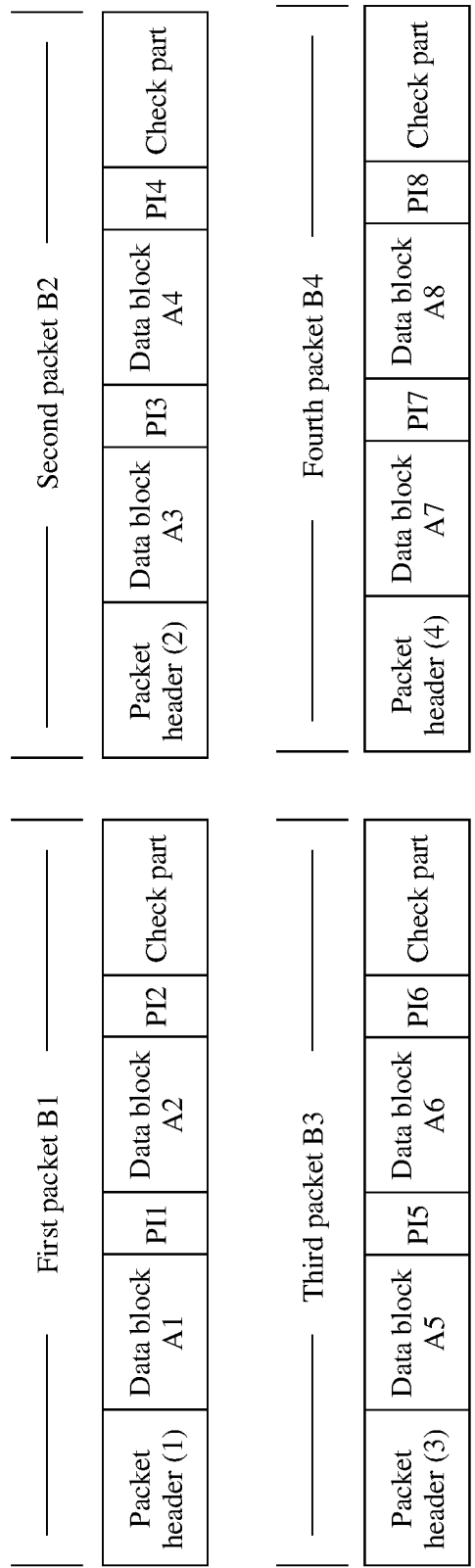

Optionally, referring to FIG. 1-3, the to-be-sent data may further include PI corresponding to each data block, and in the data, the PI corresponding to the data block is located after the data block and closely follows the data block.

Optionally, a length of the PI of each data block may be equal, and the length of the PI of each data block may be 8 bytes, 10 bytes, 12 bytes, or the like. The PI of the data block may be a cyclic redundancy check (CRC) calculated based on the data block.

Optionally, referring to FIG. 1-4, a length of the data block in the to-be-sent data may be 4 k, in other words, a length of the data block in the to-be-sent data is 4096 bytes. When the length of the data block in the to-be-sent data is 4 k, the to-be-sent data further includes metadata corresponding to each data block, and in the to-be-sent data, the metadata corresponding to the data block is located after the data block.

Optionally, referring to FIG. 1-4, in the to-be-sent data, PI corresponding to the data block may be located on a left side of the metadata corresponding to the data block, and the PI corresponding to the data block is a CRC calculated based on the data block. Alternatively, referring to FIG. 1-5, in the to-be-sent data, the PI corresponding to the data block may be located on a right side of the metadata corresponding to the data block, and the PI corresponding to the data block is a CRC calculated based on the data block and the metadata corresponding to the data block.

Optionally, a length of the metadata corresponding to each data block is also equal and is $2^m$, and a value of m may be an integer value such as 5 or 6. In other words, the length of the metadata may be 32 bytes, 64 bytes, or the like.

Optionally, the RDMA packet sent by the transmit end may include the PI corresponding to the data block or may not include the PI corresponding to the data block.

If the RDMA packet does not include the PI corresponding to the data block, a standard payload length L1 of the RDMA packet is determined. When the standard payload length L1 of the RDMA packet is greater than a length L2 of the data block, x consecutive data blocks in the to-be-sent data are encapsulated into one RDMA packet. A payload part of the RDMA packet includes the x data blocks, and a length of the payload part is equal to L1, where x=L1/L2. The receive end obtains the x data blocks from the RDMA packet when receiving the RDMA packet. When a standard payload length L1 of the RDMA packet is less than or equal to a length L2 of the data block, one data block in the data is encapsulated into y RDMA packets. For any one of the y RDMA packets, a length of a payload part of the RDMA packet is L1. The payload part of the RDMA packet includes a part of data in the data block, and a length of the part of data is L1, where y=L2/L1. The receive end obtains the one data block from the y RDMA packets when receiving the y RDMA packets. For a detailed process in which the transmit end encapsulates the RDMA packet and a detailed process in which the receive end obtains the data block from the RDMA packet, refer to content in subsequent related embodiments. Details are not described herein.

When the RDMA packet includes the PI corresponding to the data block, a standard payload length L1 of the RDMA packet is determined. When the standard payload length L1 of the RDMA packet is greater than a length L2 of the data block, x consecutive data blocks and PI corresponding to each of the x data blocks are encapsulated into one RDMA packet in the to-be-sent data, where x=L1/L2. A payload part of the RDMA packet is extended during the encapsulation, such that a length of the payload part of the RDMA packet is extended from L1 to L1+L3*x, where L3 is a length of the PI, in other words, the length of the payload part of the RDMA packet is L1+L3*x. The payload part of the RDMA packet includes the x data blocks and the PI corresponding to each data block. The receive end obtains the x data blocks and the PI corresponding to each of the x data blocks from the RDMA packet when receiving the RDMA packet. When a standard payload length L1 of the RDMA packet is less than or equal to a length L2 of the data block, one data block in the data and PI corresponding to the data block are encapsulated into y RDMA packets, where y=L2/L1. For any one of the y RDMA packets, a payload part of the RDMA packet is extended during the encapsulation, such that a length of the payload part of the RDMA packet is extended from L1 to L1+L3/y, in other words, the length of the payload part of the RDMA packet is L1+L3/y. Payload parts of the first RDMA packet to the $(y-1)^{th}$ RDMA packet each include a part of data in the data block, and a length of the part of data is L1+L3/y. A payload part of the $y^{th}$ RDMA packet includes remaining data in the data block and PI corresponding to the data block. The receive end obtains the one data block and the PI corresponding to the one data block from the y RDMA packets when receiving the y RDMA packets. For a detailed process in which the transmit end encapsulates the RDMA packet and a detailed process in which the receive end obtains the data block and the PI from the RDMA packet, refer to content in subsequent related embodiments. Details are not described herein.

Optionally, when the length of the data block in the to-be-sent data is 4 k, a standard payload length L1 of the RDMA packet is usually less than or equal to a length L2 of the data block. Refer to FIG. 1-4, when the PI corresponding to the data block in the to-be-sent data is located on the left side of the metadata corresponding to the data block, for any data block in the to-be-sent data, the data block and PI corresponding to the data block may be encapsulated into y RDMA packets. For any one of the y RDMA packets, a payload part of the RDMA packet is extended during the encapsulation, such that a length of the payload part of the RDMA packet is extended from L1 to L1+L3/y, in other words, the length of the payload part of the RDMA packet is L1+L3/y. A payload part of the first RDMA packet to the $(y-1)^{th}$ RDMA packet includes a part of data in the data block, and a length of the part of data is L1+L3/y. A payload part of the $y^{th}$ RDMA packet includes remaining data in the data block and PI corresponding to the data block, but the metadata corresponding to the data block is not encapsulated in the RDMA packet, in other words, the transmit end does not send the metadata corresponding to the data block to the receive end.

Referring to FIG. 1-5, when the PI corresponding to the data block in the to-be-sent data is located on the right side of the metadata corresponding to the data block, for any data block in the to-be-sent data, the data block, metadata corresponding to the data block, and PI corresponding to the data block are encapsulated into y RDMA packets. For any one of the y RDMA packets, a payload part of the RDMA packet is extended during the encapsulation, such that a length of the payload part of the RDMA packet is extended from L1 to L1+(L4+L3)/y, in other words, the length of the payload part of the RDMA packet is L1+(L4+L3)/y, where L4 is a length of the metadata. Payload parts of the first RDMA packet to the $(y-1)^{th}$ RDMA packet each includes a part of data in the data block, and a length of the part of data is L1+(L4+L3)/y. A payload part of the $y^{th}$ RDMA packet includes remaining data in the data block, the metadata corresponding to the data block, and the PI corresponding to the data block.

Optionally, the transmit end communicates with the receive end according to the RDMA protocol. The current RDMA protocol specifies that the determined standard payload length L1 is equal to $2^z$, where z may be equal to an integer value such as 8, 9, 10, 11, or 12. In other words, the standard payload length L1 may be equal to 256, 512, 1 k, 2 k or 4 k. In addition, the current RDMA protocol further specifies that the length L2 of the data block is equal to $2^n$, where n may be equal to an integer value such as 8, 9, 10, 11, or 12. Therefore, according to the current RDMA protocol, it may be obtained that the determined standard payload length L1 is an integer multiple of the length L2 of the data block, or the length L2 of the data block is an integer multiple of the determined standard payload length L1.

The transmit end and the receive end may be located in a same local area network or a same private network. The determined standard payload length L1 may be a preset length, and the preset length may be 4 k, 2 k, or the like. In this case, the encapsulated RDMA packet may be a Jumbo frame packet. The transmit end and the receive end may not be in a same local area network or a same private network. In other words, the transmit end and the receive end need to communicate with each other by using a public network. The determined standard payload length L1 is less than a length of a maximum transmission unit allowed by the public network. Currently, when the length of the maximum transmission unit allowed by the public network is 1500, the determined standard payload length L1 may be 512, 1 k, or the like. With the development of technology, the length of the maximum transmission unit allowed by the public network may vary, such that the determined standard payload length L1 may vary with the length of the maximum transmission unit allowed by the public network. For example, it is assumed that the length of the maximum transmission unit allowed by the public network may be 2500 in the future, such that the determined standard payload length L1 may be 1 k, 2 k, or the like.

Optionally, referring to FIG. 1-6, the RDMA packet includes a packet header, a payload part, and a check part. The payload part is located between the packet header and the check part. The packet header includes a sequence number of the RDMA packet, the payload part may include content such as the data block and/or the PI that are/is sent by the transmit end to the receive end, and the check part includes check information used to check the RDMA packet.

Optionally, the transmit end sends data according to the RDMA protocol, and the receive end receives data according to the RDMA protocol. The RDMA protocol defines a length of the packet header and a length of the check part. For example, the length, of the packet header, defined in the RDMA protocol may be 48 bytes, and the length, of the check part, defined in the RDMA protocol may be 16 bytes. However, with the development of technology, the length of the packet header and the length of the check part that are defined in the RDMA protocol may change.

Optionally, the packet header may include an Ethernet (ETH) header, an Internet Protocol (IP) header, a user datagram protocol (UDP) header, and a base transport header (BTH). The check part may include an invariant CRC (ICRC) and a frame check sequence (FCS) FCS.

Referring to FIG. 2-1, an embodiment provides a device. The device may be the foregoing transmit end or receive end. The device includes:

a processor 1, a bus system 2, a first memory 3, and a network interface card 4. The processor 1, the first memory 3, and the network interface card 4 are coupled to each other by using the bus system 2.

The first memory 3 is configured to store a program, an instruction, or code. The processor 1 is configured to execute a program, an instruction, or code in the first memory 3, to control the network interface card 4 to send data or receive data.

Optionally, when the foregoing device is a storage device, the first memory 3 may further be configured to store data written by another device.

The first memory 3 may include at least one magnetic disk and may further include a memory and the like.

Optionally, the foregoing processor 1 may be a general-purpose central processing unit (CPU), a microprocessor, an application-specific integrated circuit (ASIC), or one or more integrated circuits.

The foregoing bus system 2 may include a path for transmitting information between the foregoing components.

The network interface card 4 may be configured to communicate with another device or a communications network, for example, an Ethernet, a radio access network (RAN), or a wireless local area network (WLAN).

Referring to FIG. 2-2, for the network interface card 4, the network interface card 4 may include a communications interface 41, a network port 42, a second memory 43, and a processing module 44. The processing module 44 may be separately coupled to the communications interface 41, the network port 42, and the second memory 43. The communications interface 41 is further coupled to the bus system 2.

Optionally, the processing module 44 may include one or more processors. There may be one or more network ports 42, there may be one or more second memories 43, and similarly, there may be one or more communications interfaces 41.

The network interface card 4 may also include a bus, and the processing module 44 may be coupled to the communications interface 41, the network port 42, and the second memory 43 by using the bus.

The second memory 43 may store a program, an instruction, or code. The processing module 44 is configured to execute a program, an instruction, or code in the second memory 43, to send data or receive data.

Optionally, when the foregoing device is the transmit end, the processor 1 may send input/output (IO) configuration information to the network interface card 4 by using the bus system 2, where the IO configuration information includes content such as a sequence number of a start packet, a length L2 of a data block, first indication information used to indicate whether an RDMA packet includes PI, and second indication information used to indicate whether to-be-sent data includes PI. The processing module 44 in the network interface card 4 may receive the IO configuration information through the communications interface 41, store the IO configuration information in the second memory 43, and send the IO configuration information to the receive end.

Then, the processor 1 may send the to-be-sent data to the network interface card 4 by using the bus system 2. The processing module 44 in the network interface card 4 may receive the to-be-sent data from the bus system 2 through the communications interface 41 and determine a standard payload length L1 of the RDMA packet based on a type of a network in which the transmit end and the receive end are currently located; and read the IO configuration information from the second memory 43.

In a case in which it is determined, based on the first indication information, that the RDMA packet does not include PI corresponding to a data block, when the standard payload length L1 of the RDMA packet is greater than a length L2 of the data block, the processing module 44 encapsulates x consecutive data blocks in the to-be-sent data into one RDMA packet, where x=L1/L2, and sends the RDMA packet to the receive end through the network port 42; or when the standard payload length L1 of the RDMA packet is less than or equal to a length L2 of the data block, the processing module 44 encapsulates one data block in the to-be-sent data into y RDMA packets, where y=L2/L1, and sends the y RDMA packets to the receive end through the network port 42. A detailed process of encapsulating the RDMA packet by the transmit end is not described in detail herein.

In a case in which it is determined, based on the first indication information, that the RDMA packet includes PI corresponding to a data block, when the standard payload length L1 of the RDMA packet is greater than a length L2 of the data block, the processing module 44 encapsulates x consecutive data blocks and PI corresponding to each of the x data blocks into one RDMA packet in the to-be-sent data, where x=L1/L2, and sends the RDMA packet to the receive end through the network port 42; or when the standard payload length L1 of the RDMA packet is less than or equal to a length L2 of the data block, the processing module 44 encapsulates one data block and PI corresponding to the one data block in the to-be-sent data into y RDMA packets, where y=L2/L1, and sends the y RDMA packets to the receive end through the network port 42. A detailed process of encapsulating the RDMA packet by the transmit end is not described in detail herein.

Optionally, when the device is the receive end, the processing module 44 in the network interface card 4 may receive, through the network port 42, IO configuration information sent by the transmit end, store the IO configuration information in the second memory 43, and determine a standard payload length L1 of the RDMA packet based on a type of a network in which the transmit end and the receive end are currently located.

In a case in which it is determined, based on the first indication information, that the RDMA packet does not include PI corresponding to a data block, when the standard payload length L1 of the RDMA packet is greater than a length L2 of the data block, the processing module 44 receives the RDMA packet through the network port 42, and obtains x data blocks from the RDMA packet, where x=L1/L2; or when the standard payload length L1 of the RDMA packet is less than or equal to a length L2 of the data block, the processing module 44 may receive, through the network port 42, y RDMA packets corresponding to a same data block sent by the transmit end, where y=L2/L1, and obtain the data block from the y RDMA packets. For a detailed process in which the receive end obtains the data block from the RDMA packet, refer to content in subsequent related embodiments. Details are not described herein.

In a case in which it is determined, based on the first indication information, that the RDMA packet includes PI corresponding to a data block, when the standard payload length L1 of the RDMA packet is greater than a length L2 of the data block, the processing module 44 receives the RDMA packet through the network port 42, and obtains x data blocks and PI corresponding to each data block from the RDMA packet, where x=L1/L2; or when the standard payload length L1 of the RDMA packet is less than or equal to a length L2 of the data block, the processing module 44 may receive, through the network port 42, y RDMA packets corresponding to a same data block sent by the transmit end, where y=L2/L1, and obtain the data block and the PI corresponding to the data block from the y RDMA packets. For a detailed process in which the receive end obtains the data block from the RDMA packet, refer to content in subsequent related embodiments. Details are not described herein.

Referring to FIG. 3-1, an embodiment provides a data sending method. The method may be applied to the network interface card of the transmit end in any one of the foregoing embodiments and includes the following steps.

Step 301: Obtain IO configuration information, where the IO configuration information includes content such as a sequence number of a start packet, a length L2 of a data block, first indication information used to indicate whether an RDMA packet includes PI, and second indication information used to indicate whether to-be-sent data includes PI.

When a processor at the transmit end needs to send to-be-sent data, the processor first sends the IO configuration information to the network interface card by using a bus system. A processing module in the network interface card may receive the IO configuration information from the bus system through a communications interface, and then store the IO configuration information in a second memory in the network interface card.

When the transmit end is a storage device, the processor receives, by using the network interface card, a read request sent by the receive end, where the read request includes an identifier of data that needs to be read. After receiving the read request, the processor prepares the data, that is, prepares the to-be-sent data. In a preparation process, the processor may obtain, from a first memory of the transmit end, data corresponding to the identifier of the data, where the data is the to-be-sent data, obtain the length L2 of the data block in the to-be-sent data, determine whether the RDMA packet includes the PI corresponding to the data block and generate the first indication information based on a determining result, detect whether the to-be-sent data includes the PI and generate the second indication information based on a detection result, and generate the sequence number of the start packet, to obtain the IO configuration information. After preparing the to-be-sent data, the processor may send the IO configuration information to the network interface card by using the bus system.

Optionally, the foregoing process of preparing the data and obtaining the IO configuration information may also be executed by the network interface card. In this way, the processor may not prepare the data or may not need to obtain the IO configuration information. The network interface card may directly obtain, from the first memory of the transmit end, the data corresponding to the identifier of the data as the to-be-sent data and obtain the IO configuration information. A process of obtaining the IO configuration information is the same as a process of obtaining the IO configuration information by the processor.

Optionally, a user may configure in advance at the transmit end whether the RDMA packet includes the PI. Therefore, the processor or the network interface card may determine, based on the configuration of the user, whether the RDMA packet includes the PI corresponding to the data block.

When the transmit end is not a storage device, the to-be-sent data is data that needs to be stored by the processor. The processor obtains the length L2 of the data block in the to-be-sent data, determines whether the RDMA packet includes the PI corresponding to the data block and generates the first indication information based on a determining result, detects whether the to-be-sent data includes the PI and generates the second indication information based on a detection result, generates the sequence number of the start packet, to obtain the IO configuration information, and sends the IO configuration information to the network interface card by using the bus system.

Optionally, the to-be-sent data may be generated by the processor of the transmit end when the processor of the transmit end runs a service or may be sent by another device and received by the transmit end. For example, the transmit end may be a server configured to run a service, and the to-be-sent data may be data that is sent by a subscriber terminal and that is received by the server.

Optionally, a user may configure in advance at the transmit end whether the RDMA packet includes the PI. Therefore, the processor or the network interface card may determine, based on the configuration of the user, whether the RDMA packet includes the PI corresponding to the data block.

Optionally, after storing the IO configuration information in the second memory, the processing module may further send the IO configuration information to the receive end through the network port of the network interface card.

The second memory may include a plurality of storage areas. When storing the IO configuration information in a storage area of the second memory, the processing module obtains a storage position of the IO configuration information, where the storage position includes a start address of the storage area and an offset of the IO configuration information in the storage area.

Optionally, a process in which the processing module sends the IO information may be as follows.

The processing module may send a send message to the receive end through the network port of the network interface card, where the send message includes the storage position of the IO configuration information. The receive end receives the send message, determines, based on the send message, that the transmit end starts to send data, and reads the IO configuration information from the transmit end based on a storage position included in the send message. Alternatively, the processing module directly sends the IO configuration information to the receive end through the network port.

Step 302: Obtain the to-be-sent data and determine a standard payload length L1 of the RDMA packet.

When the processor at the transmit end needs to send the to-be-sent data to the receive end, the processor sends the to-be-sent data to the network interface card by using the bus system. Correspondingly, the processing module of the network interface card receives the to-be-sent data from the bus system through the communications interface of the network interface card.

Optionally, referring to FIG. 1-2, the to-be-sent data includes S data blocks of an equal length, and S is an integer greater than 0. Referring to FIG. 1-3, the to-be-sent data further includes PI corresponding to each data block, and in the to-be-sent data, the PI corresponding to the data block is located after the data block and closely follows the data block.

Optionally, when a length of each data block in the to-be-sent data is 4 k, the to-be-sent data further includes metadata corresponding to each data block, and the metadata corresponding to the data block in the to-be-sent data is located after the data block. Referring to FIG. 1-4, the PI corresponding to the data block may be located on a left side of the metadata corresponding to the data block. Alternatively, referring to FIG. 1-5, the PI corresponding to the data block may be located on a right side of the metadata corresponding to the data block.

Optionally, an operation of determining the standard payload length L1 of the RDMA packet may be as follows.

When the transmit end and the receive end are located in a same local area network or a same private network, the determined standard payload length L1 may be a preset length, and the preset length may be 4 k, 2 k, 1 k, or the like. When the transmit end and the receive end are not in a same local area network or a same private network, the standard payload length L1 is determined based on a maximum transmission unit length allowed by a public network, and the standard payload length L1 is less than the maximum transmission unit length allowed by the public network. The length of the maximum transmission unit allowed by the public network is 1500. Therefore, the determined standard payload length L1 may be 1 k or the like.

Step 303: When it is determined, based on the first indication information, that the RDMA packet includes the PI, determine whether the standard payload length L1 is greater than a length L2 of the data block in the to-be-sent data, and determine, based on the second indication information, whether the to-be-sent data includes the PI corresponding to the data block.

The standard payload length L1 may be an integer multiple of the length L2 of the data block, or the length L2 of the data block is an integer multiple of the standard payload length L1.

In this step, the processing module in the network interface card reads the IO configuration information from the second memory in the network interface card, where the IO configuration information includes the sequence number of the start packet, the length L2 of the data block, the first indication information, and the second indication information. The processing module in the network interface card determines, based on the first indication information, whether the RDMA packet sent to the receive end includes the PI, when determining that the RDMA packet includes the PI, compares the standard payload length L1 with the length L2 of the data block, and determines, based on the second indication information, whether the to-be-sent data includes the PI corresponding to each data block.

Step 304: When the standard payload length L1 is greater than the length L2 of the data block in the to-be-sent data and the to-be-sent data includes the PI corresponding to the data block, encapsulate x consecutive data blocks and PI corresponding to each of the x data blocks into one RDMA packet in the to-be-sent data, where x=L1/L2, and send the one RDMA packet.

This step includes: obtaining the x data blocks and the PI corresponding to each of the x data blocks from the to-be-sent data, forming a payload part by using the x data blocks and the PI corresponding to each data block, generating the RDMA packet based on the payload part, and a length of the payload part of the RDMA packet is L1+x*L3, and sending the RDMA packet. A detailed implementation process is as follows.

The processing module in the network interface card may read the first data block from the to-be-sent data, calculate a CRC of the first data block based on the first data block, and read PI corresponding to the first data block from the to-be-sent data. When the CRC of the first data block is equal to the PI corresponding to the first data block, the processing module in the network interface card reads the second data block from the to-be-sent data and calculates a CRC of the second data block based on the second data block. When the CRC of the second data block is equal to PI corresponding to the second data block, the processing module in the network interface card continues to read data block and PI from the to-be-sent data in the foregoing manner of reading the second data block until the $x^{th}$ data block and PI corresponding to the $x^{th}$ data block are read. When a CRC of the $x^{th}$ data block is equal to the PI corresponding to the $x^{th}$ data block, the processing module in the network interface card forms a payload part of the RDMA packet by using the first data block and the PI corresponding to the first data block, the second data block and the PI corresponding to the second data block, . . . , and the $x^{th}$ data block and the PI corresponding to the $x^{th}$ data block, and a length of the payload part is L1+L3*x, adds a packet header before the payload part and adds a check part after the payload part to form the first RDMA packet, where the packet header includes a sequence number of a start packet, and sends the first RDMA packet to the receive end through the network port of the network interface card.

After sending the first RDMA packet, the processing module in the network interface card may read the $(x+1)^{th}$ data block from the to-be-sent data, calculate a CRC of the $(x+1)^{th}$ data block based on the $(x+1)^{th}$ data block, and read, from the to-be-sent data, PI corresponding to the $(x+1)^{th}$ data block. When the CRC of the $(x+1)^{th}$ data block is equal to the PI corresponding to the $(x+1)^{th}$ data block, the processing module in the network interface card reads the $(x+2)^{th}$ data block from the to-be-sent data and calculates a CRC of the $(x+2)^{th}$ data block based on the $(x+2)^{th}$ data block. When the CRC of the $(x+2)^{th}$ data block is equal to the PI corresponding to the $(x+2)^{th}$ data block, the processing module in the network interface card continues to read data block and PI from the to-be-sent data in the foregoing manner of reading the $(x+2)^{th}$ data block until the $2x^{th}$ data block and PI corresponding to the $2x^{th}$ data block are read. When a CRC of the $2x^{th}$ data block is equal to the PI corresponding to the $2x^{th}$ data block, the processing module in the network interface card forms a payload part of the RDMA packet by using the $(x+1)^{th}$ data block and the PI corresponding to the $(x+1)^{th}$ data block, the $(x+2)^{th}$ data block and the PI corresponding to the $(x+2)^{th}$ data block, . . . , and the $2x^{th}$ data block and the PI corresponding to the $2x^{th}$ data block, and a length of the payload part is L1+L3*x. The processing module in the network interface card adds a sequence number of the first RDMA packet to obtain a sequence number of the second RDMA packet, adds a packet header before the payload part and adds a check part after the payload part to form the second RDMA packet, where the packet header includes the sequence number of the second RDMA packet, and sends the second RDMA packet to the receive end through the network port of the network interface card.

The processing module of the network interface card continues to read, from the to-be-sent data in the foregoing manner of encapsulating the second RDMA packet, the $(2x+1)^{th}$ data block and PI corresponding to the $(2x+1)^{th}$ data block, the $(2x+2)^{th}$ data block and PI corresponding to the $(2x+2)^{th}$ data block, . . . , and $3x^{th}$ data block and PI corresponding to the $3x^{th}$ data block, encapsulates the $(2x+1)^{th}$ data block and the PI corresponding to the $(2x+1)^{th}$ data block, the $(2x+2)^{th}$ data block and the PI corresponding to the $(2x+2)^{th}$ data block, . . . , and $3x^{th}$ data block and the PI corresponding to the $3x^{th}$ data block into the third RDMA packet in the foregoing manner of encapsulating the second RDMA packet, and sends the third RDMA packet to the receive end through the network port of the network interface card. Then, the RDMA packet continues to be encapsulated until the last data block and PI corresponding to the last data block in the to-be-sent data are encapsulated into an RDMA packet and the RDMA packet is sent to the receive end.

When a CRC of an example data block is not equal to PI corresponding to the data block, it indicates that a data error occurs in the to-be-sent data. In this case, the to-be-sent data may stop to be sent to the receiving end. In other words, the method procedure of this embodiment ends.

When a quantity S of data blocks included in the to-be-sent data is an integer multiple of x, the encapsulated last RDMA packet includes x data blocks and PI corresponding to each data block. When a quantity S of data blocks included in the to-be-sent data is not an integer multiple of x, both a quantity of data blocks included in the encapsulated last RDMA packet and an amount of PI included in the encapsulated last RDMA packet are less than x.

Optionally, the processing module of the network interface card may need to perform a plurality of times of read operations to read one data block from the to-be-sent data and can calculate a CRC of the data block only after performing a plurality of times of CRC calculation operations. A total length of data read for a plurality of times is equal to the length L2 of the data block. Details are as follows.

The processing module of the network interface card reads data at the first time from a start position of the to-be-sent data, performs the first calculation based on the data read at the first time to obtain a CRC, and sets a length of a target data as a length of the data read at the first time; continues to read data from the to-be-sent data at the second time, performs the second calculation based on the data read at the second time and the CRC calculated at the first time to obtain a CRC, and adds a length of the data read at the second time to the length of the target data; continues to read data from the to-be-sent data at the third time, and performs the third calculation based on the data read at the third time and the CRC calculated at the second time to obtain a CRC; . . . ; and reads data from the to-be-sent data at the $P^{th}$ time, performs the $P^{th}$ calculation based on the data read at the $P^{th}$ time and a CRC calculated at the $(P-1)^{th}$ time to obtain a CRC, and adds a length of the data read at the $P^{th}$ time to the length of the target data, where P=4, 5, 6, . . . , or the like. When the increased data length is equal to L2, it indicates that the first data block is read from the to-be-sent data and that the CRC calculated at the $P^{th}$ time is the CRC of the first data block, and the processing module of the network interface card continues to read data of L3 bytes from the to-be-sent data, where the data of L3 bytes is the PI corresponding to the first data block.

Then, the processing module of the network interface card continues to read remaining data in the to-be-sent data for a plurality of times to obtain the second data block. A process of the plurality of times of reading is as follows. The processing module reads data from remaining data at the first time, performs the first calculation based on the data read at the first time to obtain a CRC, and sets a length of a target data as a length of the data read at the first time; continues to read data from the to-be-sent data at the second time, performs the second calculation based on the data read at the second time and the CRC calculated at the first time to obtain a CRC, and adds a length of the data read at the second time to the length of the target data; . . . ; and reads data from the to-be-sent data at the $P^{th}$ time, performs the $P^{th}$ calculation based on the data read at the $P^{th}$ time and a CRC calculated at the $(P-1)^{th}$ time to obtain a CRC, and adds a length of the data read at the $P^{th}$ time to the length of the target data. When the increased data length is equal to L2, it indicates that the second data block is read from the to-be-sent data and the CRC calculated for the $P^{th}$ time is the CRC of the second data block, and the processing module of the network interface card continues to read data of L3 bytes from the to-be-sent data, where the data of L3 bytes is the PI information of the second data block. The foregoing process of reading the second data block and the PI corresponding to the second data block is repeated until all the to-be-sent data is read.

For example, referring to FIG. 1-3, it is assumed that the length L2 of the data block in the to-be-sent data is 512, the to-be-sent data includes eight data blocks that are respectively A1, A2, . . . , and A8, and PI corresponding to the eight data blocks are respectively PI1, PI2, . . . , and PI8. It is assumed that the determined standard payload length L1 is 1 k. In this case, x is 2. The processing module of the network interface card reads the first data block A1 from the to-be-sent data shown in FIG. 1-3, calculates a CRC1 of the first data block A1 based on the first data block A1, and reads, from the to-be-sent data shown in FIG. 1-3, PH corresponding to the first data block A1. When the CRC1 is equal to the PI1, the processing module of the network interface card reads the second data block A2 from the to-be-sent data shown in FIG. 1-3, calculates a CRC2 of the second data block A2 based on the second data block A2, and reads, from the to-be-sent data shown in FIG. 1-3, PI2 corresponding to the second data block A2. When the CRC2 is equal to the PI2, the processing module of the network interface card forms a payload part of the RDMA packet by using the A1, the PI1, the A2, and the PI2, and a length of the payload part is 1 k+2*L3. Referring to FIG. 3-2, the processing module of the network interface card adds a packet header before the payload part and adds a check part after the payload part to form the first RDMA packet B1, where the packet header includes a sequence number of a start packet, and it is assumed that the sequence number is 1 and sends the first RDMA packet to the receive end through the network port of the network interface card.

The processing module of the network interface card continues to read the third data block A3 from the to-be-sent data shown in FIG. 1-3, calculates a CRC3 of the third data block A3 based on the third data block A3, and reads, from the to-be-sent data shown in FIG. 1-3, PI3 corresponding to the third data block A3. When the CRC3 is equal to the PI3, the processing module of the network interface card reads the fourth data block A4 from the to-be-sent data shown in FIG. 1-3, calculates a CRC4 of the fourth data block A4 based on the fourth data block A4, and reads, from the to-be-sent data shown in FIG. 1-3, PI4 corresponding to the fourth data block A4. When the CRC4 is equal to the PI4, the processing module of the network interface card forms a payload part of the RDMA packet by using the A3, the PI3, the A4, and the PI4, and a length of the payload part is 1 k+2*L3 and increases the sequence number of the first RDMA packet by 1 to obtain a sequence number 2 of the second RDMA packet. Referring to FIG. 3-2, the processing module of the network interface card adds a packet header before the payload part and adds a check part after the payload part to form the second RDMA packet B2, where the packet header includes the sequence number 2 of the second RDMA packet and sends the second RDMA packet to the receive end through the network port of the network interface card. As shown in FIG. 3-2, the processing module of the network interface card continues to process in the foregoing manner of encapsulating the second RDMA packet, to obtain and send the third RDMA packet B3 and the fourth RDMA packet B4.

For another example, it is assumed that the determined standard payload length L1 is 2 k, and in this case, x=4. The processing module of the network interface card reads the first data block A1 from the to-be-sent data shown in FIG. 1-3, calculates a CRC1 of the first data block A1 based on the first data block A1, and reads, from the to-be-sent data shown in FIG. 1-3, PH corresponding to the first data block A1. When the CRC1 is equal to the PI1, the processing module of the network interface card reads the second data block A2 from the to-be-sent data shown in FIG. 1-3, calculates a CRC2 of the second data block A2 based on the second data block A2, and reads, from the to-be-sent data shown in FIG. 1-3, PI2 corresponding to the second data block A2. When the CRC2 is equal to the PI2, the processing module of the network interface card reads the third data block A3 from the to-be-sent data shown in FIG. 1-3, calculates a CRC3 of the third data block A3 based on the third data block A3, and reads, from the to-be-sent data shown in FIG. 1-3, PI3 corresponding to the third data block A3. When the CRC3 is equal to the PI3, the processing module of the network interface card reads the fourth data block A4 from the to-be-sent data shown in FIG. 1-3, calculates a CRC4 of the fourth data block A4 based on the fourth data block A4, and reads, from the to-be-sent data shown in FIG. 1-3, PI4 corresponding to the fourth data block A4. When the CRC4 is equal to the PI4, the processing module of the network interface card forms a payload part of the RDMA packet by using the A1, the PI1, the A2, the PI2, the A3, the PI3, the A4, and the PI4, and a length of the payload part is 2 k+4*L3. Referring to FIG. 3-3, the processing module of the network interface card adds a packet header before the payload part and adds a check part after the payload part to form the first RDMA packet C1, where the packet header includes a sequence number of a start packet, and it is assumed that the sequence number is 1 and sends the first RDMA packet C1 to the receive end through the network port of the network interface card.

The processing module of the network interface card reads the fifth data block A5 from the to-be-sent data shown in FIG. 1-3, calculates a CRC5 of the fifth data block A5 based on the fifth data block A5, and reads, from the to-be-sent data shown in FIG. 1-3, PI5 corresponding to the fifth data block A5. When the CRC5 is equal to the PI5, the processing module of the network interface card reads the sixth data block A6 from the to-be-sent data shown in FIG. 1-3, calculates a CRC6 of the sixth data block A6 based on the sixth data block A6, and reads, from the to-be-sent data shown in FIG. 1-3, PI6 corresponding to the sixth data block A6. When the CRC6 is equal to the PI6, the processing module of the network interface card reads the seventh data block A7 from the to-be-sent data shown in FIG. 1-3, calculates a CRC7 of the seventh data block A7 based on the seventh data block A7, and reads, from the to-be-sent data shown in FIG. 1-3, PI7 corresponding to the seventh data block A7. When the CRC7 is equal to the PI7, the processing module of the network interface card reads the eighth data block A8 from the to-be-sent data shown in FIG. 1-3, calculates a CRC8 of the eighth data block A8 based on the eighth data block A8, and reads, from the to-be-sent data shown in FIG. 1-3, PI8 corresponding to the eighth data block A8. When the CRC8 is equal to the PI8, the processing module of the network interface card forms a payload part of the RDMA packet by using the A5, the PI5, the A6, the PI6, the A7, the PI7, the A8, and the PI8, and a length of the payload part is 2 k+4*L3 and increases the sequence number of the first RDMA packet by 1 to obtain a sequence number 2 of the second RDMA packet. Referring to FIG. 3-3, the processing module of the network interface card adds a packet header before the payload part and adds a check part after the payload part to form the second RDMA packet C2, where the packet header includes the sequence number 2 of the second RDMA packet C2 and sends the second RDMA packet C2 to the receive end through the network port of the network interface card.

For another example, it is assumed that the determined standard payload length L1 is 4 k, and in this case, x=8. The processing module of the network interface card reads the first data block A1 from the to-be-sent data shown in FIG. 1-3, calculates a CRC1 of the first data block A1 based on the first data block A1, and reads, from the to-be-sent data shown in FIG. 1-3, PI1 corresponding to the first data block A1. When the CRC1 is equal to the PI1, the processing module of the network interface card continues to read, from the to-be-sent data according to the foregoing processing process, the second data block A2 and PI2 corresponding to the second data block A2, the third data block A3 and PI3 corresponding to the third data block A3, . . . , and the eighth data block A8 and PI8 corresponding to the eighth data block A8, forms a payload part of the RDMA packet by using the A1, the PI1, the A2, the PI2, the A3, the PI3, the A4, the PI4, the A5, the PI5, the A6, the PI6, the A7, the PI7, the A8, and the PI8, and a length of the payload part is 4 k+8*L3, adds a packet header before the payload part and adds a check part after the payload part to form one RDMA packet, where the packet header includes a sequence number of a start packet, and sends the RDMA packet to the receive end through the network port of the network interface card.

Step 305: When the standard payload length L1 is greater than the length L2 of the data block in the to-be-sent data and the to-be-sent data does not include the PI corresponding to the data block, obtain x consecutive data blocks and PI corresponding to each of the x data blocks, and encapsulate the x consecutive data blocks and the PI corresponding to each data block into one RDMA packet in the to-be-sent data, where x=L1/L2, and send the one RDMA packet.

This step includes: obtaining the x data blocks from the to-be-sent data, to generate the PI corresponding to each of the x data blocks, forming a payload part by using the x data blocks and the PI corresponding to each data block, generating the RDMA packet based on the payload part, and a length of the payload part of the RDMA packet is L1+x*L3, and sending the RDMA packet. A detailed implementation process is as follows.

The processing module in the network interface card may: read the first data block from the to-be-sent data, calculate a CRC of the first data block based on the first data block, and use the CRC of the first data block as PI corresponding to the first data block; read the second data block from the to-be-sent data, calculate a CRC of the second data block based on the second data block, and use the CRC of the second data block as PI corresponding to the second data block; continue to read a data block from the to-be-sent data in the foregoing manner of reading the second data block until the $x^{th}$ data block is read and PI corresponding to the $x^{th}$ data block is obtained, to form a payload part of the packet by using the first data block and the PI corresponding to the first data block, the second data block and the PI corresponding to the second data block, . . . , and the $x^{th}$ data block and the PI corresponding to the $x^{th}$ data block, where a length of the payload part is L1+L3*x; and add a packet header before the payload part and add a check part after the payload part to form the first RDMA packet, where the packet header includes a sequence number of a start packet, and send the first RDMA packet to the receive end through the network port of the network interface card.

After sending the first RDMA packet, the processing module in the network interface card may read the $(x+1)^{th}$ data block from the to-be-sent data, calculate a CRC of the $(x+1)^{th}$ data block based on the $(x+1)^{th}$ data block, and use the CRC of the $(x+1)^{th}$ data block as PI corresponding to the $(x+1)^{th}$ data block; read the $(x+2)^{th}$ data block from the to-be-sent data, calculate a CRC of the $(x+2)^{th}$ data block based on the $(x+2)^{th}$ data block, and use the CRC of the $(x+2)^{th}$ data block as PI corresponding to the $(x+2)^{th}$ data block; continue to read a data block from the to-be-sent data in the foregoing manner of reading the $(x+2)^{th}$ data block until the $2x^{th}$ data block is read and PI corresponding to the $2x^{th}$ data block is obtained, to form a payload part of the RDMA packet by using the $(x+1)^{th}$ data block and the PI corresponding to the $(x+1)^{th}$ data block, the $(x+2)^{th}$ data block and the PI corresponding to the $(x+2)^{th}$ data block, . . . , and the $2x^{th}$ data block and the PI corresponding to the $2x^{th}$ data block, where a length of the payload part is L1+L3*x; and add a sequence number of the first RDMA packet to obtain a sequence number of the second RDMA packet, add a packet header before the payload part and add a check part after the payload part to form the first RDMA packet, where the packet header includes the sequence number of the second RDMA packet, and send the second RDMA packet to the receive end through the network port of the network interface card.

After sending the second RDMA packet, the processing module of the network interface card continues to read the $(2x+1)^{th}$ data block and obtain PI corresponding to the $(2x+1)^{th}$ data block, read the $(2x+2)^{th}$ data block and obtain PI corresponding to the $(2x+2)^{th}$ data block, ..., and read $3x^{th}$ data block and obtain PI corresponding to the $3x^{th}$ data block from the to-be-sent data in the foregoing manner of encapsulating the second RDMA packet, encapsulates the $(2x+1)^{th}$ data block and the PI corresponding to the $(2x+1)^{th}$ data block, the $(2x+2)^{th}$ data block and the PI corresponding to the $(2x+2)^{th}$ data block, ..., and $3x^{th}$ data block and the PI corresponding to the $3x^{th}$ data block into the third RDMA packet in the foregoing manner of processing the second RDMA packet, and sends the third RDMA packet to the receive end through the network port of the network interface card. Then, the RDMA packet continues to be encapsulated until the last data block and PI corresponding to the last data block in the to-be-sent data are encapsulated into an RDMA packet and the RDMA packet is sent to the receive end.

Optionally, the processing module of the network interface card may need to perform a plurality of times of read operations to read one data block from the to-be-sent data and can calculate a CRC of the data block only after performing a plurality of times of CRC calculation operations. For a detailed implementation operation, refer to related content in step 304. Details are not described herein again.

For example, referring to FIG. 1-2, it is assumed that the length L2 of the data block in the to-be-sent data is 512, and the to-be-sent data includes eight data blocks that are respectively A1, A2, ..., and A8. It is assumed that the determined standard payload length L1 is 1 k. In this case, x is 2. The processing module of the network interface card reads the first data block A1 from the to-be-sent data shown in FIG. 1-2, calculates a CRC1 of the first data block A1 based on the first data block A1, and uses the CRC1 as PH corresponding to the first data block A1; reads the second data block A2 from the to-be-sent data shown in FIG. 1-2, calculates a CRC2 of the second data block A2 based on the second data block A2, and uses the CRC2 as PI2 corresponding to the second data block A2; and forms a payload part of the RDMA packet by using the A1, the PH, the A2, and the PI2, and a length of the payload part is 1 k+2*L3. Referring to FIG. 3-2, the processing module of the network interface card adds a packet header before the payload part and adds a check part after the payload part to form the first RDMA packet B1, where the packet header includes a sequence number 1 of a start packet and sends the first RDMA packet to the receive end through the network port of the network interface card.

The processing module of the network interface card reads the third data block A3 from the to-be-sent data shown in FIG. 1-2, calculates a CRC3 of the third data block A3 based on the third data block A3, and uses the CRC3 as PI3 corresponding to the third data block A3; reads the fourth data block A4 from the to-be-sent data shown in FIG. 1-2, calculates a CRC4 of the fourth data block A4 based on the fourth data block A4, and uses the CRC4 as PI4 corresponding to the fourth data block A4; forms a payload part of the RDMA packet by using the A3, the PI3, the A4, and the PI4, and a length of the payload part is 1 k+16; and increases the sequence number of the first RDMA packet by 1 to obtain a sequence number 2 of the second RDMA packet. Referring to FIG. 3-2, the processing module of the network interface card adds a packet header before the payload part and adds a check part after the payload part to form the second RDMA packet B2, where the packet header includes the sequence number 2 of the second RDMA packet and sends the second RDMA packet to the receive end through the network port of the network interface card. As shown in FIG. 3-2, the processing module of the network interface card continues to process in the foregoing manner of encapsulating the second RDMA packet, to obtain and send the third RDMA packet B3 and the fourth RDMA packet B4.

For another example, it is assumed that the determined standard payload length L1 is 2 k, and in this case, x=4. The processing module of the network interface card reads the first data block A1 from the to-be-sent data shown in FIG. 1-2, calculates a CRC1 of the first data block A1 based on the first data block A1, and uses the CRC1 as PH corresponding to the first data block A1; reads the second data block A2 from the to-be-sent data shown in FIG. 1-2, calculates a CRC2 of the second data block A2 based on the second data block A2, and uses the CRC2 as PI2 corresponding to the second data block A2; reads the third data block A3 from the to-be-sent data shown in FIG. 1-2, calculates a CRC3 of the third data block A3 based on the third data block A3, and uses the CRC3 as PI3 corresponding to the third data block A3; reads the fourth data block A4 from the to-be-sent data shown in FIG. 1-2, calculates a CRC4 of the fourth data block A4 based on the fourth data block A4, and uses the CRC4 as PI4 corresponding to the fourth data block A4; and forms a payload part of the RDMA packet by using the A1, the PI1, the A2, the PI2, the A3, the PI3, the A4, and the PI4, and a length of the payload part is 2 k+4*L3. Referring to FIG. 3-3, the processing module of the network interface card adds a packet header before the payload part and adds a check part after the payload part to form the first RDMA packet C1, where the packet header includes a sequence number 1 of a start packet and sends the first RDMA packet C1 to the receive end through the network port of the network interface card.

The processing module of the network interface card reads the fifth data block A5 from the to-be-sent data shown in FIG. 1-2, calculates a CRC5 of the fifth data block A5 based on the fifth data block A5, and uses the CRC5 as PI5 corresponding to the fifth data block A5; reads the sixth data block A6 from the to-be-sent data shown in FIG. 1-2, calculates a CRC6 of the sixth data block A6 based on the sixth data block A6, and uses the CRC6 as PI6 corresponding to the sixth data block A6; reads the seventh data block A7 from the to-be-sent data shown in FIG. 1-2, calculates a CRC7 of the seventh data block A7 based on the seventh data block A7, and uses the CRC7 as PI7 corresponding to the seventh data block A7; reads the eighth data block A8 from the to-be-sent data shown in FIG. 1-2, calculates a CRC8 of the eighth data block A8 based on the eighth data block A8, and uses the CRC8 as PI8 corresponding to the eighth data block A8; forms a payload part of the RDMA packet by using the A5, the PI5, the A6, the PI6, the A7, the PI7, the A8, and the PI8, and a length of the payload part is 2 k+4*L3; and increase the sequence number of the first RDMA packet by 1 to obtain a sequence number 2 of the second RDMA packet. Referring to FIG. 3-3, the processing module of the network interface card adds a packet header before the payload part and adds a check part after the payload part to form the second RDMA packet C2, where the packet header includes the sequence number 2 of the second packet and sends the second packet C2 to the receiving end through the network port of the network interface card.

For another example, it is assumed that the determined standard payload length L1 is 4 k, and in this case, x=8. The processing module of the network interface card reads the first data block A1 from the to-be-sent data shown in FIG. 1-2, calculates a CRC1 of the first data block A1 based on the first data block A1, and uses the CRC1 as PH corresponding to the first data block A1; and obtains the second data block A2 and PI2 corresponding to the second data block A2, the third data block A3 and PI3 corresponding to the third data block A3, . . . , and the eighth data block A8 and PI8 corresponding to the eighth data block A8 in the foregoing manner of obtaining the first data block A1. The processing module of the network interface card forms a payload part of the RDMA packet by using the A1, the PH, the A2, the PI2, the A3, the PI3, the A4, the PI4, the A5, the PI5, the A6, the PI6, the A7, the PI7, the A8, and the PI8, and a length of the payload part is 2 k+8*L3, adds a packet header before the payload part and adds a check part after the payload part to form one RDMA packet, where the packet header includes a sequence number of a start packet, and sends the RDMA packet to the receive end through the network port of the network interface card.

When the standard payload length L1 is greater than the length L2 of the data block, the payload part of each encapsulated RDMA packet includes the x data blocks and the PI corresponding to each data block, and the payload part of each RDMA packet has a same structure. Therefore, the receive end can process each RDMA packet by using only one type of processing logic, to obtain the data block and the PI corresponding to the data block. This reduces difficulty of processing the RDMA packet and reduces time consumption for processing the RDMA packet at the receive end.

Step 306: When the standard payload length L1 is less than or equal to the length L2 of the data block in the to-be-sent data and the to-be-sent data includes the PI corresponding to the data block, encapsulate one data block and PI corresponding to the data block in the to-be-sent data into y RDMA packets, where y=L2/L1, and send they RDMA packets.

This step includes: obtaining data from a start position of the one data unit in the to-be-sent data, when data of 1/y of the data unit is obtained, forming a payload part by using the data of 1/y of the data unit, generating the RDMA packet based on the payload part, where the data unit includes one data block and PI corresponding to the one data block, and a length of the payload part of the RDMA packet is L1+L3/y, in other words, a length of the data of 1/y of the data unit is L1+L3/y, and sending the RDMA packet. A detailed implementation is as follows.

The processing module in the network interface card may read data whose length is L1+L3/y from the start position in the to-be-sent data, calculate the first CRC based on the data whose length is L1+L3/y, use the data whose length is L1+L3/y as the payload part of the RDMA packet, add a packet header before the payload part and add a check part after the payload part to form the first RDMA packet, where the packet header of the first RDMA packet includes a sequence number of a start packet, and send the first RDMA packet to the receive end through the network port of the network interface card. The processing module in the network interface card continues to read data whose length is L1+L3/y from the to-be-sent data, calculates the second CRC based on the data whose length is L1+L3/y and the first CRC, uses the data whose length is L1+L3/y as the payload part of the RDMA packet, adds a sequence number of the first RDMA packet to obtain a sequence number of the second RDMA packet, adds a packet header before the payload part and adds a check part after the payload part to form the second RDMA packet, and sends the second RDMA packet to the receive end through the network port of the network interface card; and continues to generate and send the third RDMA packet and calculate the third CRC in the foregoing manner of encapsulating the second RDMA packet, and generate and send the fourth RDMA packet and calculate the fourth CRC until the $(y-1)^{th}$ RDMA packet is generated and sent and the $(y-1)^{th}$ CRC value is calculated. The processing module in the network interface card may read data whose length is L1+L3/y−L3 from remaining data in the to-be-sent data. In this way, after the first data block is read, a CRC of the first data block is calculated based on the data whose length is L1+L3/y−L3 and the $(y-1)^{th}$ CRC value. The processing module in the network interface card may read data of L3 bytes from the remaining data in the to-be-sent data, where the data of L3 bytes is PI corresponding to the first data block. When the CRC of the first data block is equal to the PI corresponding to the first data block, the processing module in the network interface card adds a sequence number of the $(y-1)^{th}$ RDMA packet to obtain a sequence number of the $y^{th}$ RDMA packet, forms a payload part of the $y^{th}$ RDMA packet by using the data whose length is L1+L3/y−L3 and the PI of the first data block, adds a packet header before the payload part and adds a check part after the payload part to form the $y^{th}$ RDMA packet, where the packet header includes the sequence number of the $y^{th}$ RDMA packet, and sends the $y^{th}$ RDMA packet to the receive end through the network port of the network interface card.

The processing module in the network interface card continues to read, from the to-be-sent data, data whose length is L1+L3/y, calculates the first CRC based on the data whose length is L1+L3/y, adds a sequence number of the most recently generated RDMA packet to obtain a sequence number of the first RDMA packet, uses the data whose length is L1+L3/y as the payload part of the RDMA packet, adds a packet header before the payload part and adds a check part after the payload part to form the first RDMA packet, where the packet header of the first RDMA packet includes a sequence number of the first RDMA packet, and sends the first RDMA packet to the receive end through the network port of the network interface card. The processing module in the network interface card continues to read data whose length is L1+L3/y from the to-be-sent data, calculates the second CRC based on the data whose length is L1+L3/y and the first CRC, uses the data whose length is L1+L3/y as the payload part of the RDMA packet, adds a sequence number of the first RDMA packet to obtain a sequence number of the second RDMA packet, adds a packet header before the payload part and adds a check part after the payload part to form the second RDMA packet, and sends the second RDMA packet to the receive end through the network port of the network interface card; and continues to generate and send the third RDMA packet and calculate the third CRC in the foregoing manner of encapsulating the second RDMA packet, and generate and send the fourth RDMA packet and calculate the fourth CRC until the $(y-1)^{th}$ RDMA packet is generated and sent and the $(y-1)^{th}$ CRC value is calculated. The processing module in the network interface card may read data whose length is L1+L3/y−L3 from remaining data in the to-be-sent data. In this way, after the second data block is read, a CRC of the second data block is calculated based on the data whose length is L1+L3/y−L3 and the (y−1)$^{th}$ CRC value. The processing module in the network interface card may read data of L3 bytes from the remaining data in the to-be-sent data, where the data of L3 bytes is PI corresponding to the second data block. When the CRC of the second data block is equal to the PI corresponding to the second data block, the processing module in the network interface card adds a sequence number of the (y−1)$^{th}$ RDMA packet to obtain a sequence number of the y$^{th}$ RDMA packet, forms a payload part of the y$^{th}$ RDMA packet by using the data whose length is L1+L3/y−L3 and the PI of the second data block, adds a packet header before the payload part and adds a check part after the payload part to form the y$^{th}$ RDMA packet, where the packet header includes the sequence number of the y$^{th}$ RDMA packet, and sends the y$^{th}$ RDMA packet to the receive end through the network port of the network interface card. The foregoing process of performing execution on the second data block continues to be performed, and each of other data blocks in the to-be-sent data is encapsulated into y RDMA packets and sent to the receive end.

Optionally, when the length of the data block in the to-be-sent data is 4 k, the standard payload length L1 is usually less than or equal to the length L2 of the data block, and the IO configuration information stored in the second memory of the network interface card further includes position relationship information between metadata and PI that are corresponding to the data block. The processing module of the network interface card may determine, based on the position relationship information, a position relationship between the metadata and the PI that are corresponding to the data block.

Optionally, when it is determined that the PI corresponding to the data block is located on the left side of the metadata corresponding to the data block, for any data block in the to-be-sent data, the data block and PI corresponding to the data block may be encapsulated into y RDMA packets, and a length of the payload part of the RDMA packet is L1+L3/y.

Figures 3, 4:
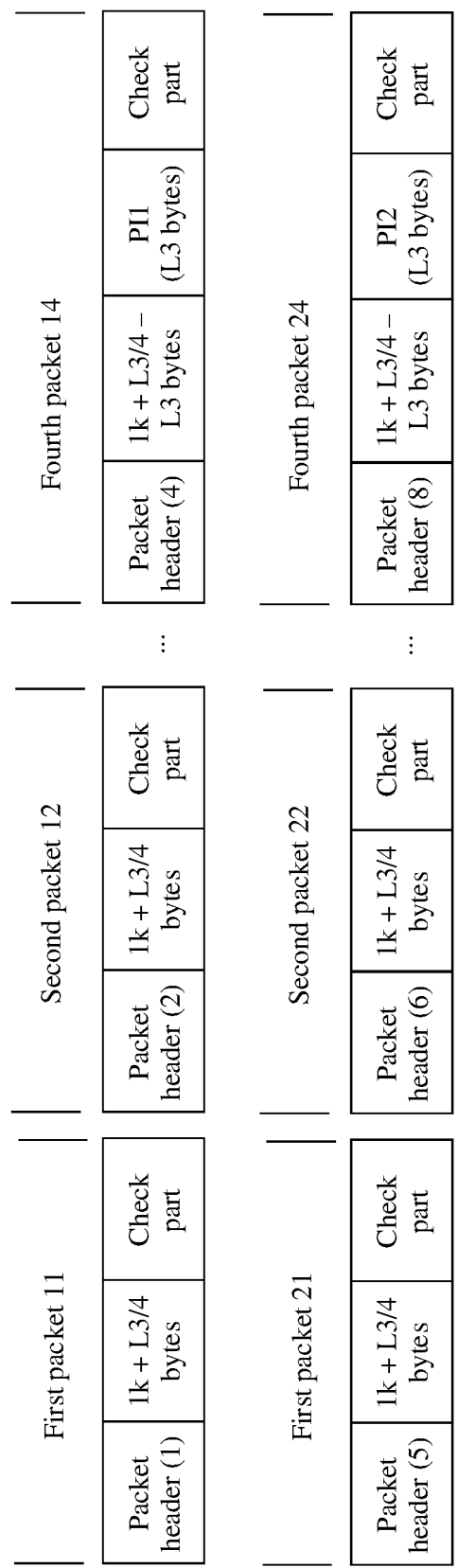

For example, referring to the to-be-sent data shown in FIG. 1-4, a length of the data block in the to-be-sent data is 4 k. It is assumed that the determined standard payload length L1 is 1 k. In this case, y=4, and a length of the payload part of the RDMA packet is 1 k+L3/4. The processing module in the network interface card may read data of 1 k+L3/4 bytes from a start position in the to-be-sent data shown in FIG. 1-4, calculate the first CRC based on the data of the 1 k+L3/4 bytes, use the data of 1 k+L3/4 bytes as a payload part of the RDMA packet. As shown in FIG. 3-4, the processing module in the network interface card adds a packet header before the payload part and adds a check part after the payload part, to form the first RDMA packet 11, where the packet header includes a sequence number of a start packet, and it is assumed that the sequence number is 1, and sends the first RDMA packet 11 to the receive end through the network port of the network interface card. The processing module in the network interface card continues to read data of 1 k+L3/4 bytes from the to-be-sent data, calculates the second CRC based on the data of 1 k+L3/4 bytes and the first CRC, uses the data of 1 k+L3/4 bytes as a payload part of the RDMA packet, increases a sequence number of the first RDMA packet 11 by 1 to obtain a sequence number 2 of the second RDMA packet 12, adds a packet header before the payload part and adds a check part after the payload part to form the second RDMA packet 12, where the packet header includes the sequence number 2 of the second RDMA packet 12, and sends the second RDMA packet 12 to the receive end through the network port of the network interface card; and continues to generate and send the third RDMA packet 13 and calculate the third CRC based on the foregoing description. Then, the processing module in the network interface card may read data of 1 k+L3/4−L3 bytes from remaining data in the to-be-sent data. In this way, after the first data block A1 is read, a CRC of the first data block A1 is calculated based on the data of 1 k+L3/4−L3 bytes and the third CRC. The processing module in the network interface card may read data of L3 bytes from the remaining data in the to-be-sent data, where the data of L3 bytes is PI corresponding to the first data block A1. When a CRC value corresponding to the first data block A1 is equal to the PI, the processing module in the network interface card increases a sequence number of the third RDMA packet 13 by 1 to obtain a sequence number 4 of the fourth RDMA packet 14, forms a payload part of the fourth RDMA packet 14 by using the data of 1 k+L3/4−L3 bytes and the PI corresponding to the first data block A1, adds a packet header before the payload part and adds a check part after the payload part to form the fourth RDMA packet 14, where the packet header includes the sequence number 4 of the fourth RDMA packet 14, and sends the fourth RDMA packet 14 to the receive end through the network port of the network interface card.

The processing module in the network interface card continues to read metadata 1 of L4 bytes from the to-be-sent data shown in FIG. 1-4, where the metadata 1 of the L4 bytes may be discarded, continues to read data of 1 k+L3/4 bytes from the to-be-sent data shown in FIG. 1-4, calculates the first CRC based on the data of 1 k+L3/4 bytes, uses the data of 1 k+L3/4 bytes as a payload part of the first RDMA packet 21 and increases a sequence number 4 of the most recently sent RDMA packet by 1 to obtain a sequence number 5 of the first RDMA packet 21. As shown in FIG. 3-4, the processing module in the network interface card adds a packet header before the payload part and adds a check part after the payload part to form the first RDMA packet 21, where the packet header includes the sequence number 5 of the first RDMA packet 21 and sends the first RDMA packet 21 to the receive end through the network port of the network interface card. The processing module in the network interface card continues to read data of 1 k+L3/4 bytes from the to-be-sent data, calculates the second CRC based on the data of 1 k+L3/4 bytes and the first CRC, uses the data of 1 k+L3/4 bytes as a payload part of the packet, increases a sequence number of the first RDMA packet 21 by 1 to obtain a sequence number 6 of the second RDMA packet 22, adds a packet header before the payload part and adds a check part after the payload part to form the second RDMA packet 22, where the packet header includes the sequence number 6 of the second RDMA packet, and sends the second RDMA packet 22 to the receive end through the network port of the network interface card; and continues to generate and send the third RDMA packet 23 and calculate the third CRC based on the foregoing description. Then, the processing module in the network interface card may read data of 1 k+L3/4−L3 bytes from remaining data in the to-be-sent data. In this way, after the second data block A2 is read, a CRC of the second data block A2 is calculated based on the data of 1 k+L3/4−L3 bytes and the third CRC. The processing module in the network interface card may read data of L3 bytes from the remaining data in the to-be-sent data, where the data of L3 bytes is PI corresponding to the second data block A2. When a CRC value corresponding to the second data block A2 is equal to the PI, the processing module in the network interface card increases a sequence number of the third RDMA packet 23 by 1 to obtain a sequence number 8 of the fourth RDMA packet 24, forms a payload part of the fourth RDMA packet 24 by using the data of 1 k+L3/4−L3 bytes and the PI corresponding to the second data block A2, adds a packet header before the payload part and adds a check part after the payload part to form the fourth RDMA packet 24, where the packet header includes the sequence number 8 of the fourth RDMA packet 24, and sends the fourth RDMA packet 24 to the receive end through the network port of the network interface card.

Figures 3, 4, 5:
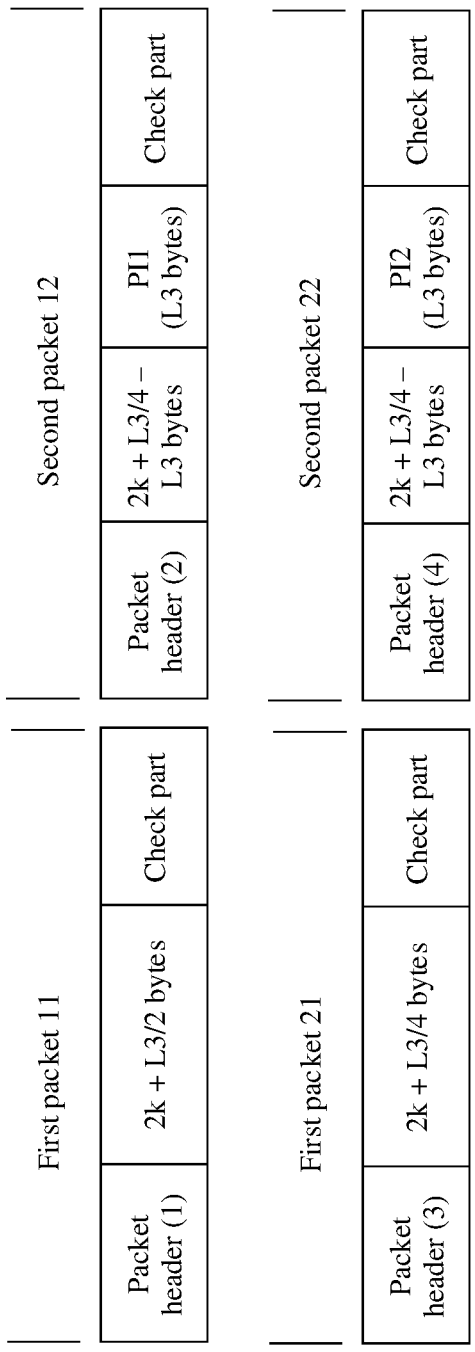

For another example, referring to the to-be-sent data shown in FIG. 1-4, a length of the data block in the to-be-sent data is 4 k. It is assumed that the determined standard payload length L1 is 2 k. In this case, y=2, and a length of the payload part of the RDMA packet is 2 k+L3/2. Referring to FIG. 3-5, the processing module of the network interface card encapsulates the first data block A1 and PH corresponding to the first data block A1 into the first RDMA packet 11 and the second RDMA packet 12. A payload part of the first RDMA packet 11 includes data whose front length is 2 k+L3/2 in the first data block A1. A payload part of the second RDMA packet 12 includes remaining data whose length is 2 k+L3/2−L3 in the first data block A1 and the PH whose length is L3 corresponding to the first data block A1. In addition, the processing module of the network interface card encapsulates the second data block A2 and PI2 corresponding to the second data block A2 into the first RDMA packet 21 and the second RDMA packet 22. A payload part of the first RDMA packet 21 includes data whose front length is 2 k+L3/2 of the second data block A2. A payload part of the second RDMA packet 22 includes remaining data whose length is 2 k+L3/2−L3 in the second data block A2 and the PI2 whose length is L3 corresponding to the second data block A2.

For another example, referring to the to-be-sent data shown in FIG. 1-4, a length of the data block in the to-be-sent data is 4 k. It is assumed that the determined standard payload length L1 is 4 k. In this case, y=1, and a length of the payload part of the RDMA packet is 4 k+L3. Referring to FIG. 3-6, the processing module of the network interface card encapsulates the first data block A1 and the PI1 corresponding to the first data block A1 into the first RDMA packet 1. A payload part of the first RDMA packet 1 includes the first data block A1 and the PH whose length is L3 corresponding to the first data block A1. The processing module of the network interface card encapsulates the second data block A2 and the PI2 corresponding to the second data block A2 into the second RDMA packet 2. A payload part of the second RDMA packet 2 includes the second data block A2 and the PI2 whose length is L3 corresponding to the second data block A2.

Optionally, when it is determined that the PI corresponding to the data block is located on the right side of the metadata corresponding to the data block, for any data block in the to-be-sent data, the data block, the metadata corresponding to the data block, and the PI corresponding to the data block may be encapsulated into y RDMA packets. In other words, a length of the payload part of the RDMA packet is L1+(L4+L3)/y, where L4 is a length of the metadata.

For example, referring to the to-be-sent data shown in FIG. 1-5, a length of the data block in the to-be-sent data is 4 k. It is assumed that the determined payload length L1 is 1 k. In this case, x=4, and a length of the payload part of the RDMA packet is 1 k+(L4+L3)/4. The processing module in the network interface card may read data of 1 k+(L4+L3)/4 bytes from a start position in the to-be-sent data shown in FIG. 1-5, calculate the first CRC based on the data of the 1 k+(L4+L3)/4 bytes, and use the data of 1 k+(L4+L3)/4 bytes as a payload part of the RDMA packet. As shown in FIG. 3-7, the processing module in the network interface card adds a packet header before the payload part and adds a check part after the payload part, to form the first RDMA packet 11, where the packet header includes a sequence number of a start packet, and it is assumed that the sequence number is 1 and sends the first RDMA packet 11 to the receive end through the network port of the network interface card. The processing module in the network interface card continues to read data of 1 k+(L4+L3)/4 bytes from the to-be-sent data, calculates the second CRC based on the data of 1 k+(L4+L3)/4 bytes and the first CRC, increases a sequence number of the first RDMA packet 11 by 1 to obtain a sequence number 2 of the second RDMA packet 12, uses the data of 1 k+(L4+L3)/4 bytes as a payload part of the RDMA packet, adds a packet header before the payload part and adds a check part after the payload part to form the second RDMA packet 12, where the packet header of the second RDMA packet 12 includes the sequence number of the second RDMA packet 12, and sends the second RDMA packet 12 to the receive end through the network port of the network interface card; and continues to generate and send the third RDMA packet 13 and calculate the third CRC based on the foregoing description. Then, the processing module in the network interface card may read data of 1 k+(L4+L3)/4−L3 bytes from remaining data in the to-be-sent data. In this way, after the first data block A1 and the metadata 1 of the first data block A1 are read, a CRC corresponding to the first data block A1 is calculated based on the data of 1 k+(L4+L3)/4−L3 bytes and the third CRC. The processing module in the network interface card may read data of L3 bytes from the remaining data in the to-be-sent data, where the data of L3 bytes is the PH corresponding to the first data block A1. When a CRC value corresponding to the first data block A1 is equal to the PI1 corresponding to the first data block A1, the processing module in the network interface card increases a sequence number of the third RDMA packet 13 by 1 to obtain a sequence number 4 of the fourth RDMA packet 14, forms a payload part of the fourth RDMA packet 14 by using the data of 1 k+(L4+L3)/4−L3 bytes and the PH corresponding to the first data block A1, adds a packet header before the payload part and adds a check part after the payload part to form the fourth RDMA packet 14, where the packet header of the fourth packet 14 includes the sequence number 4 of the fourth RDMA packet 14, and sends the fourth RDMA packet 14 to the receive end through the network port of the network interface card.

The processing module in the network interface card may continue to read data of 1 k+(L4+L3)/4 bytes from the to-be-sent data shown in FIG. 1-5, calculate the first CRC based on the data of 1 k+(L4+L3)/4 bytes, increase a sequence number 4 of the most recently sent RDMA packet by 1 to obtain a sequence number 5 of the first RDMA packet 21, and use the data of 1 k+(L4+L3)/4 bytes as a payload part of the RDMA packet. As shown in FIG. 3-5, the processing module in the network interface card adds a packet header before the payload part and adds a check part after the payload part to form the first RDMA packet 21, where the packet header includes the sequence number 5 of the first RDMA packet 21 and sends the first RDMA packet 21 to the receive end through the network port of the network interface card. The processing module in the network interface card continues to read data of 1 k+(L4+L3)/4 bytes from the to-be-sent data, calculates the second CRC based on the data of 1 k+(L4+L3)/4 bytes and the first CRC, increases a sequence number of the first RDMA packet 21 by 1 to obtain a sequence number 6 of the second RDMA packet 22, uses the data of 1 k+(L4+L3)/4 bytes as a payload part of the RDMA packet, adds a packet header before the payload part and adds a check part after the payload part to form the second RDMA packet 22, where the packet header of the second RDMA packet 22 includes the sequence number of the second RDMA packet 22, and sends the second RDMA packet 22 to the receive end through the network port of the network interface card; and continues to generate and send the third RDMA packet 23 and calculate the third CRC based on the foregoing description. Then, the processing module in the network interface card may read data of 1 k+(L4+L3)/4−L3 bytes from remaining data in the to-be-sent data. In this way, after the second data block A2 and metadata 2 of the second data block A2 are read, a CRC corresponding to the second data block A2 is calculated based on the data of 1 k+(L4+L3)/4−L3 bytes and the third CRC. The processing module in the network interface card may read data of L3 bytes from the remaining data in the to-be-sent data, where the data of L3 bytes is the PI2 corresponding to the second data block A2. When a CRC value corresponding to the second data block A2 is equal to the PI2 corresponding to the second data block A2, the processing module in the network interface card increases a sequence number of the third RDMA packet 23 by 1 to obtain a sequence number 8 of the fourth RDMA packet 24, forms a payload part of the fourth RDMA packet 24 by using the data of 1 k+(L4+L3)/4−L3 bytes and the PI2 corresponding to the second data block A2, adds a packet header before the payload part and adds a check part after the payload part to form the fourth RDMA packet 24, where the packet header of the fourth packet 24 includes the sequence number 8 of the fourth RDMA packet 24, and sends the fourth packet 24 to the receive end through the network port of the network interface card.

For another example, referring to the to-be-sent data shown in FIG. 1-5, a length of the data block in the to-be-sent data is 4 k. It is assumed that the determined standard payload length L1 is 2 k. In this case, y=2, and a length of the payload part of the RDMA packet is 2 k+(L4+L3)/2. Referring to FIG. 3-8, the processing module of the network interface card encapsulates the first data block A1 and the PH corresponding to the first data block A1 into the first RDMA packet 11 and the second RDMA packet 12. A payload part of the first RDMA packet 11 includes data whose front length is 2 k+(L4+L3)/2 of the first data block A1. A payload part of the second RDMA packet 12 includes remaining data of the first data block A1, the metadata 1, and the PH whose length of the first data block A1 is L3. A sum of the length of the remaining data and the metadata 1 is 2 k+(L4+L3)/2−L3. In addition, the processing module of the network interface card encapsulates the second data block A2 and the PI2 corresponding to the second data block A2 into the first RDMA packet 21 and the second RDMA packet 22. A payload part of the first RDMA packet 21 includes data whose front length is 2 k+(L4+L3)/2 of the second data block A2. A payload part of the second RDMA packet 22 includes remaining data of the second data block A2, the metadata 2, and the PI2 whose length is L3 corresponding to the second data block A2. A sum of the length of the remaining data and the metadata 2 is 2 k+(L4+L3)/2−L3.

For another example, referring to the to-be-sent data shown in FIG. 1-4, a length of the data block in the to-be-sent data is 4 k. It is assumed that the determined standard payload length L1 is 4 k. In this case, y=1, and a length of the payload part of the RDMA packet is 4 k+L4+L3. Referring to FIG. 3-9, the processing module of the network interface card encapsulates the first data block A1, the metadata 1 corresponding to the first data block A1, and the PH corresponding to the first data block A1 into the first RDMA packet 1. A payload part of the first RDMA packet 1 includes the first data block A1, the metadata 1 corresponding to the first data block A1, and the PH whose length is L3 corresponding to the first data block A1. The processing module of the network interface card encapsulates the second data block A2, the metadata 2 corresponding to the second data block A2, and the PI2 corresponding to the second data block A2 into the second RDMA packet 2. A payload part of the second RDMA packet 2 includes the second data block A2, and the metadata 2 corresponding to the second data block A2, and the PI2 whose length is L3 corresponding to the second data block A2.

Step 307: When the standard payload length L1 is less than or equal to the length L2 of the data block in the to-be-sent data and the to-be-sent data does not include the PI corresponding to the data block, obtain PI corresponding to one data block in the to-be-sent data, encapsulate the one data block and the PI corresponding to the data block into y RDMA packets, where y=L2/L1, and send the y RDMA packets.

In this step, the processing module in the network interface card may read data whose length is L1+L3/y from the start position in the to-be-sent data, calculate the first CRC based on the data whose length is L1+L3/y, use the data whose length is L1+L3/y as a payload part of the RDMA packet, add a packet header before the payload part and add a check part after the payload part to form the first RDMA packet, where the packet header includes a sequence number of a start packet, and send the first RDMA packet to the receive end through the network port of the network interface card. The processing module in the network interface card continues to read data of L1+L3/y from the to-be-sent data, calculates the second CRC based on the data whose length is L1+L3/y and the first CRC, uses the data whose length is L1+L3/y as the payload part of the RDMA packet, adds a sequence number of the first RDMA packet to obtain a sequence number of the second RDMA packet, adds a packet header before the payload part and adds a check part after the payload part to form the second RDMA packet, where the packet header of the second RDMA packet includes the sequence of the second RDMA packet, and sends the second RDMA packet to the receive end through the network port of the network interface card; and continues to generate and send the third RDMA packet and calculate the third CRC in the foregoing manner of encapsulating the second RDMA packet, and generate and send the fourth RDMA packet and calculate the fourth CRC until the $(y-1)^{th}$ RDMA packet is generated and sent and the $(y-1)^{th}$ CRC value is calculated. Then, the processing module in the network interface card may read data whose length is L1+L3/y−L3 from remaining data in the to-be-sent data. In this way, after the first data block is read, a CRC corresponding to the first data block is calculated based on the data of L1+L3/y−L3 and the $(y-1)^{th}$ CRC, and the CRC corresponding to the first data block is used as the PI corresponding to the first data block. The processing module in the network interface card adds a sequence number of the $(y-1)^{th}$ RDMA packet to obtain a sequence number of the $y^{th}$ RDMA packet, forms a payload part of the $y^{th}$ RDMA packet by using the data whose length is L1+L3/y−L3 and the PI of the first data block, adds a packet header before the payload part and adds a check part after the payload part to form the $y^{th}$ RDMA packet, where the packet header of the $y^{th}$ RDMA packet includes the sequence number of the $y^{th}$ RDMA packet, and sends the $y^{th}$ RDMA packet to the receive end through the network port of the network interface card.

The processing module in the network interface card continues to read, from the to-be-sent data, data whose length is L1+L3/y, calculates the first CRC based on the data whose length is L1+L3/y, adds a sequence number of the most recently sent RDMA packet to obtain a sequence number of the first RDMA packet, uses the data whose length is L1+L3/y as the payload part of the RDMA packet, adds a packet header before the payload part and adds a check part after the payload part to form the first RDMA packet, where the packet header includes a sequence number of the first RDMA packet, and sends the first RDMA packet to the receive end through the network port of the network interface card. The processing module in the network interface card continues to read data of L1+L3/y from the to-be-sent data, calculates the second CRC based on the data whose length is L1+L3/y and the first CRC, uses the data whose length is L1+L3/y as the payload part of the RDMA packet, adds a sequence number of the first RDMA packet to obtain a sequence number of the second RDMA packet, adds a packet header before the payload part and adds a check part after the payload part to form the second RDMA packet, where the packet header of the second RDMA packet includes the sequence of the second RDMA packet, and sends the second RDMA packet to the receive end through the network port of the network interface card; and continues to generate and send the third RDMA packet and calculate the third CRC in the foregoing manner of encapsulating the second RDMA packet, and generate and send the fourth RDMA packet and calculate the fourth CRC until the $(y-1)^{th}$ RDMA packet is generated and sent and the $(y-1)^{th}$ CRC value is calculated. Then, the processing module in the network interface card may read data whose length is L1+L3/y−L3 from remaining data in the to-be-sent data. In this way, after the second data block is read, a CRC corresponding to the second data block is calculated based on the data of L1+L3/y−L3 and the $(y-1)^{th}$ CRC, and the CRC corresponding to the second data block is used as the PI corresponding to the second data block. The processing module in the network interface card adds a sequence number of the $(y-1)^{th}$ RDMA packet to obtain a sequence number of the $y^{th}$ RDMA packet, forms a payload part of the $y^{th}$ RDMA packet by using the data whose length is L1+L3/y−L3 and the PI of the first data block, adds a packet header before the payload part and adds a check part after the payload part to form the $y^{th}$ RDMA packet, where the packet header of the $y^{th}$ RDMA packet includes the sequence number of the $y^{th}$ RDMA packet, and sends the $y^{th}$ RDMA packet to the receive end through the network port of the network interface card. The foregoing process of performing execution on the second data block continues to be performed, and each of other data blocks in the to-be-sent data is encapsulated into y RDMA packets and sent to the receive end.

When the standard payload length L1 is less than or equal to the length L2 of the data block, each data block and PI corresponding to each data block are encapsulated into y RDMA packets, and payload parts of the first (y−1) of the y RDMA packets have a same structure. The payload parts of the first (y−1) RDMA packets corresponding to each data block have the same structure, and a payload part of the $y^{th}$ RDMA packet corresponding to each data block has a same structure. Therefore, the receive end needs only first processing logic and second processing logic. The first (y−1) RDMA packets of each data block may be processed by using the first processing logic, and the $y^{th}$ RDMA packet of each data block may be processed by using the second processing logic. This reduces difficulty of processing the RDMA packet and reduces time consumption for processing the RDMA packet at the receive end.

Optionally, when it is determined, based on the first indication information, that the RDMA packet does not include the PI, the to-be-sent data may be sent by using the following operations (1) to (5). An implementation process may be as follows.

(1) Determine whether the standard payload length L1 is greater than the length L2 of the data block in the to-be-sent data, and determine, based on the second indication information, whether the to-be-sent data includes the PI corresponding to the data block.

(2) When the standard payload length L1 is greater than the length L2 of the data block in the to-be-sent data and the to-be-sent data includes the PI corresponding to the data block, encapsulate x consecutive data blocks in the to-be-sent data into one RDMA packet, where x=L1/L2, and send the RDMA packet.

In this step, the processing module in the network interface card may read the first data block from the to-be-sent data, calculate a CRC of the first data block, and read PI corresponding to the first data block from the to-be-sent data. When the CRC of the first data block is equal to the PI corresponding to the first data block, the processing module in the network interface card reads the second data block from the to-be-sent data and calculates a CRC of the second data block. When the CRC of the second data block is equal to PI corresponding to the second data block, the processing module in the network interface card continues to read data block and PI from the to-be-sent data in the foregoing manner of reading the second data block until a CRC of the $x^{th}$ data block is equal to PI corresponding to the $x^{th}$ data block, forms a payload part of the RDMA packet by using the first data block, the second data block, . . . , and the $x^{th}$ data block, and a length of the payload part is L1, adds a packet header before the payload part and adds a check part after the payload part to form the first RDMA packet, where the packet header of the first RDMA packet includes a sequence number of a start packet, and sends the first RDMA packet to the receive end through the network port of the network interface card.

After sending the first RDMA packet, the processing module of the network interface card continues to read the $(x+1)^{th}$ data block from the to-be-sent data, calculates a CRC of the $(x+1)^{th}$ data block, and reads, from the to-be-sent data, PI corresponding to the $(x+1)^{th}$ data block. When the CRC of the $(x+1)^{th}$ data block is equal to the PI corresponding to the $(x+1)^{th}$ data block, the processing module of the network interface card reads the $(x+2)^{th}$ data block from the to-be-sent data and calculates a CRC of the $(x+2)^{th}$ data block. When the CRC of the $(x+2)^{th}$ data block is equal to PI corresponding to the $(x+2)^{th}$ data block, the processing module of the network interface card continues to read data block and PI from the to-be-sent data in the foregoing manner of processing the $(x+2)^{th}$ data block until a CRC of the $2x^{th}$ data block is equal to PI corresponding to the $2x^{th}$ data block, forms a payload part of the RDMA packet by using the $(x+1)^{th}$ data block, the $(x+2)^{th}$ data block, . . . , and the $2x^{th}$ data block, and a length of the payload part is L1, adds a sequence number of the first RDMA packet to obtain a sequence number of the second RDMA packet, adds a packet header before the payload part and adds a check part after the payload part to form the second RDMA packet, where the packet header of the second RDMA packet includes the sequence number of the second RDMA packet, and sends the second RDMA packet to the receive end through the network port of the network interface card.

The processing module of the network interface card continues to read, from the to-be-sent data in the foregoing manner of encapsulating the second RDMA packet, the $(2x+1)^{th}$ data block and PI corresponding to the $(2x+1)^{th}$ data block, the $(2x+2)^{th}$ data block and PI corresponding to the $(2x+2)^{th}$ data block, . . . , and $3x^{th}$ data block and PI corresponding to the $3x^{th}$ data block, encapsulates the $(2x+1)^{th}$ data block, the $(2x+2)^{th}$ data block, . . . , and $3x^{th}$ data block into the third RDMA packet in the foregoing manner of encapsulating the second RDMA packet, and sends the third RDMA packet to the receive end through the network port of the network interface card. Then, the processing module in the network interface card continues to read the data block and the PI corresponding to the data block in the foregoing manner of obtaining the third RDMA packet until the last data block and PI corresponding to the last data block in the to-be-sent data are encapsulated into an RDMA packet and the RDMA packet is sent to the receive end.

(3) When the standard payload length L1 is greater than the length L2 of the data block in the to-be-sent data and the to-be-sent data does not include the PI corresponding to the data block, encapsulate x consecutive data blocks in the to-be-sent data into one RDMA packet, where x=L1/L2, and send the RDMA packet.

In this step, the processing module in the network interface card may read the first data block, the second data block, . . . , and the $x^{th}$ data block from the to-be-sent data, form a payload part of the RDMA packet by using the first data block, the second data block, . . . , and the $x^{th}$ data block, where a length of the payload part is L1, and add a packet header before the payload part and add a check part after the payload part to form the first RDMA packet, where the packet header of the first RDMA packet includes a sequence number of a start packet, and send the first RDMA packet to the receive end through the network port of the network interface card.

After sending the first RDMA packet, the processing module of the network interface card continues to read the $(x+1)^{th}$ data block, the $(x+2)^{th}$ data block, . . . , and the $2x^{th}$ data block from the to-be-sent data, adds a sequence number of the first RDMA packet to obtain a sequence number of the second RDMA packet, forms a payload part of the RDMA packet by using the $(x+1)^{th}$ data block, the $(x+2)^{th}$ data block, . . . , and the $2x^{th}$ data block, and a length of the payload part is L1, adds a packet header before the payload part and adds a check part after the payload part to form the second RDMA packet, where the packet header of the second RDMA packet includes a sequence number of the second RDMA packet, and sends the second RDMA packet to the receive end through the network port of the network interface card. Then, the data block continues to be read in a manner of encapsulating the second RDMA packet until the last data block in the to-be-sent data is encapsulated into one RDMA packet and the RDMA packet is sent to the receive end.

(4) When the standard payload length L1 is less than or equal to the length L2 of the data block in the to-be-sent data and the to-be-sent data includes the PI corresponding to the data block, encapsulate one data block in the to-be-sent data into y RDMA packets, where y=L2/L1, and send the y RDMA packets.

In this step, the processing module in the network interface card may read data whose length is L1 from the start position in the to-be-sent data, calculate the first CRC based on the data of L1, use the data whose length is L1 as the payload part of the RDMA packet, add a packet header before the payload part and add a check part after the payload part to form the first RDMA packet, where the packet header of the first RDMA packet includes a sequence number of a start packet, and send the first RDMA packet to the receive end through the network port of the network interface card. The processing module in the network interface card continues to read data whose length is L1 from the to-be-sent data, calculates the second CRC based on the data of L1 and the first CRC, uses the data whose length is L1 as the payload part of the RDMA packet, adds a sequence number of the first RDMA packet to obtain a sequence number of the second RDMA packet, adds a packet header before the payload part and adds a check part after the payload part to form the second RDMA packet, where the packet header of the second RDMA packet includes the sequence of the second RDMA packet, and sends the second RDMA packet to the receive end through the network port of the network interface card; and continues to generate and send the third RDMA packet and calculate the third CRC in the foregoing manner of encapsulating the second RDMA packet, and generate and send the fourth RDMA packet and calculate the fourth CRC until the $(y-1)^{th}$ RDMA packet is generated and sent and the $(y-1)^{th}$ CRC value is calculated. Then, the processing module in the network interface card may read data whose length is L1 from remaining data in the to-be-sent data. In this way, after the first data block is read, a CRC of the first data block is calculated based on the data of L1 and the $(y-1)^{th}$ CRC. The processing module in the network interface card may read data of L3 bytes from the remaining data in the to-be-sent data, where the data of L3 bytes is PI corresponding to the first data block. When a CRC value corresponding to the first data block is equal to the PI, the processing module in the network interface card adds a sequence number of the $(y-1)^{th}$ RDMA packet to obtain a sequence number of the $y^{th}$ RDMA packet, forms a payload part of the $y^{th}$ RDMA packet by using the data whose length is L1, adds a packet header before the payload part and adds a check part after the payload part to form the $y^{th}$ RDMA packet, where the packet header of the $y^{th}$ RDMA packet includes the sequence number of the $y^{th}$ RDMA packet, and sends the $y^{th}$ RDMA packet to the receive end through the network port of the network interface card.

The processing module in the network interface card continues to read, from the to-be-sent data, data whose length is L1, calculates the first CRC based on the data of L1, uses the data whose length is L1 as the payload part of the RDMA packet, adds a sequence number of the most recently sent RDMA packet to obtain a sequence number of the first RDMA packet, adds a packet header before the payload part and adds a check part after the payload part to form the first RDMA packet, where the packet header of the first RDMA packet includes a sequence number of a start packet, and sends the first RDMA packet to the receive end through the network port of the network interface card. The processing module in the network interface card continues to read data whose length is L1 from the to-be-sent data, calculates the second CRC based on the data of L1 and the first CRC, uses the data whose length is L1 as the payload part of the RDMA packet, adds a sequence number of the first RDMA packet to obtain a sequence number of the second RDMA packet, adds a packet header before the payload part and adds a check part after the payload part to form the second RDMA packet, where the packet header of the second RDMA packet includes the sequence of the second RDMA packet, and sends the second RDMA packet to the receive end through the network port of the network interface card; and continues to generate and send the third RDMA packet and calculate the third CRC in the foregoing manner of encapsulating the second RDMA packet, and generate and send the fourth RDMA packet and calculate the fourth CRC until the $(y-1)^{th}$ RDMA packet is generated and sent and the $(y-1)^{th}$ CRC value is calculated. Then, the processing module in the network interface card may read data whose length is L1 from remaining data in the to-be-sent data. In this way, after the second data block is read, a CRC of the second data block is calculated based on the data of L1 and the $(y-1)^{th}$ CRC. The processing module in the network interface card may read data of L3 bytes from the remaining data in the to-be-sent data, where the data of L3 bytes is PI corresponding to the second data block. When a CRC value corresponding to the second data block is equal to the PI, the processing module in the network interface card adds a sequence number of the $(y-1)^{th}$ RDMA packet to obtain a sequence number of the $y^{th}$ RDMA packet, forms a payload part of the $y^{th}$ RDMA packet by using the data whose length is L1, adds a packet header before the payload part and adds a check part after the payload part to form the $y^{th}$ RDMA packet, where the packet header of the $y^{th}$ RDMA packet includes the sequence number of the $y^{th}$ RDMA packet, and sends the $y^{th}$ RDMA packet to the receive end through the network port of the network interface card. The foregoing process of performing execution on the second data block continues to be performed, and each of other data blocks in the to-be-sent data is encapsulated into the RDMA packet and sent to the receive end.

(5) When the standard payload length L1 is less than or equal to the length L2 of the data block in the to-be-sent data and the to-be-sent data includes the PI corresponding to the data block, obtain one data block in the to-be-sent data and encapsulate the one data block in the to-be-sent data into y RDMA packets, where y=L2/L1, and send the y RDMA packets.

In this step, the processing module in the network interface card may read data whose length is L1 from the start position in the to-be-sent data, and use the data whose length is L1 as the payload part of the RDMA packet, add a packet header before the payload part and add a check part after the payload part to form the first RDMA packet, where the packet header of the first RDMA packet includes a sequence number of a start packet, and send the first RDMA packet to the receive end through the network port of the network interface card. The processing module in the network interface card continues to read data whose length is L1 from the to-be-sent data, uses the data whose length is L1 as the payload part of the RDMA packet, adds a sequence number of the first RDMA packet to obtain a sequence number of the second RDMA packet, adds a packet header before the payload part and adds a check part after the payload part to form the second RDMA packet, where the packet header of the second RDMA packet includes the sequence of the second RDMA packet, and sends the second RDMA packet to the receive end through the network port of the network interface card; and continues to generate and send the third RDMA packet in the foregoing manner of encapsulating the second RDMA packet, and generate and send the fourth RDMA packet until the $y^{th}$ RDMA packet is generated and sent and the first data block is sent.

The processing module in the network interface card continues to read, from the to-be-sent data, data whose length is L1, uses the data whose length is L1 as the payload part of the RDMA packet, adds a sequence number of the most recently sent RDMA packet to obtain a sequence number of the first RDMA packet, adds a packet header before the payload part and adds a check part after the payload part to form the first RDMA packet, where the packet header of the first RDMA packet includes a sequence number of the first RDMA packet, and sends the first RDMA packet to the receive end through the network port of the network interface card. The processing module in the network interface card continues to read data whose length is L1 from the to-be-sent data, uses the data whose length is L1 as the payload part of the RDMA packet, adds a sequence number of the first RDMA packet to obtain a sequence number of the second RDMA packet, adds a packet header before the payload part and adds a check part after the payload part to form the second RDMA packet, where the packet header of the second RDMA packet includes the sequence of the second RDMA packet, and sends the second RDMA packet to the receive end through the network port of the network interface card; and continues to generate and send the third RDMA packet in the foregoing manner of encapsulating the second RDMA packet, and generate and send the fourth RDMA packet until the $y^{th}$ RDMA packet is generated and sent and the second data block is sent. The foregoing process of performing execution on the second data block continues to be performed, and each of other data blocks in the to-be-sent data is encapsulated into the RDMA packet and sent to the receive end.

In this embodiment, after the to-be-sent data is encapsulated into the plurality of RDMA packets when the determined standard payload length L1 is greater than the length L2 of the data block, a payload part of each RDMA packet includes x data blocks and PI corresponding to each data block, where x=L1/L2. In other words, the payload part of each RDMA packet has a same structure. This reduces difficulty of processing the RDMA packet at the receive end, and further reduces time consumption for processing the RDMA packet and reduces hardware resources required for processing the RDMA packet. When the determined standard payload length L1 is less than or equal to the length L2 of the data block, the processing module in the network interface card encapsulates the data block and the PI corresponding to the data block into y RDMA packets. A structure of the payload part in the RDMA packet is cyclically changed at an interval of y RDMA packets, where y=L2/L1. The first (y−1) packets in each cycle have a same payload structure, and the $y^{th}$ packet in each cycle has a same payload structure. Therefore, only two types of processing logic are required to process all RDMA packets. This reduces difficulty of processing the packet at the receive end, and further reduces time consumption for processing the RDMA packet and reduces hardware resources required for processing the RDMA packet.

Referring to FIG. 4-1, an embodiment provides a data receiving method. The method may be applied to the network interface card of the receive end in any one of the foregoing embodiments. A transmit end sends to-be-sent data to a receive end by using an RDMA packet. One RDMA packet includes one or more data blocks in the to-be-sent data, or a plurality of RDMA packets include one data block in the to-be-sent data. In this way, the receive end obtains a data block from the received RDMA packet, and forms target data by using the obtained data block, and the target data may be the same as the to-be-sent data. The receiving method includes the following steps.

Step 401: Obtain IO configuration information sent by the transmit end, where the IO configuration information includes content such as a sequence number of a start packet, a length L2 of a data block in to-be-sent data, first indication information used to indicate whether an RDMA packet includes PI, and second indication information used to indicate whether to-be-sent data includes PI.

Optionally, when the length of the data block in the to-be-sent data is 4 k, the IO information further includes position relationship information between metadata and PI.

A processing module of the network interface card may obtain the IO configuration information of the transmit end. An obtaining process may be as follows.

When the transmit end sends storage address information of the IO configuration information, the processing module receives, through a network port of the network interface card, a send message sent by the transmit end, where the send message includes the storage address information of the IO configuration information. The storage address information includes a start position of a storage area in which the IO configuration information is located and an offset of the IO configuration information in the storage area, and the storage area is located at the transmit end. The processing module reads the IO configuration information from the transmit end based on the storage address information through the network port of the network interface card. Alternatively, when the transmit end directly sends the IO configuration information, the processing module directly receives the IO configuration information through the network port of the network interface card.

Optionally, after obtaining the IO configuration information, the processing module may first store the IO configuration information in a second memory of the network interface card.

Step 402: Determine a standard payload length L1 of the RDMA packet, and then receive the RDMA packet from the transmit end based on the sequence number of the start packet.

Optionally, an operation of determining the standard payload length L1 of the RDMA packet may be:

When the transmit end and the receive end are each located in a same local area network or a same private network, the determined standard payload length L1 may be a preset length, and the preset length may be 4 k, 2 k, 1 k, or the like. When the transmit end and the receive end are not in a same local area network or a same private network, the standard payload length L1 is determined based on a maximum transmission unit length allowed by a public network, and the standard payload length L1 is less than the maximum transmission unit length allowed by the public network. The length of the maximum transmission unit allowed by the public network is 1500. Therefore, the determined standard payload length L1 may be 1 k or the like.

Optionally, the RDMA packet includes a packet header, a payload part, and a check part, and the packet header includes a sequence number of the RDMA packet.

In this step, the processing module of the network interface card may receive, through the network port of the network interface card, the RDMA packet sent by the transmit end, extract the sequence number of the RDMA packet from the packet header of the RDMA packet, and if the RDMA packet is a packet received for the first time, compare the sequence number of the RDMA packet with the sequence number of the start packet. If the sequence number of the RDMA packet and the sequence number of the start packet are the same, a subsequent operation is performed on the RDMA packet. If the sequence number of the RDMA packet and the sequence number of the start packet are different, it indicates that an error occurs in a transmission process of the RDMA packet sent by the transmit end, and the RDMA packet is discarded and the RDMA packet of the transmit end is stopped from being continuously received. If the RDMA packet is not an RDMA packet received for the first time, whether the sequence number of the RDMA packet and a sequence number of the last received RDMA packet are consecutive is determined. If the sequence number of the RDMA packet and the sequence number of the last received RDMA packet are consecutive, a subsequent operation is performed on the RDMA packet. If the sequence number of the RDMA packet and the sequence number of the last received RDMA packet are inconsecutive, it indicates that an error occurs in a transmission process of the RDMA packet sent by the transmit end, and the RDMA packet is discarded and the RDMA packet of the transmit end is stopped from being continuously received.

The sequence number of the RDMA packet is generated based on the sequence number of the last received RDMA packet. For example, the sequence number of the last received RDMA packet is increased by 1 to obtain the sequence number of the RDMA packet. Therefore, when a difference between the sequence number of the RDMA packet and the sequence number of the last received RDMA packet is 1, it may be determined that the sequence number of the RDMA packet and the sequence number of the last received RDMA packet are consecutive.

Step 403: When it is determined, based on the first indication information, that the RDMA packet includes the PI, determine whether the standard payload length L1 is greater than a length L2 of the data block in the to-be-sent data, and determine whether the to-be-sent data includes the PI corresponding to the data block.

The standard payload length L1 is an integer multiple of the length L2 of the data block in the to-be-sent data. Alternatively, the length L2 of the data block in the to-be-sent data is an integer multiple of the standard payload length L1.

In this step, the processing module in the network interface card reads the IO configuration information from the second memory in the network interface card, where the IO configuration information includes the length L2 of the data block in the to-be-sent data, the sequence number of the start packet, the first indication information, and the second indication information. The processing module in the network interface card determines, based on the first indication information, whether the received RDMA packet includes the PI, when it is determined that the RDMA packet includes the PI, compares the standard payload length L1 with the length L2 of the data block, and determines, based on the second indication information, whether the to-be-sent data includes the PI corresponding to each data block.

Step 404: When the standard payload length L1 is greater than the length L2 of the data block in the to-be-sent data and the to-be-sent data includes the PI corresponding to the data block, the RDMA packet includes x data blocks and PI corresponding to each of the x data blocks in the to-be-sent data, where x=L1/L2, obtain the x data blocks and the PI corresponding to each data block from the RDMA packet.

In this step, the processing module of the network interface card may remove an RDMA packet header and a check part of the RDMA packet to obtain a payload part of the RDMA packet, read data whose length is L2 from a start position of the payload part to obtain the first data block, calculate a CRC of the first data block based on the first data block, read data of L3 bytes from the payload part to obtain PI corresponding to the first data block, and when the CRC of the first data block is equal to the PI corresponding to the first data block, send the first data block and the PI corresponding to the first data block to a processor of the receive end through a communications interface of the network interface card.

The processing module continues to read data whose length is L2 from the payload part to obtain the second data block, calculates a CRC of the second data block based on the second data block, reads data whose length is L3 bytes from the payload part to obtain PI corresponding to the second data block, and when the CRC of the second data block is equal to the PI corresponding to the second data block, sends the second data block and the PI corresponding to the second data to the processor of the receive end through the communications interface of the network interface card. The processing module continues to perform the procedure and sends the third data block and PI corresponding to the third data block, . . . , and the $x^{th}$ data block and PI corresponding to the $x^{th}$ data block to the processor of the receive end.

Optionally, when a next RDMA packet located after the RDMA packet is received by using the operation in step 402, the next RDMA packet is processed based on the detailed implementation process of this step described above. Details are not described herein again.

Optionally, the processor of the receive end receives, by using a bus system, the data block sent by the network interface card and the PI corresponding to the data block and forms the target data by using the received data block and the PI of the data block according to a receiving sequence, where the target data is the same as the to-be-sent data. When the receive end is a storage device, the processor may store the target data in a first memory of the receive end. When the receive end is not the storage device, the processor may process the target data.

Optionally, when the receive end is a storage device, the processing module of the network interface card may directly store the obtained data block and the PI corresponding to the data block in the first memory.

When a CRC corresponding to an example data block is not equal to PI corresponding to the data block, it indicates that a data error occurs in the to-be-sent data. In this case, the RDMA packet of the transmit end may be stopped from being continuously received, and the method procedure of this embodiment ends.

Optionally, the processing module of the network interface card may need to perform a plurality of times of read operations to read one data block from the payload part and can calculate a CRC of the data block only after performing a plurality of times of CRC calculation operations. A total length of data read for a plurality of times is equal to the length L2 of the data block. Details are as follows.

The processing module of the network interface card reads the first data block from the payload part, reads data at the first time from a start position of the payload part, performs the first calculation based on the data read at the first time to obtain a CRC, and sets a length of a target data as a length of the data read at the first time; continues to read data from the payload part at the second time, performs the second calculation based on the data read at the second time and the CRC calculated at the first time to obtain a CRC, and adds a length of the data read at the second time to the length of the target data; continues to read data from the payload part at the third time, and performs the third calculation based on the data read at the third time and the CRC calculated at the second time to obtain a CRC; . . . ; and reads data from the payload part at the $P^{th}$ time, performs the $P^{th}$ calculation based on the data read at the $P^{th}$ time and a CRC calculated at the $(P-1)^{th}$ time to obtain a CRC, and adds a length of the data read at the $P^{th}$ time to the length of the target data, where P=4, 5, 6, . . . , or the like. When the increased target data length is equal to L2, it indicates that the first data block is read from the payload part and that the CRC calculated at the $P^{th}$ time is the CRC corresponding to the first data block, and the processing module of the network interface card continues to read data of L3 bytes from the payload part, where the data of L3 bytes is the PI corresponding to the first data block.

Then, the processing module of the network interface card continues to read remaining data from the payload part for a plurality of times to obtain the second data block. A process of the plurality of times of reading is as follows: the processing module reads data from remaining data at the first time, performs the first calculation based on the data read at the first time to obtain a CRC, and sets a length of a target data as a length of the data read at the first time; continues to read data from the payload part at the second time, performs the second calculation based on the data read at the second time and the CRC calculated at the first time to obtain a CRC, and adds a length of the data read at the second time to the length of the target data; . . . ; and reads data from the payload part at the $P^{th}$ time, performs the $P^{th}$ calculation based on the data read at the $P^{th}$ time and a CRC calculated at the $(P-1)^{th}$ time to obtain a CRC, and adds a length of the data read at the $P^{th}$ time to the length of the target data. When the increased target data length is equal to L2, it indicates that the second data block is read from the payload part and the CRC calculated for the $P^{th}$ time is the CRC of the second data block, and the processing module of the network interface card continues to read data of L3 bytes from the payload part, where the data of L3 bytes is the PI corresponding to the second data block. The foregoing process of obtaining the second data block is repeated until the payload part is read.

For example, referring to FIG. 3-2, it is assumed that the length L2 of the data block in the to-be-sent data is 512, and the determined standard payload length L1 is 1 k. In this case, x is 2. It is assumed that the processing module of the network interface card receives the first RDMA packet B1 shown in FIG. 3-2, where a payload part of the first RDMA packet B1 includes the first data block A1 and PI1 corresponding to the first data block A1 and the second data block A2 and PI2 corresponding to the second data block A2; removes a packet header and a check part of the first RDMA packet to obtain a payload part of the first RDMA packet, reads data of 512 bytes from a start position of the payload part of the first RDMA packet to obtain the first data block A1, and calculates a CRC1 corresponding to the first data block based on the first data block A1; and continues to read data of L3 bytes from the payload part of the first RDMA packet to obtain the PH corresponding to the first data block, and when the CRC1 corresponding to the first data block A1 is equal to the PI1 corresponding to the first data block A1, sends the first data block A1 and the PH corresponding to the first data block A1 to the processor of the receive end. The processing module of the network interface card continues to read data of 512 bytes from the payload part of the first RDMA packet to obtain the second data block A2, and calculates a CRC2 corresponding to the second data block A2 based on the second data block A2; and continues to read the data of L3 bytes from the payload part of the first RDMA packet to obtain PI2 corresponding to the second data block A2, and when the CRC2 corresponding to the second data block A2 is equal to the PI2 corresponding to the second data block A2, sends the second data block A2 and the PI2 corresponding to the first data block A2 to the processor of the receive end.

When the processing module of the network interface card receives the second RDMA packet B2 through the network port, a payload part of the second RDMA packet B2 includes the third data block A3 and PI3 corresponding to the third data block A3, and the fourth data block A4 and the PI4 corresponding to the fourth data block A4; removes a packet header and a check part of the second RDMA packet B2 to obtain a payload part of the second RDMA packet B2, reads data of 512 bytes from a start position of the payload part of the second RDMA packet B2 to obtain the third data block A3, and calculates a CRC3 corresponding to the third data block A3 based on the third data block A3; and continues to read data of L3 bytes from the payload part of the second RDMA packet B2 to obtain PI3 corresponding to the third data block A3, and when a CRC3 corresponding to the third data block A3 is equal to the PI3 corresponding to the third data block A3, sends the third data block A3 and the PI3 corresponding to the third data block A3 to the processor of the receive end. The processing module of the network interface card continues to read data of 512 bytes from the payload part of the second RDMA packet B2 to obtain the fourth data block A4, and calculates a CRC4 corresponding to the fourth data block A4 based on the fourth data block A4; and continues to read data of L3 bytes from the payload part of the second RDMA packet B2 to obtain PI4 corresponding to the fourth data block A4, and when a CRC4 corresponding to the fourth data block A4 is equal to the PI4 corresponding to the fourth data block A4, sends the fourth data block A4 and the PI4 corresponding to the fourth data block A4 to the processor of the receive end. When the third RDMA packet B3 and the fourth RDMA packet B4 in FIG. 3-2 are received, the foregoing operations are separately performed on the third RDMA packet B3 and the fourth RDMA packet B4, to send eight data blocks A1, A2, . . . , and A8 in the to-be-sent data and PI1, PI2, . . . , and PI8 of the eight data blocks to the processor of the receive end.

The processing module sends the data block and the PI to the bus system through the communications interface of the network interface card. The processor receives the data block and the PI from the bus system and forms the target data by using the received data block and the PI according to a receiving sequence, where the target data is the same as the to-be-sent data shown in FIG. 1-3.

For another example, it is assumed that the determined standard payload length L1 is 2 k. In this case, x=4. It is assumed that the first RDMA packet C1 shown in FIG. 3-3 is received, and a payload part of the first RDMA packet C1 includes the first data block A1 and PH corresponding to the first data block A1, the second data block A2 and PI2 corresponding to the second data block A2, the third data block A3 and PI3 corresponding to the third data block A3, and the fourth data block A4 and PI4 corresponding to the fourth data block A4. The processing module of the network interface card removes a packet header and a check part of the first RDMA packet C1 to obtain a payload part of the first RDMA packet C1, reads data of 512 bytes from a start position of the payload part of the first RDMA packet C1 to obtain the first data block A1, and calculates a CRC1 corresponding to the first data block based on the first data block A1; and continues to read data of L3 bytes from the payload part of the first RDMA packet to obtain PH corresponding to the first data block, and when the CRC1 corresponding to the first data block A1 is equal to the PI1 corresponding to the first data block A1, sends the first data block A1 and the PH corresponding to the first data block A1 to the processor of the receive end. The processing module of the network interface card continues to read data of 512 bytes from the payload part of the first RDMA packet C1 to obtain the second data block A2, and calculates a CRC2 corresponding to the second data block A2 based on the second data block A2; and continues to read the data of L3 bytes from the payload part of the first RDMA packet C1 to obtain PI2 corresponding to the second data block A2, and when the CRC2 corresponding to the second data block A2 is equal to the PI2 corresponding to the second data block A2, sends the second data block A2 and the PI2 corresponding to the first data block A2 to the processor of the receive end. When the second RDMA packet C2 in FIG. 3-3 is received, the foregoing operations are performed on the second RDMA packet C2, to send eight data blocks A1, A2, . . . , and A8 in the to-be-sent data and PI1, PI2, . . . , and PI8 of the eight data blocks to the processor of the receive end.

The processing module sends the data block and the PI to the bus system through the communications interface of the network interface card. The processor receives the data block and the PI from the bus system and forms the target data by using the received data block and the PI according to a receiving sequence, where the target data is the same as the to-be-sent data shown in FIG. 1-3.

Step 405: When the standard payload length L1 is greater than the length L2 of the data block in the to-be-sent data and the to-be-sent data does not include the PI corresponding to the data block, the RDMA packet includes x data blocks and PI corresponding to each of the x data blocks in the to-be-sent data, where x=L1/L2, obtain the x data blocks from the RDMA packet.

In this step, the processing module of the network interface card may remove a packet header and a check part of the RDMA packet to obtain a payload part of the RDMA packet, read data whose length is L2 from a start position of the payload part to obtain the first data block, calculate a CRC of the first data block based on the first data block, read data of L3 bytes from the payload part to obtain PI corresponding to the first data block, and when the CRC of the first data block is equal to the PI corresponding to the first data block, send the first data block to the processor of the receive end through the communications interface of the network interface card.

The processing module continues to read data whose length is L2 from the payload part to obtain the second data block, calculates a CRC of the second data block based on the second data block, reads data whose length is L3 bytes from the payload part to obtain PI corresponding to the second data block, and when the CRC of the second data block is equal to the PI corresponding to the second data block, sends the second data block to the processor of the receive end through the communications interface of the network interface card. The processing module continues to perform the foregoing operations, and sends the third data block, . . . , and the $x^{th}$ data block to the processor of the receive end.

Optionally, when the processing module of the network interface card receives a next RDMA packet located after the RDMA packet, the processing module still processes the next RDMA packet in the same manner of processing the RDMA packet. Details are not described herein again.

When a CRC corresponding to an example data block is not equal to PI corresponding to the data block, it indicates that a data error occurs in the transmission process of the RDMA packet. In this case, the RDMA packet of the transmit end may be stopped from being continuously received, and the method procedure of this embodiment ends.

Optionally, the processing module of the network interface card may need to perform a plurality of times of read operations to read one data block from the payload part and can calculate a CRC of the data block only after performing a plurality of times of CRC calculation operations. A total length of data read for a plurality of times is equal to the length L2 of the data block. For a detailed implementation process, refer to related content in step 404. Details are not described herein again.

For example, referring to FIG. 3-2, it is assumed that the length L2 of the data block in the to-be-sent data is 512, and it is assumed that the determined standard payload length L1 is 1 k. In this case, x is 2. It is assumed that the processing module of the network interface card receives the first RDMA packet B1 shown in FIG. 3-2, where a payload part of the first RDMA packet B1 includes the first data block A1 and PH corresponding to the first data block A1 and the second data block A2 and PI2 corresponding to the second data block A2; removes a packet header and a check part of the first RDMA packet B1 to obtain a payload part of the first RDMA packet B1, reads data of 512 bytes from a start position of the payload part of the first RDMA packet B1 to obtain the first data block A1, and calculates a CRC1 corresponding to the first data block based on the first data block A1; and continues to read data of L3 bytes from the payload part of the first RDMA packet to obtain PH corresponding to the first data block, and when the CRC1 corresponding to the first data block A1 is equal to the PH corresponding to the first data block A1, sends the first data block A1 to the processor of the receive end. The processing module of the network interface card continues to read data of 512 bytes from the payload part of the first RDMA packet to obtain the second data block A2, and calculates a CRC2 corresponding to the second data block A2 based on the second data block A2; and continues to read data of L3 bytes from the payload part of the first RDMA packet to obtain PI2 corresponding to the second data block A2, and when the CRC2 corresponding to the second data block A2 is equal to the PI2 corresponding to the second data block A2, sends the second data block A2 to the processor of the receive end. When the second RDMA packet B2, the third RDMA packet B3, and the fourth RDMA packet B4 in FIG. 3-2 are received, the foregoing operations are separately performed on the second RDMA packet B1, the third RDMA packet B2, and the fourth RDMA packet B3, to send eight data blocks A1, A2, . . . , A8 in the to-be-sent data to the processor of the receive end.

The processing module sends the data block to the bus system through the communications interface of the network interface card. The processor receives the data block from the bus system and forms the target data by using the received data block according to a receiving sequence, where the target data is the same as the to-be-sent data shown in FIG. 1-2.

For another example, it is assumed that the determined standard payload length L1 is 2 k. In this case, x=4. It is assumed that the first RDMA packet C1 shown in FIG. 3-3 is received, and a payload part of the first RDMA packet C1 includes the first data block A1 and PH corresponding to the first data block A1, the second data block A2 and PI2 corresponding to the second data block A2, the third data block A3 and PI3 corresponding to the third data block A3, and the fourth data block A4 and PI4 corresponding to the fourth data block A4. The processing module of the network interface card removes a packet header and a check part of the first RDMA packet C1 to obtain a payload part of the first RDMA packet C1, reads data of 512 bytes from a start position of the payload part of the first RDMA packet C1 to obtain the first data block A1, and calculates a CRC1 corresponding to the first data block based on the first data block A1; and continues to read data of L3 bytes from the payload part of the first RDMA packet C1 to obtain PH corresponding to the first data block A1, and when the CRC1 corresponding to the first data block A1 is equal to the PI1 corresponding to the first data block A1, sends the first data block A1 to the processor of the receive end. The processing module of the network interface card continues to read data of 512 bytes from the payload part of the first RDMA packet C1 to obtain the second data block A2, and calculates a CRC2 corresponding to the second data block A2 based on the second data block A2; and continues to read data of L3 bytes from the payload part of the first RDMA packet C1 to obtain PI2 corresponding to the second data block A2, and when the CRC2 corresponding to the second data block A2 is equal to the PI2 corresponding to the second data block A2, sends the second data block A2 to the processor of the receive end. The processing module of the network interface card continues to read data of 512 bytes from the payload part of the first RDMA packet C1 to obtain the third data block A3, and calculates a CRC3 corresponding to the third data block A3 based on the third data block A3; and continues to read data of L3 bytes from the payload part of the first RDMA packet C1 to obtain PI3 corresponding to the third data block A3, and when a CRC3 corresponding to the third data block A3 is equal to the PI3 corresponding to the third data block A3, sends the third data block A3 to the processor of the receive end. The processing module of the network interface card continues to read data of 512 bytes from the payload part of the first RDMA packet C1 to obtain the fourth data block A4, and calculates a CRC4 corresponding to the fourth data block A4 based on the fourth data block A4; and continues to read data of L3 bytes from the payload part of the first RDMA packet to obtain PI4 corresponding to the fourth data block A4, and when the CRC4 corresponding to the fourth data block A4 is equal to the PI4 corresponding to the fourth data block A4, sends the fourth data block A4 to the processor of the receive end. When the second RDMA packet C2 in FIG. 3-3 is received, the foregoing operations are performed on the second RDMA packet C2, to send eight data blocks A1, A2, . . . , and A8 in the to-be-sent data to the processor of the receive end. The processing module sends the data block to the bus system through the communications interface of the network interface card. The processor receives the data block from the bus system and forms the target data by using the received data block according to a receiving sequence, where the target data is the same as the to-be-sent data shown in FIG. 1-2.

When the standard payload length L1 is greater than the length L2 of the data block, the payload part of each encapsulated RDMA packet includes the x data blocks and the PI corresponding to each data block, and the payload part of each RDMA packet has a same structure. Therefore, each RDMA packet can be processed by using only one type of processing logic, to obtain the data block and the PI corresponding to the data block. This reduces difficulty of processing the RDMA packet and reduces time consumption for processing the RDMA packet at the receive end.

Step 406: When the standard payload length L1 is less than or equal to the length L2 of the data block in the to-be-sent data and the to-be-sent data includes the PI corresponding to the data block, obtain the data block and the PI corresponding to the data block from y consecutively received RDMA packets corresponding to a same data block, where y=L2/L1.

In this step, when receiving a start packet, the processing module in the network interface card uses the start packet as the first RDMA packet of the first data block, removes a packet header and a check part of the first RDMA packet to obtain a payload part of the first RDMA packet, where the payload part of the first RDMA packet is data whose length is L1+L3/y in the first data block, and calculates the first CRC based on the data whose length is L1+L3/y. When receiving a next RDMA packet, the processing module in the network interface card uses the RDMA packet as the second RDMA packet of the first data block, removes a packet header and a check part of the second RDMA packet to obtain a payload part of the second RDMA packet, where the payload part of the second RDMA packet is data whose length is L1+L3/y in the first data block, and calculates the second CRC based on the data whose length is L1+L3/y and the first CRC. According to the operation performed on the second RDMA packet, same processing is continuously performed on the third RDMA packet, . . . , and the $(y-1)^{th}$ RDMA packet of the first data block until the $y^{th}$ RDMA packet of the first data block is received. The processing module in the network interface card removes a packet header and a check part of the $y^{th}$ RDMA packet to obtain a payload part of the $y^{th}$ RDMA packet, reads data whose length is L1+L3/y-L3 from a start position of the payload part of the $y^{th}$ RDMA packet, and forms the first data block by using (y-1) pieces of data whose length is L1+L3/y of the obtained first data block and the data whose length is L1+L3/y-L3; and calculates, based on the data whose length is L1+L3/y-L3 and the $(y-1)^{th}$ CRC, the CRC corresponding to the first data block, continues to read data of remaining L3 bytes from the payload part of the $y^{th}$ RDMA packet to obtain PI corresponding to the first data block, and when the PI corresponding to the first data block is equal to the CRC corresponding to the first data block, sends the first data block and the PI corresponding to the first data block to the processor of the receive end.

When receiving a next RDMA packet, the processing module in the network interface card uses the RDMA packet as the first RDMA packet of the second data block, removes a packet header and a check part of the first RDMA packet to obtain a payload part of the first RDMA packet, where the payload part of the first RDMA packet is data whose length is L1+L3/y in the second data block, and calculates the first CRC based on the data whose length is L1+L3/y. When receiving a next RDMA packet, the processing module in the network interface card uses the RDMA packet as the second RDMA packet of the second data block, removes a packet header and a check part of the second RDMA packet to obtain a payload part of the second RDMA packet, where the payload part of the second RDMA packet is data whose length is L1+L3/y in the second data block, and calculates the second CRC based on the data whose length is L1+L3/y and the first CRC. According to the operation performed on the second RDMA packet, same processing is continuously performed on the third RDMA packet, . . . , and the $(y-1)^{th}$ RDMA packet of the second data block until the $y^{th}$ RDMA packet of the second data block is received. The processing module in the network interface card removes a packet header and a check part of the $y^{th}$ RDMA packet to obtain a payload part of the $y^{th}$ RDMA packet, reads data whose length is L1+L3/y-L3 from a start position of the payload part of the $y^{th}$ RDMA packet, and forms the second data block by using (y-1) pieces of data whose length is L1+L3/y of the obtained second data block and the data whose length is L1+L3/y-L3; and calculates, based on the data whose length is L1+L3/y-L3 and the $(y-1)^{th}$ CRC, the CRC corresponding to the second data block, continues to read data of remaining L3 bytes from the payload part of the $y^{th}$ RDMA packet to obtain PI corresponding to the second data block, and when the PI corresponding to the second data block is equal to the CRC corresponding to the second data block, sends the second data block and the PI corresponding to the second data block to the processor of the receive end. The processing module continues to receive the RDMA packet in the same manner of reading the second data block and sends the third data block of the to-be-sent data and PI corresponding to the third data block, and the fourth data block and PI corresponding to the fourth data block to the processor of the receive end. When the third RDMA packet is received, the foregoing process performed on the second RDMA packet is repeated to process the third RDMA packet.

The processing module of the network interface card sends the data block and the PI to the bus system through the communications interface of the network interface card. The processor receives the data block and the PI from the bus system and forms the target data by using the received data block and the PI according to a receiving sequence, where the target data is the same as the to-be-sent data sent by the transmit end.

Optionally, when the length of the data block in the to-be-sent data is 4 k, the standard payload length L1 is usually less than or equal to the length L2 of the data block, and the IO configuration information stored in the second memory of the network interface card further includes position relationship information between metadata and PI that are corresponding to the data block. The processing module of the network interface card may determine, based on the position relationship information, a position relationship between the metadata and the PI that are corresponding to the data block.

Optionally, when it is determined that the PI corresponding to the data block is located on a left side of the metadata corresponding to the data block, the data block and the PI corresponding to the data block are obtained from y consecutively received RDMA packets corresponding to a same data block.

For example, it is assumed that the standard payload length L1 is 1 k. In this case, y is 4. As shown in FIG. 3-4, when receiving a start packet, the processing module in the network interface card uses the start packet as the first RDMA packet 11 of the first data block A1, removes a packet header and a check part of the first RDMA packet 11 to obtain a payload part of the first RDMA packet 11, where the payload part of the first RDMA packet 11 is data of 1 k+L3/4 bytes in the first data block A1, and calculates the first CRC based on the data of 1 k+L3/4 bytes. When receiving a next RDMA packet, the processing module in the network interface card uses the RDMA packet as the second RDMA packet 12 of the first data block A1, removes a packet header and a check part of the second RDMA packet 12 to obtain a payload part of the second RDMA packet 12, where the payload part of the second RDMA packet 12 is data of 1 k+L3/4 bytes in the first data block A1, and calculates the second CRC based on the data of 1 k+L3/4 bytes and the first CRC. According to the operation performed on the second RDMA packet 12, same processing continues to be performed on the third RDMA packet 13 of the first data block A1, and when receiving the fourth RDMA packet 14 of the first data block A1, the processing module in the network interface card removes a packet header and a check part of the fourth RDMA packet 14 to obtain a payload part of the fourth RDMA packet 14, reads data of 1 k+L3/4−L3 bytes from a start position of the payload part of the fourth RDMA packet 14, and forms the first data block A1 by using three pieces of data of 1 k+L3/4 bytes in the obtained first data block A1 and the data of 1 k+L3/4−L3 bytes, and a length of the first data block A1 is 4 k; and calculates a CRC corresponding to the first data block A1 based on the data of the 1 k+L3/4−L3 bytes and the third CRC, continues to read data of remaining L3 bytes from the payload part of the fourth RDMA packet 14 to obtain PI corresponding to the first data block A1, and when the PI corresponding to the first data block A1 is equal to the CRC corresponding to the first data block A1, sends the first data block A1 and the PI corresponding to the first data block A1 to the processor of the receive end.

When receiving a next RDMA packet, the processing module in the network interface card uses the RDMA packet as the first RDMA packet 21 of the second data block A2 and removes a packet header and a check part of the first RDMA packet 21 to obtain a payload part of the first RDMA packet 21, where the payload part of the first RDMA packet 21 is data of 1 k+L3/4 bytes in the second data block A2, and calculates the first CRC based on the data of 1 k+L3/4 bytes. When receiving a next RDMA packet, the processing module in the network interface card uses the RDMA packet as the second RDMA packet 22 of the second data block A2, removes a packet header and a check part of the second RDMA packet 22 to obtain a payload part of the second RDMA packet 22, where the payload part of the second RDMA packet 22 is data of 1 k+L3/4 bytes in the second data block A2, and calculates the second CRC based on the data of 1 k+L3/4 bytes and the first CRC. According to the operation performed on the second RDMA packet 22, same processing continues to be performed on the third RDMA packet 23 of the second data block A2, and when receiving the fourth RDMA packet 24 of the second data block A2, the processing module in the network interface card removes a packet header and a check part of the fourth RDMA packet 24 to obtain a payload part of the fourth RDMA packet 24, reads data of 1 k+L3/4−L3 bytes from a start position of the payload part of the fourth RDMA packet 24, and forms the second data block A2 by using three pieces of data of 1 k+L3/4 bytes of the obtained second data block A2 and the data of the 1 k+L3/4−L3 bytes, and a length of the second data block A2 is 4 k; and calculates a CRC corresponding to the second data block A2 based on the data of the 1 k+L3/4−L3 bytes and the third CRC, reads the data of remaining L3 bytes from the payload part of the fourth RDMA packet 24 to obtain PI corresponding to the second data block A2, and when the PI corresponding to the second data block A2 is equal to the CRC corresponding to the second data block, and sends the second data block A2 and the PI corresponding to the second data block A2 to the processor of the receive end. The processing module continues to receive the RDMA packet in the same manner of reading the second data block A2 and sends the third data block A3 of the to-be-sent data and PI corresponding to the third data block A3, and the fourth data block A4 and PI corresponding to the fourth data block A4 to the processor of the receive end.

The processing module of the network interface card sends the data block and the PI to the bus system through the communications interface of the network interface card. The processor receives the data block and the PI from the bus system and forms the target data by using the received data block and the PI according to a receiving sequence, where the target data is the same as the to-be-sent data shown in FIG. 4-2.

Optionally, when it is determined that the PI corresponding to the data block is located on a right side of the metadata corresponding to the data block, the data block, the metadata of the data block, and the PI corresponding to the data block are obtained from y consecutively received RDMA packets corresponding to a same data block.

For example, it is assumed that the standard payload length L1 is 1 k. In this case, y is 4. When receiving a start packet, the processing module in the network interface card uses the start packet as the first RDMA packet 11 of the first data block A1, and it is assumed that the start packet is the start packet in FIG. 3-7, removes a packet header and a check part of the first RDMA packet 11 to obtain a payload part of the first RDMA packet 11, where the payload part of the first RDMA packet 11 is data of 1 k+(L4+L3)/4 bytes in the first data block A1, and calculates the first CRC based on the data of 1 k+(L4+L3)/4 bytes. When receiving a next RDMA packet, the processing module in the network interface card uses the RDMA packet as the second RDMA packet 12 of the first data block A1, removes a packet header and a check part of the second RDMA packet 12 to obtain a payload part of the second RDMA packet 12, where the payload part of the second RDMA packet 12 is data of 1 k+(L4+L3)/4 bytes in the first data block A1, and calculates the second CRC based on the data of 1 k+(L4+L3)/4 bytes and the first CRC. According to the operation performed on the second RDMA packet 12, same processing continues to be performed on the third RDMA packet 13 of the first data block A1, and when receiving the fourth RDMA packet 14 of the first data block A1, the processing module in the network interface card removes a packet header and a check part of the fourth RDMA packet 14 to obtain a payload part of the fourth RDMA packet 14, reads data of 1 k+(L4+L3)/4−L3 bytes from a start position of the payload part of the fourth RDMA packet 14, and forms the first data block A1 and metadata 1 corresponding to the first data block A1 by using three piece of data of 1 k+(L4+L3)/4 bytes in the obtained first data block A1 and the data of 1 k+(L4+L3)/4−L3 bytes, and a length of the first data block A1 is 4 k, and a length of the metadata 1 corresponding to the first data block A1 is L4; and calculates a CRC corresponding to the first data block A1 based on the data of the 1 k+(L4+L3)/4−L3 bytes and the third CRC, continues to read data of remaining L3 bytes from the payload part of the fourth RDMA packet 14 to obtain PI corresponding to the first data block A1, and when the PI corresponding to the first data block A1 is equal to the CRC corresponding to the first data block A1, sends the first data block A1, the metadata 1 corresponding to the first data block A1, and the PI corresponding to the first data block A1 to the processor of the receive end.

When receiving a next RDMA packet, the processing module in the network interface card uses the RDMA packet as the first RDMA packet 21 of the second data block A2, and removes a packet header and a check part of the first RDMA packet 21 to obtain a payload part of the first RDMA packet 21, where the payload part of the first RDMA packet 21 is data of 1 k+(L4+L3)/4 bytes in the second data block A2, and calculates the first CRC based on the data of 1 k+(L4+L3)/4 bytes. When receiving a next RDMA packet, the processing module in the network interface card uses the RDMA packet as the second RDMA packet 22 of the second data block A2, removes a packet header and a check part of the second RDMA packet 22 to obtain a payload part of the second RDMA packet 22, where the payload part of the second RDMA packet 22 is data of 1 k+(L4+L3)/4 bytes in the second data block A2, and calculates the second CRC based on the data of 1 k+(L4+L3)/4 bytes and the first CRC. According to the operation performed on the second RDMA packet 22, same processing continues to be performed on the third RDMA packet 23 of the second data block A2, and when receiving the fourth RDMA packet 24 of the second data block A2, the processing module in the network interface card removes a packet header and a check part of the fourth RDMA packet 24 to obtain a payload part of the fourth RDMA packet 24, reads data of 1 k+(L4+L3)/4−L3 bytes from a start position of the payload part of the fourth RDMA packet 24, and forms the second data block A2 and metadata 2 corresponding to the second data block A2 by using three pieces of data of 1 k+(L4+L3)/4−bytes of the obtained second data block A2 and the data of 1 k+(L4+L3)/4−L3 bytes, and a length of the second data block A2 is 4 k; and calculates a CRC corresponding to the second data block A2 based on the data of the 1 k+(L4+L3)/4−L3 bytes and the third CRC, continuously reads data of remaining L3 bytes from the payload part of the fourth RDMA packet 24 to obtain PI corresponding to the second data block A2, and when the PI corresponding to the second data block A2 is equal to the CRC corresponding to the second data block A2, sends the second data block A2, the metadata 2 corresponding to the second data block A2, and the PI corresponding to the second data block A2 to the processor of the receive end. The processing module continues to receive the RDMA packet in the same manner of reading the second data block A2 and sends the third data block of the to-be-sent data, metadata corresponding to the third data block, and PI corresponding to the third data block, the fourth data block, metadata corresponding to the fourth data block, and PI corresponding to the fourth data block to the processor of the receive end.

The processing module of the network interface card sends the data block, the metadata, and the PI to the bus system through the communications interface of the network interface card. The processor receives the data block, the metadata, and the PI from the bus system, and forms the target data by using the received data block, the metadata, and the PI according to a receiving sequence, where the target data is the same as the to-be-sent data shown in FIG. 1-5.

Step 407: When the standard payload length L1 is less than or equal to the length L2 of the data block in the to-be-sent data and the to-be-sent data does not include the PI corresponding to the data block, obtain the data block from y consecutively received RDMA packets corresponding to a same data block, where y=L2/L1.

In this step, when receiving a start packet, the processing module in the network interface card uses the start packet as the first RDMA packet of the first data block, and removes a packet header and a check part of the first RDMA packet to obtain a payload part of the first RDMA packet, where the payload part of the first RDMA packet is data whose length is L1+L3/y in the first data block, and calculates the first CRC based on the data whose length is L1+L3/y. When receiving a next RDMA packet, the processing module in the network interface card uses the RDMA packet as the second RDMA packet of the first data block, removes a packet header and a check part of the second RDMA packet to obtain a payload part of the second RDMA packet, where the payload part of the second RDMA packet is data whose length is L1+L3/y in the first data block, and calculates the second CRC based on the data of L1+L3/y. According to the operation performed on the second RDMA packet, same processing is continuously performed on the third RDMA packet, . . . , and the $(y-1)^{th}$ RDMA packet of the first data block until the $y^{th}$ RDMA packet of the first data block is received. The processing module in the network interface card removes a packet header and a check part of the $y^{th}$ RDMA packet to obtain a payload part of the $y^{th}$ RDMA packet, reads data whose length is L1+L3/y−L3 from a start position of the payload part of the $y^{th}$ RDMA packet, and forms the first data block by using (y−1) pieces of data whose length is L1+L3/y of the obtained first data block and the data whose length is L1+L3/y−L3; and calculates, based on the data whose length is L1+L3/y−L3 and the $(y-1)^{th}$ CRC, the CRC corresponding to the first data block, continues to read data of remaining L3 bytes from the payload part of the $y^{th}$ RDMA packet to obtain PI corresponding to the first data block, and when the PI corresponding to the first data block is equal to the CRC corresponding to the first data block, sends the first data block to the processor of the receive end.

When receiving a next RDMA packet, the processing module in the network interface card uses the RDMA packet as the first RDMA packet of the second data block, removes a packet header and a check part of the first RDMA packet to obtain a payload part of the first RDMA packet, where the payload part of the first RDMA packet is data whose length is L1+L3/y in the first data block, and calculates the first CRC based on the data whose length is L1+L3/y. When receiving a next RDMA packet, the processing module in the network interface card uses the RDMA packet as the second RDMA packet of the second data block, removes a packet header and a check part of the second RDMA packet to obtain a payload part of the second RDMA packet, where the payload part of the second RDMA packet is data whose length is L1+L3/y in the second data block, and calculates the second CRC based on the data of L1+L3/y. According to the operation performed on the second RDMA packet, same processing is continuously performed on the third RDMA packet, . . . , and the $(y-1)^{th}$ RDMA packet of the second data block until the $y^{th}$ RDMA packet of the second data block is received. The processing module in the network interface card removes a packet header and a check part of the $y^{th}$ RDMA packet to obtain a payload part of the $y^{th}$ RDMA packet, reads data whose length is L1+L3/y−L3 from a start position of the payload part of the $y^{th}$ RDMA packet, and forms the second data block by using (y−1) piece of data whose length is L1+L3/y of the obtained second data block and the data whose length is L1+L3/y−L3; and calculates, based on the data whose length is L1+L3/y−L3 and the $(y-1)^{th}$ CRC, the CRC corresponding to the second data block, continues to read data of remaining L3 bytes from the payload part of the $y^{th}$ RDMA packet to obtain PI corresponding to the second data block, and when the PI corresponding to the second data block is equal to the CRC corresponding to the second data block, sends the second data block to the processor of the receive end. The processing module continues to receive the RDMA packet in the same manner of reading the second data block and sends the third data block and the fourth data block of the to-be-sent data to the processor of the receive end.

When the standard payload length L1 is less than or equal to the length L2 of the data block, payload parts of the first (y−1) RDMA packets corresponding to each data block have a same structure. A payload part of the $y^{th}$ RDMA packet corresponding to each data unit also has a same structure. Therefore, the receive end needs only first processing logic and second processing logic. The first (y−1) RDMA packets of each data block may be processed by using the first processing logic, and the $y^{th}$ RDMA packet of each data block may be processed by using the second processing logic. This reduces difficulty of processing the RDMA packet and reduces time consumption for processing the RDMA packet at the receive end.

Optionally, when it is determined, based on the first indication information, that the RDMA packet does not include the PI, a length of the payload part of each RDMA packet is L1, and the data block may be obtained from the RDMA packet by performing the following operations (1) to (5). An implementation process may be as follows.

(1) Determine whether the standard payload length L1 is greater than the length L2 of the data block in the to-be-sent data and determine whether the to-be-sent data includes the PI corresponding to the data block.

(2) When the standard payload length L1 is greater than the length L2 of the data block in the to-be-sent data and the to-be-sent data includes the PI corresponding to the data block, the RDMA packet includes x data blocks in the to-be-sent data, where x=L1/L2, obtain the x data blocks from the RDMA packet, and then obtain PI corresponding to each data block.

In this step, the processing module of the network interface card may remove a packet header and a check part of the RDMA packet to obtain a payload part of the RDMA packet, read data whose length is L2 from a start position of the payload part to obtain the first data block, calculate a CRC of the first data block based on the first data block to obtain PI corresponding to the first data block, and send the first data block and the PI corresponding to the first data block to the processor of the receive end through the communications interface of the network interface card.

The processing module continues to read data whose length is L2 from the payload part to obtain the second data block, calculates a CRC of the second data block based on the second data block to obtain PI corresponding to the second data block, and sends the second data block and the PI corresponding to the second data to the processor of the receive end through the communications interface of the network interface card. The processing module continues to perform the procedure and sends the third data block and PI corresponding to the third data block, . . . , and the $x^{th}$ data block and PI corresponding to the $x^{th}$ data block to the processor of the receive end.

Optionally, when receiving a next RDMA packet located after the RDMA packet, the processing module still performs the foregoing operations on the next RDMA packet, to send x data blocks and PI corresponding to each data block in the next RDMA packet to the processor. Details are not described herein again. The processor receives the data block and the PI and forms the target data by using the received data block and the PI according to a receiving sequence, where the target data is the same as the to-be-sent data of the transmit end.

Optionally, the processing module of the network interface card may need to perform a plurality of times of read operations to read one data block from the payload part and can calculate a CRC of the data block only after performing a plurality of times of CRC calculation operations. A total length of data read for a plurality of times is equal to the length L2 of the data block. For a detailed implementation process, refer to related content in step 404. Details are not described herein again.

(3) When the standard payload length L1 is greater than the length L2 of the data block in the to-be-sent data and the to-be-sent data includes the PI corresponding to the data block, the RDMA packet includes x data blocks in the to-be-sent data, where x=L1/L2, obtain the x data blocks from the RDMA packet.

In this step, the processing module of the network interface card may remove a packet header and a check part of the RDMA packet to obtain a payload part of the RDMA packet, read data whose length is L2 from a start position of the payload part to obtain the first data block, and send the first data block to the processor of the receive end through the communications interface of the network interface card. The processing module continues to read data whose length is L2 from the payload part to obtain the second data block and sends the second data block to the processor of the receive end through the communications interface of the network interface card. The processing module continues to perform the foregoing procedure, and sends the third data block, . . . , and the $x^{th}$ data block to the processor of the receive end.

Optionally, when receiving a next RDMA packet located after the RDMA packet, the processing module still performs the foregoing operations on the next RDMA packet, to send x data blocks in the next RDMA packet to the processor. Details are not described herein again. The processor receives the data block and forms the target data by using the received data block according to a receiving sequence, where the target data is the same as the to-be-sent data of the transmit end.

(4) When the standard payload length L1 is less than or equal to the length L2 of the data block in the to-be-sent data and the to-be-sent data includes the PI corresponding to the data block, obtain the data block and obtain the PI corresponding to the data block from y consecutively received RDMA packets corresponding to a same data block, where y=L2/L1.

In this step, when receiving a start packet, the processing module in the network interface card uses the start packet as the first RDMA packet of the first data block, removes a packet header and a check part of the first RDMA packet to obtain a payload part of the first RDMA packet, where the payload part of the first RDMA packet is data whose length is L1 in the first data block, and calculates the first CRC based on the data whose length is L1. When receiving a next RDMA packet, the processing module in the network interface card uses the RDMA packet as the second RDMA packet of the first data block, removes a packet header and a check part of the second RDMA packet to obtain a payload part of the second RDMA packet, where the payload part of the second RDMA packet is data whose length is L1 in the first data block, and calculates the second CRC based on the data whose length is L1 and the first CRC. According to the operation performed on the second RDMA packet, same processing is continuously performed on the third RDMA packet, . . . , and the $(y-1)^{th}$ RDMA packet of the first data block until the $y^{th}$ RDMA packet of the first data block is received. The processing module in the network interface card removes a packet header and a check part of the $y^{th}$ RDMA packet to obtain a payload part of the $y^{th}$ RDMA packet, where the payload part of the $y^{th}$ RDMA packet is data whose length is L1 in the first data block, calculates, based on the data whose length is L1 and the $(y-1)^{th}$ CRC, a CRC corresponding to the first data block, and forms the first data block by using y data whose length is L1 of the obtained first data block; and uses the CRC corresponding to the first data block as PI corresponding to the first data block, and sends the first data block and the PI corresponding to the first data block to the processor of the receive end.

When receiving a next RDMA packet, the processing module in the network interface card uses the RDMA packet as the first RDMA packet of the second data block, removes a packet header and a check part of the first RDMA packet to obtain a payload part of the first RDMA packet, where the payload part of the first RDMA packet is data whose length is L1 in the first data block, and calculates the first CRC based on the data whose length is L1. When receiving a next RDMA packet, the processing module in the network interface card uses the RDMA packet as the second RDMA packet of the second data block, removes a packet header and a check part of the second RDMA packet to obtain a payload part of the second RDMA packet, where the payload part of the second RDMA packet is data whose length is L1 in the second data block, and calculates the second CRC based on the data whose length is L1 and the first CRC. According to the operation performed on the second RDMA packet, same processing is continuously performed on the third RDMA packet, . . . , and the $(y-1)^{th}$ RDMA packet of the second data block until the $y^{th}$ RDMA packet of the second data block is received. The processing module in the network interface card removes a packet header and a check part of the $y^{th}$ RDMA packet to obtain a payload part of the $y^{th}$ RDMA packet, where the payload part of the $y^{th}$ RDMA packet is data whose length is L1 of the first data block, calculates, based on the data whose length is L1 and the $(y-1)^{th}$ CRC, a CRC corresponding to the second data block, and forms the second data block by using y data whose length is L1 in the obtained second data block; and uses the CRC corresponding to the second data block as PI corresponding to the second data block, and sends the second data block and the PI corresponding to the second data block to the processor of the receive end. The processing module continues to receive the RDMA packet in the same manner of reading the second data block and sends the third data block of the to-be-sent data and PI corresponding to the third data block, and the fourth data block and PI corresponding to the fourth data block to the processor of the receive end.

The processor receives the data block and the PI and forms the target data by using the received data block and the PI according to a receiving sequence, where the target data is the same as the to-be-sent data of the transmit end.

(5) When the standard payload length L1 is less than or equal to the length L2 of the data block in the to-be-sent data and the to-be-sent data does not include the PI corresponding to the data block, obtain the data block from y consecutively received RDMA packets corresponding to a same data block, where y=L2/L1.

In this step, when receiving a start packet, the processing module in the network interface card uses the start packet as the first RDMA packet of the first data block, removes a packet header and a check part of the first RDMA packet to obtain a payload part of the first RDMA packet, where the payload part of the first RDMA packet is data whose length is L1 in the first data block. When receiving a next RDMA packet, the processing module in the network interface card uses the RDMA packet as the second RDMA packet of the first data block, removes a packet header and a check part of the second RDMA packet to obtain a payload part of the second RDMA packet, where the payload part of the second RDMA packet is data whose length is L1 in the first data block. According to the foregoing operation performed on the second RDMA packet, same processing is continuously performed on the third RDMA packet, . . . , and the $y^{th}$ RDMA packet of the first data block until the $y^{th}$ RDMA packet is processed. The processing module in the network interface card forms the first data block by using y data whose length is L1 in the obtained first data block and sends the first data block to the processor of the receive end.

When receiving a next RDMA packet, the processing module in the network interface card uses the RDMA packet as the first RDMA packet of the second data block, removes a packet header and a check part of the first RDMA packet to obtain a payload part of the first RDMA packet, where the payload part of the first RDMA packet is data whose length is L1 in the first data block. When receiving a next RDMA packet, the processing module in the network interface card uses the RDMA packet as the second RDMA packet of the second data block, removes a packet header and a check part of the second RDMA packet to obtain a payload part of the second RDMA packet, where the payload part of the second RDMA packet is data whose length is L1 in the second data block. According to the operation performed on the second RDMA packet, same processing is continuously performed on the third RDMA packet, . . . , and the $y^{th}$ RDMA packet of the second data block until the $y^{th}$ RDMA packet is processed. The processing module in the network interface card forms the second data block by using y data whose length is L1 in the obtained second data block and sends the second data block to the processor of the receive end. The processing module continues to receive the RDMA packet in the same manner of obtaining the second data block and sends the third data block and the fourth data block to the processor of the receive end.

In this embodiment, when the standard payload length L1 is greater than the length L2 of the data block, a payload part of each RDMA packet includes x data blocks and PI corresponding to each data block, where x=L1/L2. In other words, the payload part of each RDMA packet has a same structure. This reduces difficulty of processing the RDMA packet at the receive end, and further reduces time consumption for processing the RDMA packet and reduces hardware resources required for processing the RDMA packet. When the standard payload length L1 is less than or equal to the length L2 of the data block, a structure of the payload part in the RDMA packet is cyclically changed at an interval of y RDMA packets, where y=L2/L1. The first (y−1) packets in each cycle have a same payload structure, and the $y^{th}$ packet in each cycle has a same payload structure. Therefore, only two types of processing logic are required to process all RDMA packets. This reduces difficulty of processing the packet at the receive end, and further reduces time consumption for processing the RDMA packet and reduces hardware resources required for processing the RDMA packet.

Referring to FIG. 5, an embodiment provides a data sending apparatus 500. The apparatus 500 may be deployed in the network interface card at the transmit end mentioned in the embodiment shown in FIG. 1-1, FIG. 2-1, FIG. 2-2, or FIG. 3-1, and the apparatus 500 includes:

a processing unit 501 configured to generate an RDMA packet, where a payload part of the RDMA packet includes a plurality of data blocks and PI corresponding to each of the plurality data blocks in to-be-sent data; or a payload part of the RDMA packet includes one data unit or a part of data in the data unit of to-be-sent data, the data unit includes one data block and PI corresponding to the data block, and a length of the data unit is equal to an integer multiple of a length of the part of data; and a sending unit 502, configured to send the RDMA packet.

Optionally, the processing unit 501 is configured to:

obtain a standard payload length L1 and a length L2 of the data block in the to-be-sent data; and generate the RDMA packet based on the standard payload length L1 and the length L2 of the data block.

Optionally, the processing unit 501 is configured to:

when L1 is greater than L2, obtain x data blocks and PI corresponding to each of the x data blocks from the to-be-sent data, where x=L1/L2;

form a payload part by using the x data blocks and the PI corresponding to each data block; and generate the RDMA packet based on the payload part.

Optionally, L1=1024, L2=512, x=2, and the payload part of the RDMA packet includes two data blocks and PI corresponding to each of the two data blocks; or L1=2048, L2=512, x=4, and the payload part of the RDMA packet includes four data blocks and PI corresponding to each of the four data blocks; or L1=4096, L2=512, x=8, and the payload part of the RDMA packet includes eight data blocks and PI corresponding to each of the eight data blocks.

Optionally, the processing unit 501 is configured to:

when L1 is less than or equal to L2, obtain data from a start position of the one data unit in the to-be-sent data;

when data of 1/y of the data unit is obtained, where y=L2/L1, form a payload part by using the data of 1/y of the data unit; and generate the RDMA packet based on the payload part.

Optionally, L1=1024, L2=4096, y=4, and the payload part of the RDMA packet includes data whose length is 1024+L3/4 in the data unit, where L3 is a length of the PI in the data unit; or L1=2048, L2=4096, y=2, and the payload part of the RDMA packet includes data whose length is 2048+L3/2 in the data unit; or L1=4096, L2=4096, y=1, and the payload part of the RDMA packet includes the data unit.

The data unit further includes metadata corresponding to the data block, and in the data unit, the PI corresponding to the data block is located on a right side of the metadata; and L1=1024, L2=4096, y=4, the payload part of the RDMA packet includes data whose length is 1024+(L4+L3)/4 in the data unit, L3 is a length of the PI in the data unit, and L4 is a length of the metadata; or L1=2048, L2=4096, y=2, and the payload part of the RDMA packet includes data whose length is 2048+(L4+L3)/2 in the data unit; or L1=4096, L2=4096, y=1, and the payload part of the RDMA packet includes the data unit.

In this embodiment, when the processing unit generates the RDMA packet, a payload part of each generated RDMA packet includes a plurality of data blocks and PI corresponding to each data block in to-be-sent data. In this way, a payload part of each RDMA packet has a same structure. This can reduce difficulty, time consumption, and a hardware resource requirement of processing the RDMA packet at a receive end. Alternatively, because a payload part of the RDMA packet includes one data unit or a part of data in the data unit of to-be-sent data, the data unit includes one data block and PI corresponding to the one data block, and a length of the data unit is equal to an integer multiple of a length of the part of data. In this way, the payload part of each RDMA packet corresponding to each data unit has a same structure. This can reduce difficulty, time consumption, and a hardware resource requirement of processing the RDMA packet at the receive end.

Figures 3, 4, 5, 6:
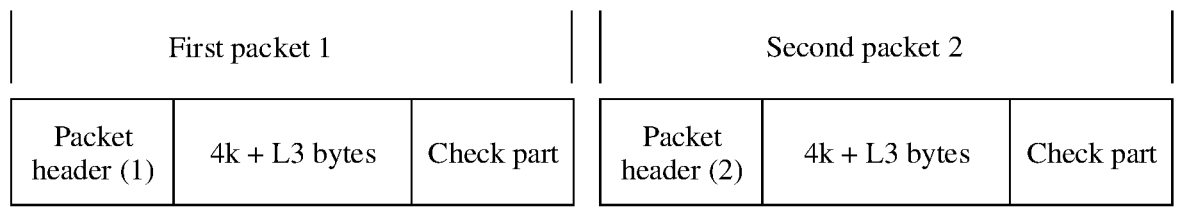

Referring to FIG. 6, an embodiment provides a data receiving apparatus 600. The apparatus 600 may be deployed in the network interface card at the receive end mentioned in the embodiment shown in FIG. 1-1, FIG. 2-1, FIG. 2-2, or FIG. 4-1, and the apparatus 600 includes:

a receiving unit 601 configured to receive at least one RDMA packet, where a payload part of the RDMA packet includes a plurality of data blocks and PI corresponding to each of the plurality data blocks in to-be-sent data; or a payload part of the RDMA packet includes one data unit and a part of data in the data unit of to-be-sent data, the data unit includes one data block and PI corresponding to the data block, and a length of the data unit is equal to an integer multiple of a length of the part of data; and a processing unit 602 configured to obtain a data block and PI corresponding to the data block from the at least one RDMA packet.

Optionally, when L1 is greater than L2, L1 is a standard payload length, L2 is a length of the data block in the to-be-sent data, and the payload part of the RDMA packet includes x data blocks and PI corresponding to each of the x data blocks in the to-be-sent data, where x=L1/L2.

Optionally, the processing unit 602 is configured to:

when one RDMA packet is received, obtain x data blocks and PI corresponding to each of the x data blocks from the one RDMA packet.

Optionally, L1=1024, L2=512, x=2, and the payload part of the RDMA packet includes two data blocks and PI corresponding to each of the two data blocks; or L1=2048, L2=512, x=4, and the payload part of the RDMA packet includes four data blocks and PI corresponding to each of the four data blocks; or L1=4096, L2=512, x=8, and the payload part of the RDMA packet includes eight data blocks and PI corresponding to each of the eight data blocks.

Optionally, when L1 is less than or equal to L2, L1 is a standard payload length, L2 is a length of the data block in the to-be-sent data, and the payload part of the RDMA packet includes data of 1/y of the one data unit of the to-be-sent data, where y=L2/L1.

Optionally, the processing unit 602 is configured to:

when it is determined, according to a sequence number of a start packet, that y RDMA packets corresponding to the data unit are received, obtain the data unit from the y RDMA packets.

Optionally, L1=1024, L2=4096, y=4, and the payload part of the RDMA packet includes data whose length is 1024+L3/4 in the data unit, where L3 is a length of the PI in the data unit; or L1=2048, L2=4096, y=2, and the payload part of the RDMA packet includes data whose length is 2048+L3/2 in the data unit; or L1=4096, L2=4096, y=1, and the payload part of the RDMA packet includes the data unit.

The data unit further includes metadata corresponding to the data block, and in the data unit, the PI corresponding to the data block is located on a right side of the metadata; and L1=1024, L2=4096, y=4, the payload part of the RDMA packet includes data whose length is 1024+(L4+L3)/4 in the data unit, L3 is a length of the PI in the data unit, and L4 is a length of the metadata; or L1=2048, L2=4096, y=2, and the payload part of the RDMA packet includes data whose length is 2048+(L4+L3)/2 in the data unit; or L1=4096, L2=4096, y=1, and the payload part of the RDMA packet includes the data unit.

In this embodiment, the receiving unit receives the at least one RDMA packet, and the processing unit obtains the data block and the PI corresponding to the data block from the at least one RDMA packet. Because a payload part of the RDMA packet includes a plurality of data blocks and PI corresponding to each data block in to-be-sent data. In this way, a payload part of each RDMA packet has a same structure. This can reduce difficulty, time consumption, and a hardware resource requirement of obtaining the data block and the PI corresponding to the data block by the processing unit. Alternatively, because a payload part of the RDMA packet includes one data unit and a part of data in the data unit of to-be-sent data, the data unit includes one data block and PI corresponding to the one data block, and a length of the data unit is equal to an integer multiple of a length of the part of data. In this way, the payload part of each RDMA packet corresponding to each data unit has a same structure. Compared with the current structure of the payload part of each RDMA packet, this can reduce difficulty, time consumption, and a hardware resource requirement of processing the RDMA packet by the processing unit.

Figures 3, 4, 5, 6, 7:
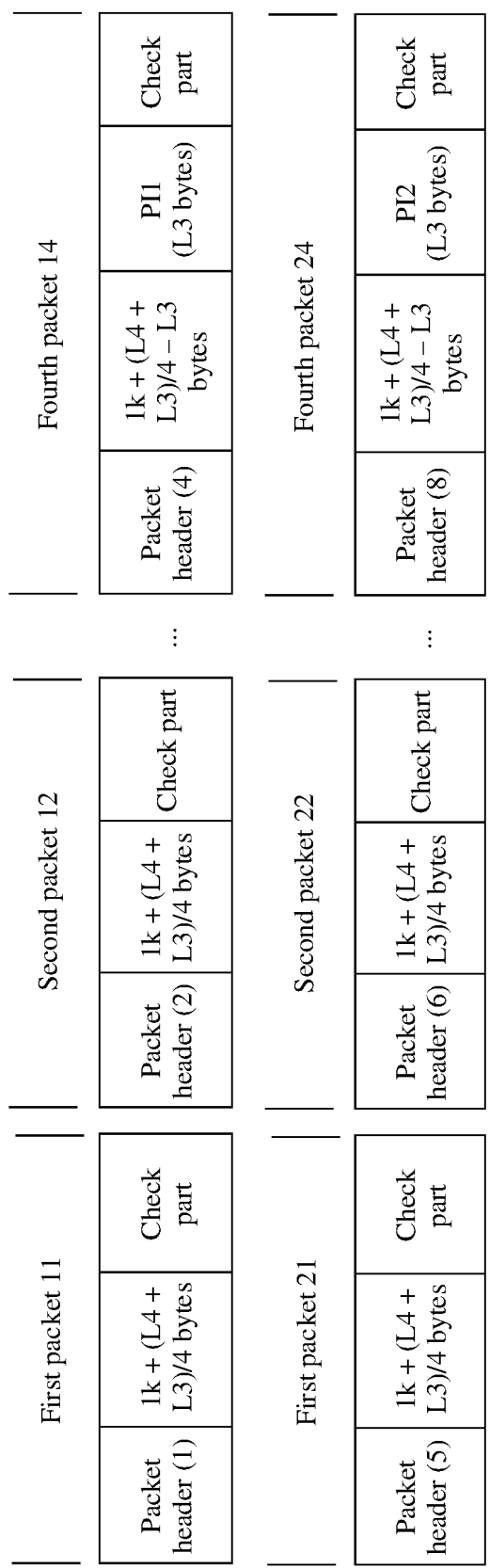

FIG. 7 is a schematic diagram of a data sending apparatus 700 according to an embodiment. The apparatus 700 may be the network interface card of the transmit end mentioned in the embodiment shown in FIG. 1-1, FIG. 2-1, FIG. 2-2, or FIG. 3-1, or a part of the network interface card. The apparatus 700 includes at least one processor 701, at least one memory 702, at least one communications interface 703, at least one network port 704, and a bus 705.

The apparatus 700 is an apparatus of a hardware structure and may be configured to implement functional units in the apparatus in FIG. 5 or functional units in the embodiment shown in FIG. 2-2. For example, a person of ordinary skill in the art may understand that the processing unit 501 in the apparatus 500 shown in FIG. 5 or the processing module 44 in the embodiment shown in FIG. 2-2 may be implemented by the at least one processor 701 by invoking code in the at least one memory 702, and the sending unit 502 in the apparatus 500 shown in FIG. 5 may be implemented through at least one network port 704.

The bus 705 may include a path for transmitting information between the foregoing components. The memory 702 may include at least one register. The processor 701 may be an integrated circuit including a plurality of electronic components.

Optionally, the apparatus 700 includes at least one processor 701, at least one memory 702, at least one communications interface 703, at least one network port 704, and a bus 705, which may be integrated on one printed circuit board (PCB) or a plurality of PCBs.

Figures 3, 4, 5, 6, 7, 8:
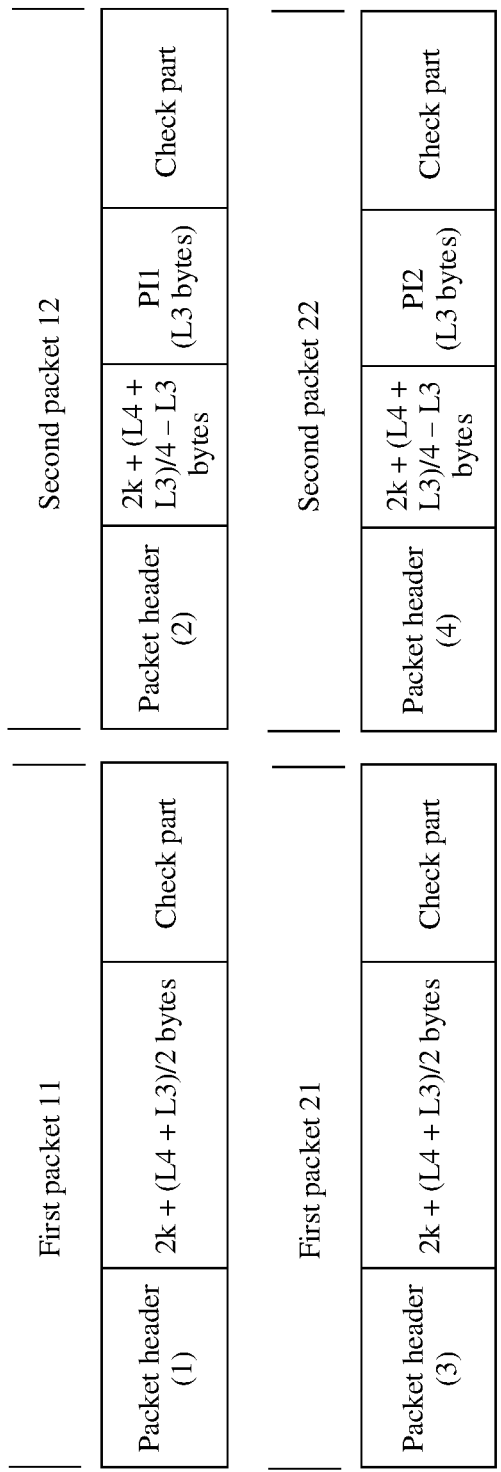
Figures 3, 4, 5, 6, 7, 8, 9:
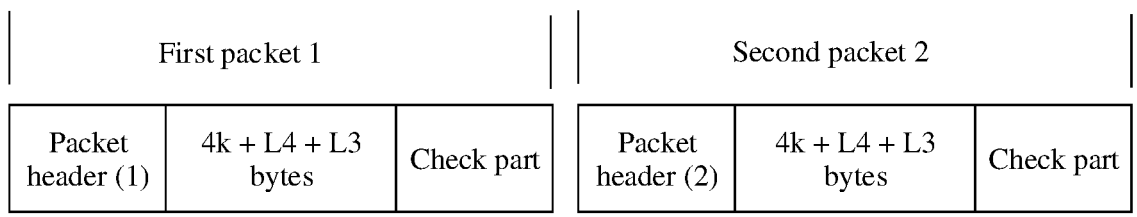
Figures 1, 4:
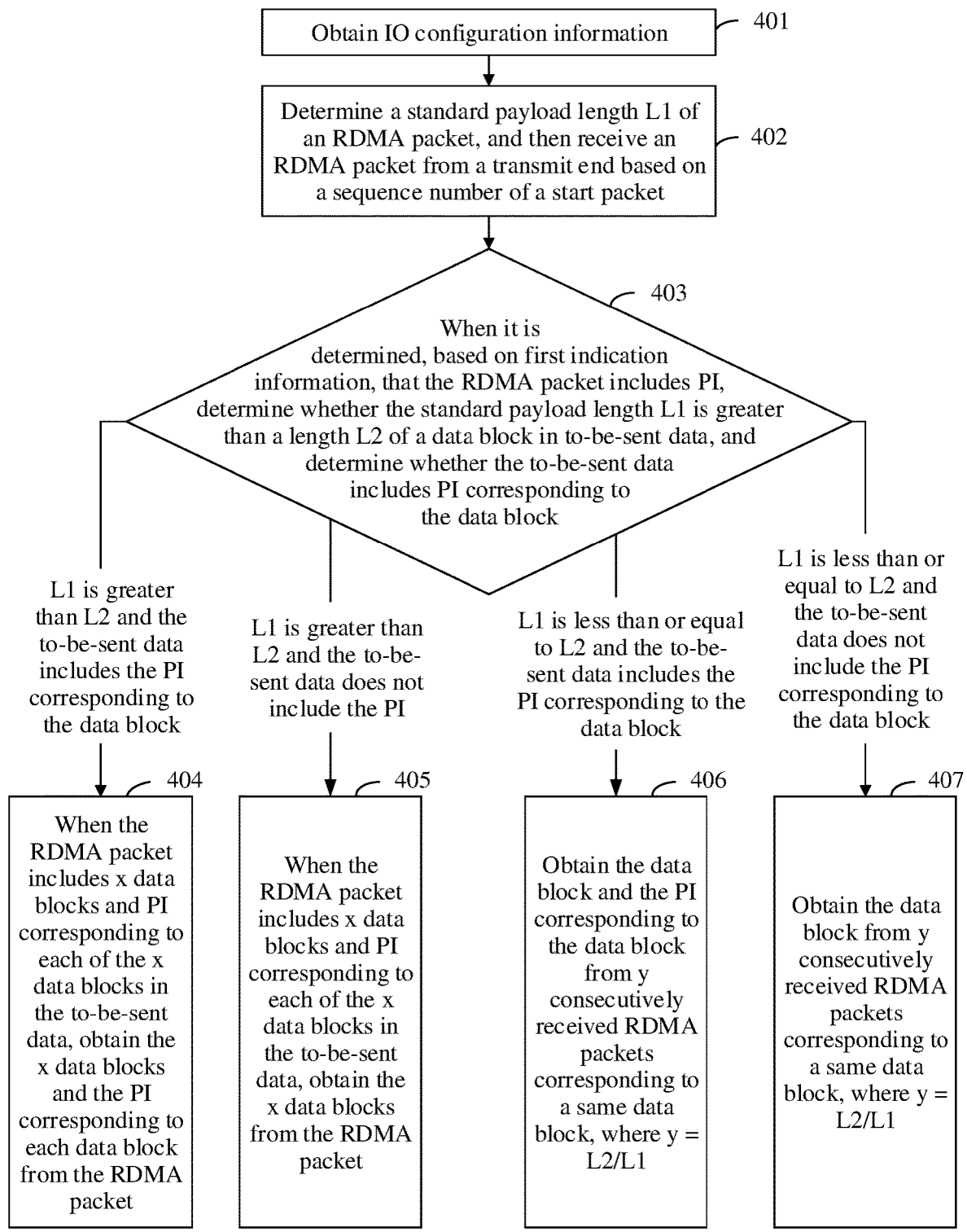
Figures 2, 4:
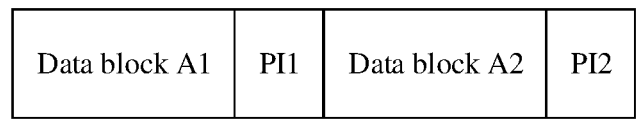
Figure 5:
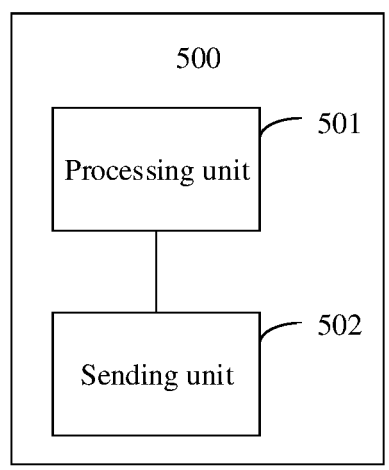
Figure 6:
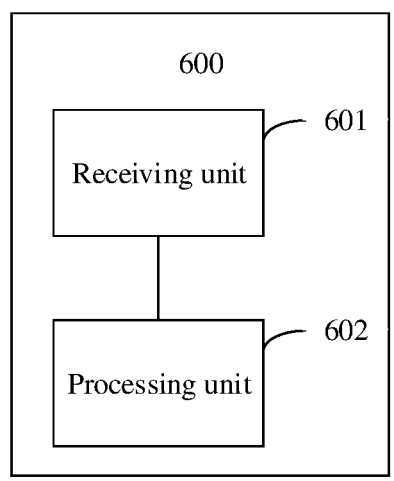
Figure 7:
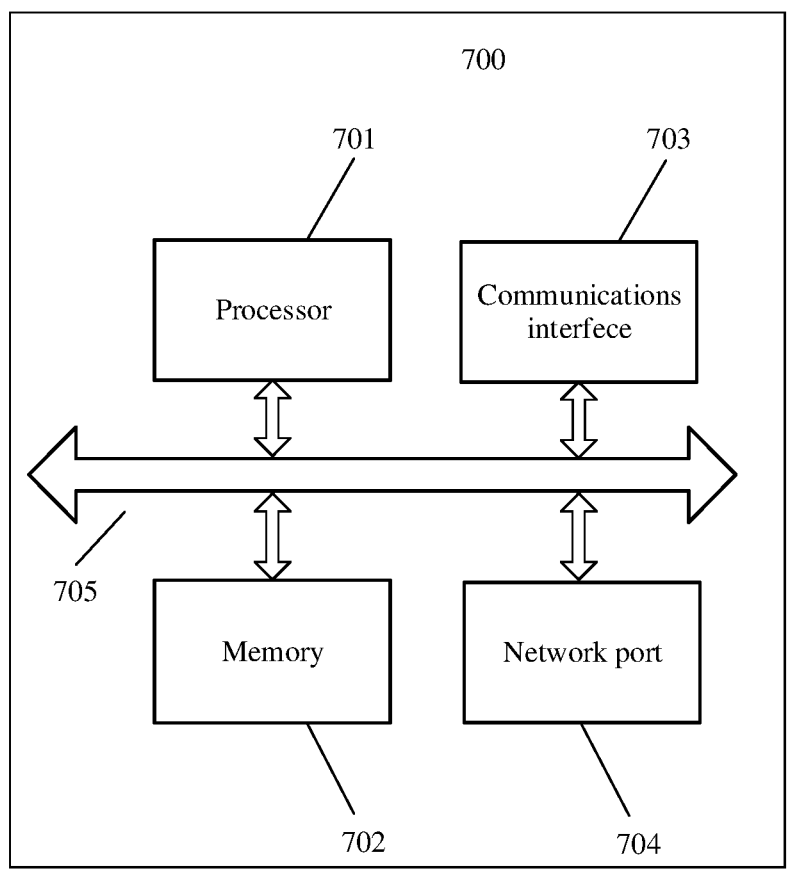
Figure 8:
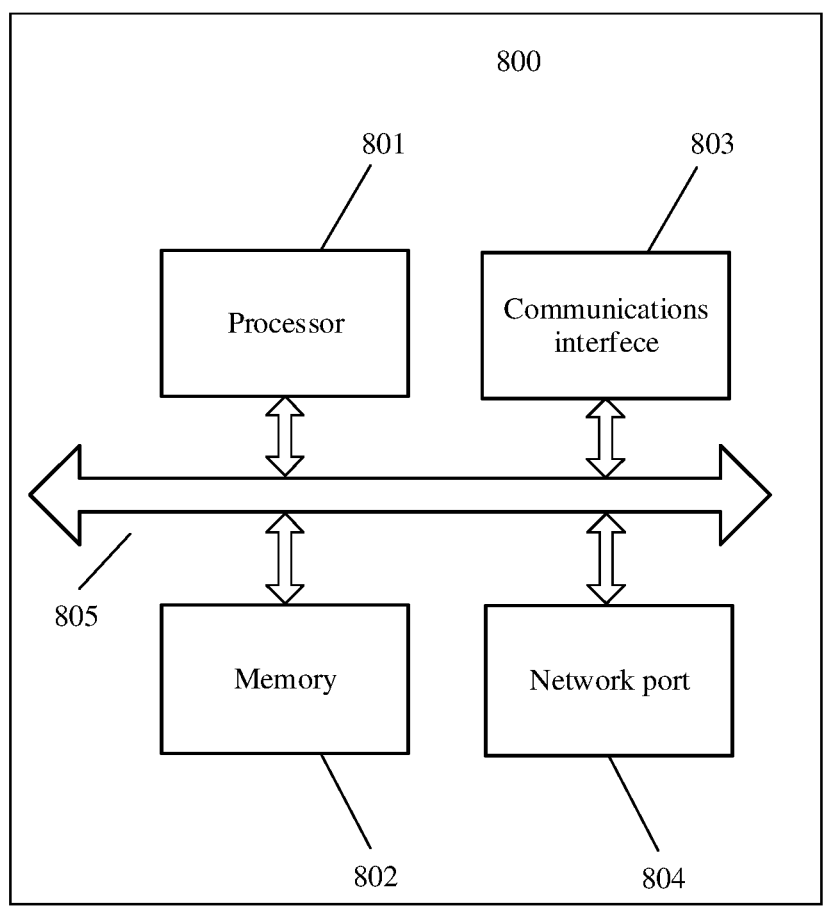

FIG. 8 is a schematic diagram of a data receiving apparatus 800 according to an embodiment. The apparatus 800 may be the network interface card of the receive end mentioned in the embodiment shown in FIG. 1-1, FIG. 2-1, FIG. 2-2, or FIG. 3-1, or a part of the network interface card. The apparatus 800 includes at least one processor 801, at least one memory 802, at least one communications interface 803, at least one network port 804, and a bus 805.

The apparatus 800 is an apparatus of a hardware structure and may be configured to implement functional units in the apparatus in FIG. 6 or functional units in the embodiment shown in FIG. 2-2. For example, a person of ordinary skill in the art may understand that the processing unit 602 in the apparatus 600 shown in FIG. 6 or the processing module 44 in the embodiment shown in FIG. 2-2 may be implemented by the at least one processor 801 by invoking code in the at least one memory 802, and the receiving unit 601 in the apparatus 600 shown in FIG. 6 may be implemented through at least one network port 804.

The bus 805 may include a path for transmitting information between the foregoing components. The memory 802 may include at least one register. The processor 801 may be an integrated circuit including a plurality of electronic components.

Optionally, the apparatus 800 includes at least one processor 801, at least one memory 802, at least one communications interface 803, at least one network port 804, and a bus 805, which may be integrated on one PCB or a plurality of PCBs.

Referring to FIG. 1-1, an embodiment further provides a communications system. The system includes the apparatus shown in FIG. 5 or FIG. 7 and the apparatus shown in FIG. 6 or FIG. 8. The apparatus shown in FIG. 5 or FIG. 7 may be a transmit end, and the apparatus shown in FIG. 6 or FIG. 8 may be a receive end.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely optional embodiments but are not intended as limiting. Any modification, equivalent replacement, or improvement made without departing from the spirit and principle should fall within the protection scope.

What is claimed is:

1. A data sending method, comprising:
   generating a remote direct memory access (RDMA) packet, wherein a payload part of the RDMA packet comprises a plurality of data blocks and protection information (PI) corresponding to each of the plurality data blocks in to-be-sent data; or a payload part of the RDMA packet comprises one data unit or a part of data in the data unit of to-be-sent data, the data unit comprises one data block and PI corresponding to the data block, and a length of the data unit is equal to an integer multiple of a length of the part of data, wherein generating of the RDMA packet further comprises obtaining a standard payload length L1 and a length L2 of the data block in the to-be-sent data; and generating the RDMA packet based on the standard payload length L1 and the length L2 of the data block; and
   sending the RDMA packet.

2. The method according to claim 1, wherein the generating of the RDMA packet based on the standard payload length L1 and the length L2 of the data block comprises:
   obtaining x data blocks and PI corresponding to each of the x data blocks from the to-be-sent data when L1 is greater than L2, wherein x=L1/L2;
   forming a payload part by using the x data blocks and the PI corresponding to each data block of the X data blocks; and
   generating the RDMA packet based on the payload part.

3. The method according to claim 1, wherein the generating of the RDMA packet based on the standard payload length L1 and the length L2 of the data block comprises:
   obtaining data from a start position of the one data unit in the to-be-sent data when L1 is less than or equal to L2;
   forming a payload part by using the data of 1/y of the data unit when data of 1/y of the data unit is obtained, wherein y=L2/L1; and
   generating the RDMA packet based on the payload part.

4. A data sending device, comprising:
   one or more processors; and
   a memory, wherein the memory stores one or more programs, the one or more programs are configured to be executed by the one or more processors, and the one or more programs comprise an instruction used to perform the following operations:

generating a remote direct memory access (RDMA) packet, wherein a payload part of the RDMA packet comprises a plurality of data blocks and protection information (PI) corresponding to each of the plurality data blocks in to-be-sent data; or a payload part of the RDMA packet comprises one data unit or a part of data in the data unit of to-be-sent data, the data unit comprises one data block and PI corresponding to the data block, and a length of the data unit is equal to an integer multiple of a length of the part of data;

obtaining a standard payload length L1 and a length L2 of the data block in the to-be-sent data; and generating the RDMA packet based on the standard payload length L1 and the length L2 of the data block and sending the RDMA packet.

5. The device according to claim 4, wherein the one or more programs further comprise an instruction used to execute the following operations:

obtaining x data blocks and PI corresponding to each of the x data blocks from the to-be-sent data when L1 is greater than L2, wherein x=L1/L2;

forming a payload part by using the x data blocks and the PI corresponding to each data block of the X data blocks; and generating the RDMA packet based on the payload part.

6. The device according to claim 5, wherein L1=1024, L2=512, x=2, and the payload part of the RDMA packet comprises two data blocks and PI corresponding to each of the two data blocks.

7. The device according to claim 5, wherein L1=2048, L2=512, x=4, and the payload part of the RDMA packet comprises four data blocks and PI corresponding to each of the four data blocks.

8. The device according to claim 5, wherein L1=4096, L2=512, x=8, and the payload part of the RDMA packet comprises eight data blocks and PI corresponding to each of the eight data blocks.

9. The device according to claim 4, wherein the one or more programs further comprise an instruction used to execute the following operations:

obtaining data from a start position of the one data unit in the to-be-sent data when L1 is less than or equal to L2;

forming a payload part by using the data of 1/y of the data unit when data of 1/y of the data unit is obtained, wherein y=L2/L1; and generating the RDMA packet based on the payload part.

10. The device according to claim 9, wherein L1=1024, L2=4096, y=4, and the payload part of the RDMA packet comprises data whose length is 1024+L3/4 in the data unit, wherein L3 is a length of the PI in the data unit.

11. The device according to claim 9, wherein L1=2048, L2=4096, y=2, and the payload part of the RDMA packet comprises data whose length is 2048+L3/2 in the data unit.

12. The device according to claim 9, wherein the data unit further comprises metadata corresponding to the data block, and in the data unit, the PI corresponding to the data block is located on a right side of the metadata; and L1=1024, L2=4096, y=4, the payload part of the RDMA packet comprises data whose length is 1024+(L4+L3)/4 in the data unit, L3 is a length of the PI in the data unit, and L4 is a length of the metadata.

13. The device according to claim 9, wherein the data unit further comprises metadata corresponding to the data block, and in the data unit, the PI corresponding to the data block is located on a right side of the metadata; and L1=2048, L2=4096, y=2, and the payload part of the RDMA packet comprises data whose length is 2048+(L4+L3)/2 in the data unit.

14. The device according to claim 9, wherein the data unit further comprises metadata corresponding to the data block, and in the data unit, the PI corresponding to the data block is located on a right side of the metadata; and L1=4096, L2=4096, y=1, and the payload part of the RDMA packet comprises the data unit.

15. A data receiving device, comprising:
one or more processors; and
a memory, wherein
the memory stores one or more programs, the one or more programs are configured to be executed by the one or more processors, and the one or more programs comprise an instruction used to perform the following operations:

receiving at least one remote direct memory access (RDMA) packet, wherein a payload part of the RDMA packet comprises a plurality of data blocks and protection information (PI) corresponding to each of the plurality data blocks in to-be-sent data; or a payload part of the RDMA packet comprises one data unit and a part of data in the data unit of to-be-sent data, the data unit comprises one data block and PI corresponding to the data block, and a length of the data unit is equal to an integer multiple of a length of the part of data; and obtaining a data block and PI corresponding to the data block from the at least one RDMA packet, wherein when L1 is greater than L2, L1 is a standard payload length, L2 is a length of the data block in the to-be-sent data, and the payload part of the RDMA packet comprises x data blocks and PI corresponding to each of the x data blocks in the to-be-sent data, wherein x=L1/L2.

16. The device according to claim 15, wherein the one or more programs further comprise an instruction used to execute the following operations:

obtaining x data blocks and PI corresponding to each of the x data blocks from the one RDMA packet when one RDMA packet is received.

17. The device according to claim 15, wherein when L1 is less than or equal to L2, L1 is a standard payload length, L2 is a length of the data block in the to-be-sent data, and the payload part of the RDMA packet comprises data of 1/y of the one data unit of the to-be-sent data, wherein y=L2/L1.

* * * * *